US012472289B2

(12) United States Patent
Bauman et al.

(10) Patent No.: US 12,472,289 B2
(45) Date of Patent: Nov. 18, 2025

(54) HEART VALVE THAT INCLUDES COATING MATERIAL

(71) Applicant: MiRus LLC, Marietta, GA (US)

(72) Inventors: Jordan Bauman, Smyrna, GA (US); Noah Roth, Marietta, GA (US); Jay Yadav, Atlanta, GA (US); S. Beckett Gookin, Marietta, GA (US); Md Tausif Salim, Decatur, GA (US); Jorge Jimenez, Baton Rouge, LA (US); Jason White, Atlanta, GA (US)

(73) Assignee: MiRus LLC, Marietta, GA (US)

( * ) Notice: Subject to any disclaimer, the term of this patent is extended or adjusted under 35 U.S.C. 154(b) by 0 days.

(21) Appl. No.: 18/434,290

(22) Filed: Feb. 6, 2024

(65) Prior Publication Data

US 2024/0216588 A1   Jul. 4, 2024

Related U.S. Application Data

(63) Continuation-in-part of application No. 18/417,939, filed on Jan. 19, 2024, and a continuation-in-part of
(Continued)

(51) Int. Cl.
*A61F 2/24* (2006.01)
*A61L 31/02* (2006.01)
(Continued)

(52) U.S. Cl.
CPC .......... *A61L 31/088* (2013.01); *A61F 2/2418* (2013.01); *A61L 31/022* (2013.01);
(Continued)

(58) Field of Classification Search
CPC ........ A61F 2/24; A61F 2/2418; A61L 31/022; A61L 2300/114; A61L 2420/08; A61L 2430/20
See application file for complete search history.

(56) References Cited

U.S. PATENT DOCUMENTS

2003/0072974 A1  4/2003  Lau et al.
2003/0084322 A1  5/2003  Schertz et al.
(Continued)

FOREIGN PATENT DOCUMENTS

WO   2017132729   8/2017

OTHER PUBLICATIONS

Beshchasna et al. (Surface evaluation of titanium oxynitride coatings used for developing layered cardiovascular stents, Beshchasna et al., Materials Science & Engineering C 99 (2019) 405-416, 2019) (Year: 2019).*

(Continued)

*Primary Examiner* — Jerrah Edwards
*Assistant Examiner* — Kia Xiong White
(74) *Attorney, Agent, or Firm* — UB Greensfelder LLP; Brian E. Turung

(57) ABSTRACT

A prosthetic heart valve that is at least partially coated with an enhancement layer, and a method for inserting the prosthetic heart valve in a patient. The prosthetic heart valve includes an expandable frame, a leaflet structure, and optionally an inner skirt and/or an outer skirt. One or more of the components of the prosthetic heart valve can be partially or fully coated with the enhancement layer. One type of enhancement layer that can be used includes titanium oxynitride or titanium nitride oxide (TiNOx) and/or zirconium oxynitride (ZrNxOy).

27 Claims, 8 Drawing Sheets

Related U.S. Application Data application No. 18/418,007, filed on Jan. 19, 2024, and a continuation-in-part of application No. 18/400,338, filed on Dec. 29, 2023, and a continuation-in-part of application No. 18/204,180, filed on May 31, 2023.

(60) Provisional application No. 63/540,266, filed on Sep. 25, 2023, provisional application No. 63/537,585, filed on Sep. 11, 2023, provisional application No. 63/439,892, filed on Jan. 19, 2023, provisional application No. 63/439,908, filed on Jan. 19, 2023, provisional application No. 63/389,281, filed on Jul. 14, 2022, provisional application No. 63/347,337, filed on May 31, 2022.

(51) Int. Cl.
 *A61L 31/08* (2006.01)
 *A61L 31/16* (2006.01)

(52) U.S. Cl.
 CPC ....... *A61L 31/16* (2013.01); *A61F 2250/0067* (2013.01); *A61L 2300/114* (2013.01); *A61L 2400/12* (2013.01); *A61L 2420/08* (2013.01); *A61L 2430/20* (2013.01)

(56) References Cited

U.S. PATENT DOCUMENTS

| | | | |
|---|---|---|---|
| 2005/0079200 A1* | 4/2005 | Rathenow | A61L 31/10 427/2.24 |
| 2005/0191408 A1 | 9/2005 | Aharonov | |
| 2006/0136051 A1 | 6/2006 | Furst et al. | |
| 2006/0200224 A1 | 9/2006 | Furst et al. | |
| 2008/0183280 A1 | 7/2008 | Agnew | |
| 2009/0068249 A1 | 3/2009 | Furst et al. | |
| 2010/0023115 A1 | 1/2010 | Robaina et al. | |
| 2013/0084322 A1* | 4/2013 | Wu | A61L 31/127 424/426 |
| 2013/0216421 A1* | 8/2013 | Buckman, Jr. | A61F 2/91 148/237 |
| 2014/0099279 A1 | 4/2014 | Furst et al. | |
| 2015/0157455 A1* | 6/2015 | Hoang | B29C 49/24 264/269 |
| 2015/0282929 A1 | 10/2015 | Rodriguez | |
| 2017/0216494 A1 | 8/2017 | Roth et al. | |
| 2017/0273785 A1* | 9/2017 | Seguin | A61F 2/2433 |
| 2018/0361017 A1 | 12/2018 | Roth | |
| 2019/0008995 A1 | 1/2019 | Roth | |
| 2019/0046684 A1 | 2/2019 | Roth | |
| 2020/0306067 A1 | 10/2020 | Nia | |
| 2021/0038379 A1 | 2/2021 | Johnson et al. | |
| 2021/0154373 A1* | 5/2021 | Park | A61L 31/148 |
| 2021/0236688 A1* | 8/2021 | Wagner | A61L 27/18 |
| 2021/0251766 A1* | 8/2021 | Quintana-Ponce | A61F 2/389 |
| 2023/0270680 A1* | 8/2023 | Fritz | A61K 33/24 424/489 |

OTHER PUBLICATIONS

Alotaibi et al., "Antibacterial Properties of Cu-ZrO2 Thin Film Prepared via Aerosol Assisted Chemical Vapour Deposition", Journal of Materials Chemistry B, pp. 1-15 (2015).

Singh et al., "Synthesis of New Zirconium (IV) Complexes with Amino Acid Schiff Bases: Spectral, Molecular Modeling, and Fluoresence Studies"; International Journal of Inorganic Chemistry, pp. 5-6 (Jan. 2013).

Kumari et al., "Zirconia-based nanomaterials: recent developments in syntheses and applications" Nanoscale Advances, vol. 4, pp. 4210-4236 (2022).

Pedowitz et al., "Molybdenum Rhenium (MoRd) as a Biologically Superior Alloy for Foot and Ankle Implants" Foot & Ankle Orthopaedics, vol. 3, p. 1 (Sep. 2018).

* cited by examiner

HEART VALVE THAT INCLUDES COATING MATERIAL

REFERENCED APPLICATIONS

The present application claims priority to U.S. Provisional Application Ser. No. 63/537,585 filed Sep. 11, 2023, which is incorporated herein by reference.

The present disclosure is a continuation-in-part of U.S. application Ser. No. 18/417,939 filed Jan. 19, 2024, which in turn claims priority on U.S. Provisional Application Ser. No. 63/439,892, filed Jan. 19, 2023, which are all fully incorporated herein by reference.

The present disclosure is a continuation-in-part of U.S. application Ser. No. 18/418,007 filed Jan. 19, 2024, which in turn claims priority on U.S. Provisional Application Ser. No. 63/439,908, filed Jan. 19, 2023, which are all fully incorporated herein by reference.

The present application is a continuation-in-part of U.S. application Ser. No. 18/400,338 filed Dec. 29, 2023, which in turn priority claims priority to U.S. Provisional Application Ser. No. 63/540,266 filed Sep. 25, 2023, which are all fully incorporated herein by reference.

The present application is a continuation-in-part of U.S. application Ser. No. 18/204,180 filed May 31, 2023, which claims priority on U.S. Provisional Application Ser. No. 63/389,281 filed Jul. 14, 2022, which are all fully incorporated herein by reference.

The present application is a continuation-in-part of U.S. application Ser. No. 18/204,180 filed May 31, 2023, which claims priority on U.S. Provisional Application Ser. No. 63/347,337 filed May 31, 2022, which are all fully incorporated herein by reference.

FIELD OF DISCLOSURE

The disclosure relates generally to medical devices and medical device applications, and more particularly to a prosthetic heart valve that is at least partially formed of a biomedical material and is partially or fully coated with a biocompatible material, and more particularly to a prosthetic heart valve that is at least partially coated with an enhancement layer. The enhancement layer can be used to reduce structural valve disease.

BACKGROUND OF DISCLOSURE

Stainless steel, cobalt-chromium alloys, TiNi alloys, and TiAlV alloys are some of the more common metal alloys used for medical devices. For prosthetic heart valves, cobalt-chromium alloys and TiNi alloys (e.g., Nitinol) are by far the most common metal alloys used for form the frame of the prosthetic heart valve. Although these metal alloys have been successful in forming a variety of medical devices, these alloys have several deficiencies.

When a medical device is inserted into a patient, it is typically desirable for the medical device to resist ionization and/or corrosion while in the patient so as to not subject the patient to metal ions and/or oxides from the metals used to form the medical device while in the patient. Excessive ion release from the medical device can potentially be adverse to the patient. Although tradition materials such as stainless steel (316L), cobalt-chromium alloys (e.g., MP35N, etc.), Nitinol, TiAlV alloys are relatively stable when inserted into patients, some degree of metal ion release occurs when the medical device is located in the patient. However, many of the common metal alloys used for implantable medical devices include chromium and/or nickel; two elements that can cause adverse reactions in some patients. For example, nickel and/or cobalt ion release from metal alloys that includes one or both of such metals can result in allergic reaction with surrounding tissue that can in turn result in the failure of the implant.

Medical devices such as Transcatheter aortic valves (TAVs) represent a significant advancement in prosthetic heart valve technology. TAVs bring the benefit of heart valve replacement to patients that would otherwise not be operated on. Transcatheter aortic valve replacement (TAVR) can be used to treat aortic valve stenosis in patients who are classified as high-risk for open heart surgical aortic valve replacement (SAVR). Non-limiting TAVs are disclosed in U.S. Pat. Nos. 5,411,522; 6,730,118; 10,729,543; 10,820,993; 10,856,970; 10,869,761; 10,952,852; 10,980,632; 10,980,633; and US Pub. No. 2020/0405482, all of which are incorporated fully herein by reference. The frame material used to form the TAV is typically TiAlV alloy, CoCr alloy or Nitinol™. The vast majority of cardiovascular implants include valves that are made at least in part by using a CoCr alloy or Nitinol materials for construction of the structural frame of the valve.

A TAV is designed to be compressed into a small diameter catheter, remotely placed within a patient's diseased aortic valve to take over the function of the native valve. Some TAVs are balloon-expandable, while others are self-expandable. In both cases, the TAVs are deployed within a calcified native valve that is forced permanently open and becomes the surface against which the frame is held in place by friction. TAVs can also be used to replace failing bioprosthetic or transcatheter valves, commonly known as a valve in valve procedure. Major TAVR advantages to the traditional surgical approaches include refraining from cardio-pulmonary bypass, aortic cross-clamping and sternotomy which significantly reduces patients' morbidity.

However, several complications are associated with current TAV devices such as leaflet failure as a result of cells about the TAV device growing onto the frame and leaflets and ultimately interfering with the proper operation of the TAV which ultimately leads to structural valve disease (e.g., device failure or structural valve disease).

In view of the current state of the art of prosthetic heart valves, there is a need for an improved heart valve that a) has reduced metal ion release as compared to medical devices formed of stainless steel, cobalt-chromium alloys, TiNi alloys, or TiAlV alloys, and/or b) addresses the problems associated with structural valve disease.

SUMMARY OF THE DISCLOSURE

The present disclosure is direct to a prosthetic heart valve that is at least partially made of a biomedical material and a biologically compatible coating, and more particularly to a medical device that includes biologically compatible coating. The medical device can include, but is not limited to, a PFO (patent foramen ovale) device; stent (e.g., stent for used in aortic, iliac, subclavian, carotid, femoral artery, tibial, intracranial arteries, etc.); aneurysm exclusion devices (e.g., devices for aneurysm for use in aorta, iliac, intracranial arteries, etc.); valve (e.g., heart valve, TAVR valve, aortic, mitral valve replacement, tricuspid valve replacement, pulmonary valve replacement, etc.); anchoring devices for valves (e.g., anchoring devices for heart valve, TAVR valve, aortic valve, mitral valve, tricuspid valve, pulmonary valve, etc.); valve frames; occluders (e.g., occluders for patent foramen ovale, ventricular septal defect, left atrial appendage, etc.); guide wire; vascular implant; graft; guide wire; sheath, expandable sheath; catheter; needle; stent catheter; electrophysiology catheter; hypotube; staple; cutting device; pacemaker; dental implant; dental crown; dental braces; wire used in medical procedures; spinal implant; spinal discs; frame and other structure for use with a spinal implant; bone implant; artificial disk; artificial spinal disk; spinal interbody; expandable spinal interbody; interbody fusion device; expandable interbody fusion device; prosthetic implant or device to repair, replace and/or support a bone (e.g., acromion, atlas, axis, calcaneus, carpus, clavicle, coccyx, epicondyle, epitrochlea, femur, fibula, frontal bone, greater trochanter, humerus, ilium, ischium, mandible, maxilla, metacarpus, metatarsus, occipital bone, olecranon, parietal bone, patella, phalanx, radius, ribs, sacrum, scapula, sternum, talus, tarsus, temporal bone, tibia, ulna, zygomatic bone, etc.) and/or cartilage; sutures; surgical staples; bone plate; knee replacement; hip replacement; shoulder replacement; ankle replacement; nail; rod; screw; post; cage; expandable cage; expandable orthopedic insert; plate (e.g., bone plate, cervical plate, spinal plate, etc.); bone plate nail; spinal rod; bone screw; post; spinal cage; pedicle screw; cap; hinge; joint system; screw extension; tulip extension; tether; graft; anchor; spacer; shaft; disk; ball; tension band; locking connector or other structural assembly that is used in a body to support a structure, mount a structure, and/or repair a structure in a body such as, but not limited to, a human body, animal body, etc. In one non-limiting embodiment, the medical device includes an expandable frame, more particularly the medical device is in the form of a cardiovascular implant for the treatment of structural heart disease wherein the cardiovascular implant includes an expandable frame, and still more particularly to a medical device is in the form of a prosthetic heart valve for the for the treatment of structural heart disease wherein the prosthetic heart valve includes an expandable frame that is formed of a rhenium containing metal alloy. Although the medical device will be particularly discussed with reference to a prosthetic heart valve, it will be appreciated by one skilled in the art that several of the features discussed herein such as to, but limited to, alloy composition, coatings on one or more portions of the medical device, alloy processing methods, processing methods to form all or a portion of the medical device, etc. can be used with other types of medical devices. In another non-limiting embodiment, there is provided a prosthetic heart valve that is at least partially (e.g. 1-99.999 wt. % and all values and ranges therebetween) or fully formed of a material that is coated with an enhancement layer used to a) reduced metal ion release of the metal material from the frame of the prosthetic heart valve, b) reduce the rate of corrosion on the metal that forms the frame of the prosthetic heart valve and/or c) reduces the rate of structural valve disease (SVD) or valve structural deterioration. Prosthetic heart valve structural deterioration is due in part to the poor hemocompatibility, poor cytocompatibility, and the susceptibility of prosthetic heart valve components to excessive tissue proliferation, inflammatory response, and/or an unfavorable healing environment. In one non-limiting embodiment of the disclosure, prosthetic heart valve structural deterioration is inhibit or reduced by i) reducing neointimal hyperplasia/cell overgrowth onto one or more portions of the prosthetic heart valve after implantation in the treatment area, ii) reducing infection about the prosthetic heart valve after implantation in the treatment area, iii) reducing platelet activation about the prosthetic heart valve after implantation in the treatment area, iv) reducing thrombosis about the prosthetic heart valve after implantation in the treatment area, v) reducing restenosis about the prosthetic heart valve after implantation in the treatment area, vi) reducing the incidence of nickel exposure and/or ion release from the frame of the prosthetic heart valve that can react with cells about the prosthetic heart valve after implantation in the treatment area, vii) reducing inflammatory cell response about the prosthetic heart valve after implantation in the treatment area, and/or viii) promoting endothelial cell angiogenesis about the prosthetic heart valve after implantation in the treatment area. In another non-limiting embodiment, the enhancement layer on one or more portions of the prosthetic heart valve is formulated to provide and/or promote generation of nitric oxide near, at and/or in adjacent tissue. Nitric oxide can reduce neointimal hyperplasia, reduce tissue proliferation, reduce platelet activation, reduce thrombosis, reduce restenosis, and can promote endothelial cell angiogenesis, all of which can contribute to an improved pro-healing environment. In another non-limiting embodiment, the enhancement layer provides, promotes and/or facilitates in a) formation or generation of nitric oxide (NO), b) stimulation of endothelial cells, and/or c) a modulation of endothelial cells. In one non-limiting arrangement, there is provided a metal oxynitride layer that is deposited a portion or all of the prosthetic heart valve. For example, the metal oxynitride layer can be deposited on a portion or all of the outer surface of a) the frame of the prosthetic heart valve, b) the inner skirt of the prosthetic heart valve, c) the outer skirt of the prosthetic heart valve, and/or d) the one or more leaflets of the prosthetic heart valve. In one non-limiting specific configuration, the metal oxynitride layer is or includes titanium oxynitride and/or zirconium oxynitride. In another non-limiting specific configuration, the thickness of the metal oxynitride layer is at least 10 nanometers (e.g., 10 nanometers to 10 microns and all values and ranges therebetween). In one non-limiting specific configuration, the oxygen to nitrogen atomic ratios of the metal oxynitride layer is 1:10 to 10:1 (and all values and ranges therebetween). In another non-limiting specific configuration, the layer of metal oxynitride layer is optionally deposited onto a metallic adhesion layer in between the base substrate (e.g., frame, inner skirt, outer skirt, one or more leaflets, etc.) and the oxynitride layer, and wherein the adhesion layer optionally is or includes titanium metal and/or zirconium metal, and wherein the adhesion layer optionally has a thickness of 10 nanometers (e.g., 10 to 500 nanometers and all values and ranges therebetween). When the metal oxynitride layer is deposited on a portion or all of the outer surface of a) the frame of the prosthetic heart valve, b) the inner skirt of the prosthetic heart valve, c) the outer skirt of the prosthetic heart valve, and/or d) the one or more leaflets of the prosthetic heart valve, the metal oxynitride layer can be used to at least partially reduces the rate of structural valve disease (SVD) by i) having the outer surface of the deployed prosthetic heart valve frame that is partially or fully coated with the metal oxynitride layer to be at least partially in direct contact with the native endothelial cells of the heart valve, ii) having the outer surface of the deployed prosthetic heart valve outer skirt that is partially or fully coated with the metal oxynitride layer to be at least partially in direct contact with the native endothelial cells of the heart valve, iii) having the outer surface of the deployed prosthetic heart valve frame that is partially or fully coated with the metal oxynitride layer to be at least partially in direct contact with the native endothelial cells of the heart valve and the blood stream that flows through the heart valve, and/or iv) having the outer surface of the deployed prosthetic heart valve outer skirt that is partially or fully coated with the metal oxynitride layer to be at least partially in direct contact with the native endothelial cells of the heart valve and the blood stream that flows through the heart valve. Nitric oxide (NO) is a short-lived, gaseous, signal molecule responsible for a plurality of cellular functions throughout the human body. NO is endogenously biosynthesized from L-arginine, oxygen, and NADPH inputs via the Nitric Oxide Synthase enzyme family. In the cardiovascular system, NO acts as a potent vasodilator. NO is also involved in cellular repair during vascular damage. A primary effect of NO is binding to Soluble Guanylyl Cyclase (sGC) activating synthesis of a downstream signaling molecule Cyclic Guanosine Monophosphate (cGMP). CGMP is subsequently responsible for downregulation of factors responsible for platelet aggregation, apoptosis, inflammation, and tissue remodeling. cGMP is also responsible for upregulation of factors responsible for vasodilation. Examples of direct nitric oxide donors includes agents with nitroso or nitrosyl functional groups that spontaneously release nitric oxide. Examples of metabolic nitric oxide donors include agents with organic nitrate and nitrite esters requiring enzymatic metabolism to generate bioactive nitric oxide. Examples of bifunctional nitric oxide donors include agents with nitrate esters and S-nitrosothiols that release nitric oxide simultaneously with performing additional pharmacological benefits. The enhancement layer and/or the metallic adhesion layer can be applied by use of a vacuum coating process (e.g., physical vapor deposition (PVD) process (e.g., sputter deposition, cathodic arc deposition or electron beam heating, etc.), chemical vapor deposition (CVD) process, atomic layer deposition (ALD) process, or a plasma-enhanced chemical vapor deposition (PECVD) process), plating process, etc.

In accordance with one non-limiting aspect of the present disclosure, the prosthetic heart valve is not limited to a TAV, but can be mitral valve replacement, tricuspid valve replacement, pulmonary or valve replacement. The prosthetic heart valve includes a radially collapsible and expandable frame and a leaflet structure that comprises a plurality of leaflets. In another non-limiting embodiment, the prosthetic heart valve optionally includes an annular skirt or cover member that is disposed on and partially or fully covering or overlaid over the cells of at least a portion of the frame. In another non-limiting embodiment, the frame of the prosthetic heart valve comprises a plurality of interconnected axial longitudinal member, angular articulating members and strut joints that define a plurality of open cells in the frame. The frame is partially (e.g., 1-99.999 wt. % and all values and ranges therebetween) or fully made of a metal material.

In accordance with another and/or alternative non-limiting aspect of the present disclosure, there is provided a prosthetic heart valve that includes a frame, a leaflet structure supported by the frame, and an optional inner skirt secured to the surface of the frame and/or leaflet structure. The prosthetic heart valve can be implanted in the annulus of the native aortic valve; however, the prosthetic heart valve also can be configured to be implanted in other valves of the heart (e.g., tricuspid valve, pulmonary valve, mitral valve). The prosthetic heart valve has a "lower" end and an "upper" end, wherein the lower end of the prosthetic heart valve is the inflow end and the upper end of the prosthetic heart valve is the outflow end. The metal alloy that is used to partially or fully form the frame of the prosthetic heart valve is configured to be radially collapsible to a collapsed or crimped state for introduction into the body (e.g., on a delivery catheter, etc.) and radially expandable to an expanded state for implanting the prosthetic heart valve at a desired location in the body (e.g., the aortic valve, tricuspid valve, pulmonary valve, mitral valve, etc.). The frame of the prosthetic heart valve can be formed of a plastically-expandable material that permits crimping of the frame to a smaller profile for delivery and expansion of the frame at the treatment site. The expansion of the crimped frame of the prosthetic heart valve can be by an expansion device such as, but not limited to, a balloon of on a balloon catheter; however, the frame can optionally be partially (e.g., 1-99.999 wt. % and all values and ranges therebetween) or fully formed of a self-expanding material (e.g., Nitinol, etc.). The frame can be at least partially (e.g., 1-99.999 wt. % and all values and ranges therebetween) formed of a plurality of angularly spaced, vertically extending posts, and/or struts. The posts and/or struts can optionally be interconnected via a lower row of circumferentially extending struts and an upper row of circumferentially extending struts via strut joints. The struts can be arrangement in a variety of patterns (e.g., zig-zag pattern, saw-tooth pattern, triangular pattern, polygonal pattern, oval pattern, etc.). One or more of the posts and/or struts can have the same or different thicknesses and/or cross-sectional shape and/or cross-sectional area.

In accordance with another and/or alternative non-limiting aspect of the present disclosure, there is provided a prosthetic heart valve that includes an inner skirt that can be formed of a variety of flexible materials (e.g., polymer [e.g., polyethylene terephthalate (PET), polyester, nylon, Kevlar®, silicon, etc.], composite material, metal, fabric material, etc.). In one non-limiting embodiment, the material used to partially (e.g., 1-99.999 wt. % and all values and ranges therebetween) or fully form the inner skirt can optionally be substantially non-elastic (i.e., substantially non-stretchable and non-compressible). In another non-limiting embodiment, the material used to partially or fully form the inner skirt can optionally be a stretchable and/or compressible material (e.g., silicone, PTFE, ePTFE, polyurethane, polyolefins, hydrogels, biological materials [e.g., pericardium or biological polymers such as collagen, gelatin, or hyaluronic acid derivatives], etc.). The inner skirt can optionally be formed from a combination of a cloth or fabric material that is coated with a flexible material or with a stretchable and/or compressible material so as to provide additional structural integrity to the inner skirt. The size, configuration, and thickness of the inner skirt is non-limiting (e.g., thickness of 0.1-20 mils and all values and ranges therebetween). The inner skirt can be secured to the inside and/or outside of the frame using various means (e.g., sutures, clamp arrangement, etc.).

In accordance with another and/or alternative non-limiting aspect of the present disclosure, there is provided a prosthetic heart valve that optionally includes an inner skirt that can be used to 1) at least partially seal and/or prevent perivalvular leakage, 2) at least partially secure the leaflet structure to the frame, 3) at least partially protect the leaflets from damage during the crimping and/or expansion process, and/or 4) at least partially protect the leaflets from damage during the operation of the prosthetic heart valve in the heart.

In accordance with another and/or alternative non-limiting aspect of the present disclosure, there is provided a prosthetic heart valve that optionally includes an outer or sleeve that is positioned at least partially (e.g., 1-99.999 wt. % and all values and ranges therebetween) about the exterior region of the frame. The outer skirt or sleeve generally is positioned completely around a portion of the outside of the frame. Generally, the outer skirt is positioned about the lower portion of the frame, but does not fully cover the upper half of the frame; however, this is not required. The outer skirt can be connected to the frame by a variety of arrangements (e.g., sutures, adhesive, melted connection, clamping arrangement, etc.). At least a portion of the outer skirt can optionally be located on the interior surface of the frame. Generally, the outer skirt is formed of a more flexible and/or compressible material than the inner skirt; however, this is not required. The outer skirt can be formed of a variety of a stretchable and/or compressible material (e.g., silicone, PTFE, ePTFE, polyurethane, polyolefins, hydrogels, biological materials [e.g., pericardium or biological polymers such as collagen, gelatin, or hyaluronic acid derivatives], etc.). The outer skirt can optionally be formed from a combination of a cloth or fabric material that is coated with the stretchable and/or compressible material to provide additional structural integrity to the outer skirt. The size, configuration, and thickness of the outer skirt is non-limiting. The thickness of the outer skirt is generally at least 0.1 mils (e.g., 0.1-20 mils and all values and ranges therebetween).

In accordance with another and/or alternative non-limiting aspect of the present disclosure, there is provided a prosthetic heart valve that includes a leaflet structure that can be can be attached to the frame and/or skirt. The connection arrangement used to secure the leaflet structures to the frame and/or skirt is non-limiting (e.g., sutures, staples, melted bold, adhesive, clamp arrangement, etc.). The material used to form the leaflet structures include bovine pericardial tissue, biocompatible synthetic materials, or various other suitable natural or synthetic materials.

In accordance with another and/or alternative non-limiting aspect of the present disclosure, there is provided a prosthetic heart valve that includes a leaflet structure comprised of two or more leaflets (e.g., 2, 3, 4, 5, 6, etc.). In one non-limiting arrangement, the leaflet structure includes three leaflets arranged to collapse in a tricuspid arrangement. The configuration of the leaflet structures is non-limiting.

In accordance with another and/or alternative non-limiting aspect of the present disclosure, there is provided a prosthetic heart valve that includes a leaflet structure wherein the leaflets of the leaflet structure can optionally be secured to one another at their adjacent sides to form commissures of the leaflet structure (the edges where the leaflets come together). The leaflet structure can be secured together by a variety of connection arrangement (e.g., sutures, adhesive, melted bond, clamping arrangement, etc.).

In accordance with another and/or alternative non-limiting aspect of the present disclosure, there is provided a prosthetic heart valve that includes a leaflet structure wherein one or more of the leaflets can optionally include reinforcing structures or strips to 1) facilitate in securing the leaflets together, 2) facilitate in securing the leaflets to the skirt and/or frame, and/or 3) inhibit or prevent tearing or other types of damage to the leaflets.

In accordance with another and/or alternative non-limiting aspect of the present disclosure, there is provided a method for crimping a prosthetic heart valve having a frame. The method includes placing the prosthetic heart valve in the crimping aperture of a crimping device such that the frame of the prosthetic heart valve is disposed adjacent to the crimping jaws of the crimping device. Pressure is applied against the frame with the crimping jaws to radially crimp the prosthetic heart valve to a smaller profile.

In accordance with another and/or alternative non-limiting aspect of the present disclosure, the frame of the prosthetic heart valve is partially (e.g. 1-99.999 wt. % and all values and ranges therebetween) or fully formed of a metal material that includes a) stainless steel, b) CoCr alloy, c) TiAlV alloy, d) aluminum alloy, e) nickel alloy, f) titanium alloy, g) tungsten alloy, h) molybdenum alloy, i) copper alloy, j) beryllium-copper alloy, k) titanium-nickel alloy, 1) refractory metal alloy, or m) metal alloy (e.g., stainless steel, CoCr alloy, TiAlV alloy, aluminum alloy, nickel alloy, titanium alloy, tungsten alloy, molybdenum alloy, copper alloy, beryllium-copper alloy, titanium-nickel alloy, refractory metal alloy, etc.) that includes at least 5 atomic weight percent (awt. %) or atomic percent (awt. %) rhenium (e.g., 5-99 awt. % rhenium and all values and ranges therebetween). As used herein, atomic weight percent (awt. %) or atomic percentage (awt %) or atomic percent (awt. %) are used interchangeably. As defined herein, the weight percentage (wt. %) of an element is the weight of that element measured in the sample divided by the weight of all elements in the sample multiplied by 100. The atomic percentage or atomic weight percent (awt. %) is the number of atoms of that element, at that weight percentage, divided by the total number of atoms in the sample multiplied by 100. The use of the terms weight percentage (wt. %) and atomic percentage or atomic weight percentage (awt. %) are two ways of referring to metallic alloy and its constituents. It has been found that for several metal alloys the inclusion of at least 15 awt. % rhenium results in the ductility and/or tensile strength of the metal alloy to improve as compared to a metal alloy is that absent rhenium. Such improvement in ductility and/or tensile strength due to the inclusion of at least 15 awt. % rhenium in the metal alloy is referred to as the "rhenium effect." As defined herein, a "rhenium effect" is a) an increase of at least 10% in ductility of the metal alloy caused by the addition of rhenium to the metal alloy, and/or b) an increase of at least 10% in tensile strength of the metal alloy caused by the addition of rhenium to the metal alloy. As defined herein, a refractory metal alloy is a metal alloy that includes at least 20 wt. % of one or more of molybdenum, rhenium, niobium, tantalum or tungsten. Non-limiting refractory metal alloys include MoRe alloy, ReW alloy, MoReCr alloy, MoReTa alloy, MoReTi alloy, WCu alloy, ReCr, molybdenum alloy, rhenium alloy, tungsten alloy, tantalum alloy, niobium alloy, etc. In one non-limiting arrangement, 50-100 wt. % (and all values and ranges therebetween) of the expandable frame of the prosthetic heart valve is formed of a refractory metal alloy or a metal alloy that includes at least 15 awt. % rhenium. In another non-limiting arrangement, the metal alloy that is used to partially or fully form the expandable frame of the prosthetic heart valve includes at least 30 wt. % (e.g., 30-99 wt. % and all values and ranges therebetween) of one or more of molybdenum, rhenium, niobium, tantalum or tungsten. In another non-limiting embodiment, the refractory metal alloy or the metal alloy that includes at least 15 awt. % rhenium can be used to 1) increase the radiopacity of the frame of the prosthetic heart valve, 2) increase the radial strength of the frame of the prosthetic heart valve, 3) increase the yield strength and/or ultimate tensile strength of the frame of the prosthetic heart valve, 4) improve the stress-strain properties of the frame of the prosthetic heart valve, 5) improve the crimping and/or expansion properties of the frame of the prosthetic heart valve, 6) improve the bendability and/or flexibility of the frame of the prosthetic heart valve, 7) improve the strength and/or durability of the frame of the prosthetic heart valve, 8) increase the hardness of the frame of the prosthetic heart valve, 9) improve the biostability and/or biocompatibility properties of the frame of the prosthetic heart valve, 10) increase fatigue resistance of the frame of the prosthetic heart valve, 11) resist cracking in the frame of the prosthetic heart valve, 12) resist propagation of cracks in the frame of the prosthetic heart valve, 13) enable smaller, thinner, and/or lighter weight frames of the prosthetic heart valve to be made, 14) facilitate in the reduction of the outer diameter of a crimped prosthetic heart valve, 15) improve the conformity of the frame of the prosthetic heart valve to the shape of the treatment area when the prosthetic heart valve is expanded in the treatment area, 16) reduce the amount of recoil of the frame of the prosthetic heart valve after the frame is expanded in the treatment area, 17) reduce adverse tissue reactions with the frame of the prosthetic heart valve, 18) reduce metal ion release from the frame after implantation of the prosthetic heart valve, 19) reduce corrosion of the frame of the prosthetic heart valve after implantation of the prosthetic heart valve, 20) reduce allergic reaction with the frame of the prosthetic heart valve after implantation of the prosthetic heart valve (e.g., reduce nickel content of metal alloy, etc.), 21) improve hydrophilicity of the frame of the prosthetic heart valve, 22) reduce magnetic susceptibility of the frame of the prosthetic heart valve, 23) reduced longitudinal foreshortening the frame of the prosthetic heart valve when the frame of the prosthetic heart valve is expanded, and/or 24) reduce toxicity of the frame of the prosthetic heart valve after implantation of the prosthetic heart valve.

In another and/or alternative non-limiting aspect of the disclosure, the frame of the prosthetic heart valve is optionally partially or fully formed of stainless steel, CoCr alloys, TiAlV alloys, aluminum alloys, nickel alloys, titanium alloys, tungsten alloys, molybdenum alloys, copper alloys, MP35N alloys, beryllium-copper alloys that have been modified to include at least 15 awt. % rhenium so as to result in improved ductility and/or tensile strength as compared to the same metal alloy that is absent rhenium. As defined herein, a stainless-steel alloy (SS alloy) includes at least 50 wt. % (weight percent) iron, 10-28 wt. % chromium, 0-35 wt. % nickel, and optionally one or more of 0-4 wt. % molybdenum, 0-2 wt. % manganese, 0-0.75 wt. % silicon, 0-0.3 wt. % carbon, 0-5 wt. % titanium, 0-10 wt. % niobium, 0-5 wt. % copper, 0-4 wt. % aluminum, 0-10 wt. % tantalum, 0-1 wt. % Se, 0-2 wt. % vanadium, and 0-2 wt. % tungsten. A 316L alloy that falls within a stainless-steel alloy includes 17-19 wt. % chromium, 13-15 wt. % nickel, 2-4 wt. % molybdenum, 2 wt. % max manganese, 0.75 wt. % max silicon, 0.03 wt. % max carbon, balance iron. As defined herein, a cobalt-chromium alloy (CoCr alloy) includes 30-68 wt. % cobalt, 15-32 wt. % chromium, and optionally one or more of 1-38 wt. % nickel, 2-18 wt. % molybdenum, 0-18 wt. % iron, 0-1 wt. % titanium, 0-0.15 wt. % manganese, 0-0.15 wt. % silver, 0-0.25 wt. % carbon, 0-16 wt. % tungsten, 0-2 wt. % silicon, 0-2 wt. % aluminum, 0-1 wt. % iron, 0-0.1 wt. % boron, 0-0.15 wt. % silver, and 0-2 wt. % titanium. As a MP35N alloy that falls within a CoCr alloy includes 18-22 wt. % chromium, 32-38 wt. % nickel, 8-12 wt. % molybdenum, 0-2 wt. % iron, 0-0.5 wt. % silicon, 0-0.5 wt. % manganese, 0-0.2 wt. % carbon, 0-2 wt. % titanium, 0-0.1 wt. %, 0-0.1 wt. % boron, 0-0.15 wt. % silver, and balance cobalt. As defined herein, a Phynox and Elgiloy alloy that falls within a CoCr alloy includes 38-42 wt. % cobalt, 18-22 wt. % chromium, 14-18 wt. % iron, 13-17 wt. % nickel, 6-8 wt. % molybdenum. As defined herein, a L605 alloy that falls within a CoCr alloy includes 18-22 wt. % chromium, 14-16 wt. % tungsten, 9-11 wt. % nickel, balance cobalt. As defined herein, a titanium-aluminum-vanadium alloy (TiAlV alloy) includes 4-8 wt. % aluminum, 3-6 wt. % vanadium, 80-93 wt. % titanium, and optionally one or more of 0-0.4 wt. % iron, 0-0.2 wt. % carbon, 0-0.5 wt. % yttrium. A Ti-6Al-4V alloy that falls with a TiAlV alloy includes incudes 3.5-4.5 wt. % vanadium, 5.5-6.75 wt. % aluminum, 0.3 wt. % max iron, 0.08 wt. % max carbon, 0.05 wt. % max yttrium, balance titanium. As defined herein, an aluminum alloy includes 80-99 wt. % aluminum, and optionally one or more 0-12 wt. % silicon, 0-5 wt. % magnesium, 0-1 wt. % manganese, 0-0.5 wt. % scandium, 0-0.5 wt. % beryllium, 0-0.5 wt. % yttrium, 0-0.5 wt. % cerium, 0-0.5 wt. % chromium, 0-3 wt. % iron, 0-0.5, 0-9 wt. % zinc, 0-0.5 wt. % titanium, 0-3 wt. % lithium, 0-0.5 wt. % silver, 0-0.5 wt. % calcium, 0-0.5 wt. % zirconium, 0-1 wt. % lead, 0-0.5 wt. % cadmium, 0-0.05 wt. % bismuth, 0-1 wt. % nickel, 0-0.2 wt. % vanadium, 0-0.1 wt. % gallium, and 0-7 wt. % copper. As defined herein, a nickel alloy includes 30-98 wt. % nickel, and optionally one or more 5-25 wt. % chromium, 0-65 wt. % iron, 0-30 wt. % molybdenum, 0-32 wt. % copper, 0-32 wt. % cobalt, 2-2 wt. % aluminum, 0-6 wt. % tantalum, 0-15 wt. % tungsten, 0-5 wt. % titanium, 0-6 wt. % niobium, 0-3 wt. % silicon. As defined herein, a titanium alloy includes 80-99 wt. % titanium, and optionally one of more of 0-6 wt. % aluminum, 0-3 wt. % tin, 0-1 wt. % palladium, 0-8 wt. % vanadium, 0-15 wt. % molybdenum, 0-1 wt. % nickel, 0-0.3 wt. % ruthenium, 0-6 wt. % chromium, 0-4 wt. % zirconium, 0-4 wt. % niobium, 0-1 wt. % silicon, 0.0.5 wt. % cobalt, 0-2 wt. % iron. As defined herein, a tungsten alloy includes 85-98 wt. % tungsten, and optionally one or more of 0-8 wt. % nickel, 0-5 wt. % copper, 0-5 wt. % molybdenum, 0-4 wt. % iron. As defined herein, a molybdenum alloy includes 90-99.5 wt. % molybdenum, and optionally one or more of 0-1 wt. % nickel, 0-1 wt. % titanium, 0-1 wt. % zirconium, 0-30 wt. % tungsten, 0-2 wt. % hafnium, 0-2 wt. % lanthanum. As defined herein, a copper alloy includes 55-95 wt. % copper, and optionally one or more of 0-40 wt. % zinc, 0-10 wt. % tin, 0-10 wt. % lead, 0-1 wt. % iron, 0-5 wt. % silicon, 0-12 wt. % manganese, 0-12 wt. % aluminum, 0-3 wt. % beryllium, 0-1 wt. % cobalt, 0-20 wt. % nickel. As defined herein, a beryllium-copper alloy includes 95-98.5 wt. % copper, 1-4 wt. % beryllium, and optionally one or more of 0-1 wt. % cobalt, and 0-0.5 wt. % silicon. As defined herein, a titanium-nickel alloy (e.g., Nitinol alloy) includes 42-58 wt. % nickel and 42-58 wt. % titanium.

In accordance with another and/or alternative non-limiting aspect of the present disclosure, the frame of the prosthetic heart valve is partially or fully formed of a metal material that includes a metal alloy that contains at least 15 awt. % rhenium. It has been found that for several metal alloys the inclusion of at least 15 awt %. It has been found for some metal alloys (e.g., stainless steel, CoCr alloys, TiAlV alloys, aluminum alloys, nickel alloys, titanium alloys, tungsten alloys, molybdenum alloys, copper alloys, MP35N alloys, beryllium-copper alloys, etc.), the inclusion of at least 15 awt. % rhenium results in improved ductility and/or tensile strength. It has been found that the addition of rhenium to a metal alloy can result in the formation of a twining alloy in the metal alloy that results in the overall ductility of the metal alloy to increase as the yield and tensile strength increases as a result of reduction and/or work hardening of the metal alloy that includes the rhenium addition. The rhenium effect has been found to occur when the atomic weight of rhenium in the metal alloy is at least 15 awt. % (e.g., 15-99 awt. % rhenium in the metal alloy and all values and ranges therebetween). For example, for stainless-steel alloys, the rhenium effect can begin to be present when the stainless-steel alloy is modified to include a rhenium amount of at least 5-10 wt. % (and all values and ranges therebetween) of the stainless-steel alloy. For CoCr alloys, the rhenium effect can begin to be present when the CoCr alloy is modified to include a rhenium amount of at least 4.8-9.5 wt. % (and all values and ranges therebetween) of the CoCr alloy. For TiAlV alloys, the rhenium effect can begin to be present when the TiAlV alloy is modified to include a rhenium amount of at least 4.5-9 wt. % (and all values and ranges therebetween) of the TiAlV alloy. It can be appreciated, the rhenium content in the above non-limiting examples can be greater than the minimum amount to create the rhenium effect in the metal alloy.

In accordance with another and/or alternative aspect of the present disclosure, the metal alloy that is used to partially or fully form the frame of the prosthetic heart valve includes at least 5 awt. % (e.g., 5-99 awt. % and all values and ranges therebetween) rhenium, and 0.1-96 wt. % (and all values and ranges therebetween) of one or more additives selected from the group of aluminum, boron, beryllium, bismuth, cadmium, calcium, cerium, chromium, cobalt, copper, gallium, gold, hafnium, iridium, iron, lanthanum, lithium, magnesium, manganese, molybdenum, nickel, niobium, osmium, palladium, platinum, rare earth metals, rhodium, ruthenium, scandium, silver, silicon, tantalum, technetium, tin, titanium, tungsten, vanadium, yttrium, zinc, and/or zirconium, and the metal alloy optionally includes 0-2 wt. % (and all values and ranges therebetween) of a combination of other components other than the additives (e.g., carbon, oxygen, phosphorous, sulfur, hydrogen, lead, nitrogen, etc.), and which metal alloy exhibits a rhenium effect. In one non-limiting embodiment, the metal alloy that is used to partially or fully form the frame of the prosthetic heart valve is a stainless-steel alloy that has been modified to include at least 15 awt. % rhenium. In another non-limiting embodiment, the metal alloy that is used to partially or fully form the frame of the prosthetic heart valve is a cobalt chromium alloy that has been modified to include at least 15 awt. % rhenium. In another non-limiting embodiment, the metal alloy that is used to partially or fully form the frame of the prosthetic heart valve is a TiAlV alloy that has been modified to include at least 15 awt. % rhenium. In another non-limiting embodiment, the metal alloy that is used to partially or fully form the frame of the prosthetic heart valve is an aluminum alloy that has been modified to include at least 15 awt. % rhenium. In another non-limiting embodiment, the metal alloy that is used to partially or fully form the frame of the prosthetic heart valve is a nickel alloy that has been modified to include at least 15 awt. % rhenium. In another non-limiting embodiment, the metal alloy that is used to partially or fully form the frame of the prosthetic heart valve is a titanium alloy that has been modified to include at least 15 awt. % rhenium. In another non-limiting embodiment, the metal alloy that is used to partially or fully form the frame of the prosthetic heart valve is a tungsten alloy that has been modified to include at least 15 awt. % rhenium. In another non-limiting embodiment, the metal alloy that is used to partially or fully form the frame of the prosthetic heart valve is a molybdenum alloy that has been modified to include at least 15 awt. % rhenium. In another non-limiting embodiment, the metal alloy that is used to partially or fully form the frame of the prosthetic heart valve is a copper alloy that has been modified to include at least 15 awt. % rhenium. In another non-limiting embodiment, the metal alloy that is used to partially or fully form the frame of the prosthetic heart valve is a beryllium-copper alloy that has been modified to include at least 15 awt. % rhenium.

In accordance with another and/or alternative aspect of the present disclosure, the metal alloy that is used to partially or fully form the frame of the prosthetic heart valve includes rhenium and molybdenum, and the weight percent of rhenium in the metal alloy is optionally greater than the weight percent of molybdenum in the metal alloy, and the weight percent of one or more additive (e.g., aluminum, boron, beryllium, bismuth, cadmium, calcium, cerium, chromium, cobalt, copper, gallium, gold, hafnium, iridium, iron, lanthanum, lanthanum oxide, lithium, magnesium, manganese, molybdenum, nickel, niobium, osmium, palladium, platinum, rare earth metals, rhodium, ruthenium, scandium, silver, silicon, tantalum, technetium, tin, titanium, tungsten, vanadium, yttrium, zinc, and/or zirconium) in the metal alloy is optionally greater that the weight percent of molybdenum in the metal alloy, and the metal alloy optionally includes 0-2 wt. % of a combination of other components other than the additives (e.g., carbon, oxygen, phosphorous, sulfur, hydrogen, lead, nitrogen, etc.). In one non-limiting embodiment, the metal alloy that is used to partially or fully form the frame of the prosthetic heart valve includes rhenium and molybdenum, and the weight percent of rhenium plus the combined weight percent of additives is greater than the weight percent of molybdenum, and the metal alloy optionally includes 0-2 wt. % of a combination of other components other than the additives (e.g., carbon, oxygen, phosphorous, sulfur, hydrogen, lead, nitrogen, etc.).

In accordance with another and/or alternative aspect of the present disclosure, the metal alloy that is used to partially or fully form the frame of the prosthetic heart valve includes rhenium and molybdenum, and the atomic weight percent of rhenium to the atomic weight percent of the combination of one or more of bismuth, niobium, tantalum, tungsten, titanium, vanadium, chromium, manganese, yttrium, zirconium, technetium, ruthenium, rhodium, hafnium, osmium, copper, and iridium is 0.4:1 to 2.5:1 (and all values and ranges therebetween).

In accordance with another and/or alternative aspect of the present disclosure, the metal alloy that is used to partially or fully form the frame of the prosthetic heart valve includes at least 5 awt. % (e.g., 5-99 awt. % and all values and ranges therebetween) rhenium plus at least two metals selected from the group of molybdenum, bismuth, chromium, iridium, niobium, tantalum, titanium, yttrium, and zirconium, and the content of the metal alloy that includes other elements and compounds is 0-0.1 wt. %. In another non-limiting embodiment, the metal alloy includes rhenium, molybdenum, and chromium. In another non-limiting embodiment, the metal alloy includes at least 35 wt. % (e.g., 35-75 wt. % and all values and ranges therebetween) rhenium, and the metal alloy also includes chromium. In one non-limiting embodiment, the metal alloy includes at least 35 wt. % rhenium and at least 25 wt. % (e.g., 25-49.9 wt. % and all values and ranges therebetween) of the metal alloy includes chromium, and optionally 0.1-40 wt. % (and all values and ranges therebetween) of the metal alloy includes one or more of aluminum, boron, beryllium, bismuth, cadmium, calcium, cerium, chromium, cobalt, copper, gallium, gold, hafnium, iridium, iron, lanthanum, lanthanum oxide, lithium, magnesium, manganese, molybdenum, nickel, niobium, osmium, palladium, platinum, rare earth metals, rhodium, ruthenium, scandium, silver, silicon, tantalum, technetium, tin, titanium, tungsten, vanadium, yttrium, zinc, and/or zirconium, and the metal alloy optionally includes 0-2 wt. % (and all values and ranges therebetween) of a combination of other metals, carbon, oxygen, phosphorous, sulfur, hydrogen and/or nitrogen. In another non-limiting embodiment, the metal alloy includes 15-50 awt. % rhenium (and all values and ranges therebetween) and 0.5-70 awt. % chromium (and all values and ranges therebetween). In another non-limiting embodiment, the metal alloy includes 15-50 awt. % rhenium (and all values and ranges therebetween) and 0.5-70 awt. % tantalum (and all values and ranges therebetween). In another non-limiting embodiment, the metal alloy includes 15-50 awt. % rhenium (and all values and ranges therebetween) and 0.5-70 awt. % niobium (and all values and ranges therebetween). In another non-limiting embodiment, the metal alloy includes 15-50 awt. % rhenium (and all values and ranges therebetween) and 0.5-70 awt. % titanium (and all values and ranges therebetween). In another non-limiting embodiment, the metal alloy includes 15-50 awt. % rhenium (and all values and ranges therebetween) and 0.5-70 awt. % zirconium (and all values and ranges therebetween). In another non-limiting embodiment, the metal alloy includes 15-50 awt. % rhenium (and all values and ranges therebetween) and 0.5-70 awt. % molybdenum (and all values and ranges therebetween). In another non-limiting embodiment, the metal alloy includes at least 15 awt. % rhenium, greater than 50 wt. % titanium (e.g., 51-80 wt. % and all values and ranges therebetween), 15-45 wt. % (and all values and ranges therebetween) niobium, 0-10 wt. % (and all values and ranges therebetween) zirconium, 0-15 wt. % (and all values and ranges therebetween) tantalum, and 0-8 wt. % molybdenum (and all values and ranges therebetween).

In accordance with another and/or alternative aspect of the present disclosure, the metal alloy that is used to partially or fully form the medical device is partially for fully formed of a refractory metal alloy, and wherein the refractory metal alloy includes at least 20 wt. % of one or more of niobium, tantalum or tungsten, and wherein the refractory metal alloy includes 0-30 wt. % molybdenum (and all values and ranges therebetween), and wherein the refractory metal alloy includes at least 5 awt. % rhenium (e.g., 5-80 awt. % rhenium and all values and ranges therebetween).

In accordance with another and/or alternative aspect of the present disclosure, the metal alloy that is used to partially or fully form the medical device is partially for fully formed of a metal alloy includes at least 5 awt. % rhenium (e.g., 5-99 awt. % rhenium and all values and ranges therebetween), and at least 0.1 wt. % of one or more additive metals selected from aluminum, bismuth, chromium, cobalt, copper, hafnium, iridium, iron, magnesium, manganese, nickel, niobium, osmium, rhodium, ruthenium, silicon, silver, tantalum, technetium, titanium, tungsten, vanadium, yttrium, and zirconium, and wherein the metal alloy includes 0-30 wt. % molybdenum (and all values and ranges therebetween), and wherein a combined weight percent of rhenium and the additive metals is 70-100 wt. % (and all values and ranges therebetween).

In accordance with another and/or alternative aspect of the present disclosure, the metal alloy that is used to partially or fully form the medical device is partially for fully formed of a metal alloy of stainless steel that has been modified with at least 5 awt. % rhenium (e.g., 5-50 awt. % rhenium and all values and ranges therebetween), and wherein a combined weight percent of iron, chromium, nickel, tantalum, niobium, copper, manganese, aluminum, titanium, selenium, vanadium, tungsten and rhenium is 70-100 wt. % (and all values and ranges therebetween).

In accordance with another and/or alternative aspect of the present disclosure, the metal alloy that is used to partially or fully form the medical device is partially for fully formed of a metal alloy of cobalt-chromium alloy that has been modified with at least 5 awt. % rhenium (e.g., 5-50 awt. % rhenium and all values and ranges therebetween), and wherein a combined weight percent of cobalt, chromium, nickel, iron, titanium, manganese, silver, tungsten, silicon, aluminum, iron, boron, silver, titanium, and rhenium is 70-100 wt. % (and all values and ranges therebetween).

In accordance with another and/or alternative aspect of the present disclosure, the metal alloy that is used to partially or fully form the medical device is partially for fully formed of a metal alloy of titanium-aluminum-vanadium alloy that has been modified with at least 5 awt. % rhenium (e.g., 5-50 awt. % rhenium and all values and ranges therebetween), and wherein a combined weight percent of aluminum, vanadium, titanium, iron, yttrium and rhenium is 70-100 wt. % (and all values and ranges therebetween).

In accordance with another and/or alternative aspect of the present disclosure, the metal alloy that is used to partially or fully form the medical device is partially for fully formed of a metal alloy of aluminum alloy that has been modified with at least 5 awt. % rhenium (e.g., 5-50 awt. % rhenium and all values and ranges therebetween), and wherein a combined weight percent of aluminum, silicon, magnesium, manganese, scandium, beryllium, yttrium, cerium, chromium, iron, zinc, titanium, lithium, silver, calcium, zirconium, cadmium, bismuth, nickel, vanadium, gallium, copper, and rhenium is 70-100 wt. % (and all values and ranges therebetween).

In accordance with another and/or alternative aspect of the present disclosure, the metal alloy that is used to partially or fully form the medical device is partially for fully formed of a metal alloy of nickel alloy that has been modified with at least 5 awt. % rhenium (e.g., 5-50 awt. % rhenium and all values and ranges therebetween), and wherein a combined weight percent of nickel, chromium, iron, copper, cobalt, aluminum, tantalum, tungsten, titanium, niobium, silicon, and rhenium is 70-100 wt. % (and all values and ranges therebetween).

In accordance with another and/or alternative aspect of the present disclosure, the metal alloy that is used to partially or fully form the medical device is partially for fully formed of a metal alloy of titanium alloy that has been modified with at least 5 awt. % rhenium (e.g., 5-50 awt. % rhenium and all values and ranges therebetween), and wherein a combined weight percent of titanium, aluminum, tin, palladium, vanadium, nickel, ruthenium, chromium, zirconium, niobium, silicon, cobalt, iron, and rhenium is 70-100 wt. % (and all values and ranges therebetween).

In accordance with another and/or alternative aspect of the present disclosure, the metal alloy that is used to partially or fully form the medical device is partially for fully formed of a metal alloy of tungsten alloy that has been modified with at least 5 awt. % rhenium (e.g., 5-50 awt. % rhenium and all values and ranges therebetween), and wherein a combined weight percent of tungsten, nickel, copper, iron, and rhenium is 70-100 wt. % (and all values and ranges therebetween).

In accordance with another and/or alternative aspect of the present disclosure, the metal alloy that is used to partially or fully form the medical device is partially for fully formed of a metal alloy of copper alloy that has been modified with at least 5 awt. % rhenium (e.g., 5-50 awt. % rhenium and all values and ranges therebetween), and wherein a combined weight percent of copper, zinc, tin, iron, silicon, manganese, aluminum, beryllium, cobalt, nickel, and rhenium is 70-100 wt. % (and all values and ranges therebetween).

In accordance with another and/or alternative aspect of the present disclosure, the metal alloy that is used to partially or fully form the medical device is partially for fully formed of a metal alloy of beryllium-copper alloy that has been modified with at least 5 awt. % rhenium (e.g., 5-50 awt. % rhenium and all values and ranges therebetween), and wherein a combined weight percent of copper, beryllium, cobalt, silicon, and rhenium is 70-100 wt. % (and all values and ranges therebetween).

In accordance with another and/or alternative aspect of the present disclosure, the metal alloy that is used to partially or fully form the medical device is partially for fully formed of a metal alloy of titanium-nickel alloy that has been modified with at least 5 awt. % rhenium (e.g., 5-50 awt. % rhenium and all values and ranges therebetween), and wherein a combined weight percent of nickel, titanium, and rhenium is 70-100 wt. % (and all values and ranges therebetween).

Several non-limiting examples of metal alloys that can be used to partially or fully form the orthopedic medical device are set forth below in weight percent:

| Component | Wt. % | | | |
|---|---|---|---|---|
| | Ex. 1 | Ex. 2 | Ex. 3 | Ex. 4 |
| A | 0-35% | 0-30% | 0-25% | 0-10% |
| Bi | 0-20% | 0-20% | 0-20% | 0-20% |
| Cr | 0-60% | 0-35% | 0-30% | 0-25% |
| Co | 0-60% | 0-50% | 0-40% | 0-20% |
| Mo | 0-95% | 0-80% | 0-55% | 0-30% |
| Nb | 0-80% | 0-60% | 0-50% | 0-20% |
| Ni | 0-60% | 0-55% | 0-40% | 0-20% |
| Re | 0.1-70% | 4.5-70% | 5-70% | 5-70% |
| Ta | 0-80% | 0-50% | 0-40% | 0-25% |
| Ti | 0-60% | 0-55% | 0-40% | 0-20% |
| V | 0-20% | 0-15% | 0-10% | 0-10% |
| W | 0-80% | 0-70% | 0-50% | 0-20% |
| Y | 0-20% | 0-15% | 0-10% | 0-10% |
| Zr | 0-20% | 0-15% | 0-10% | 0-10% |

| Component | Wt. % | | | |
|---|---|---|---|---|
| | Ex. 5 | Ex. 6 | Ex. 7 | Ex. 8 |
| Ag | 0-20% | 0-20% | 0-20% | 0-20% |
| Al | 0-35% | 0-30% | 5-30% | 0-25% |
| Bi | 0-20% | 0-20% | 0-20% | 0-20% |
| Cr | 10-40% | 0-40% | 0-40% | 0-40% |
| Cu | 0-20% | 0-20% | 0-20% | 0-20% |
| Co | 10-60% | 0-60% | 0-60% | 0-60% |
| Fe | 0-80% | 30-80% | 0-80% | 0-70% |
| Hf | 0-20% | 0-20% | 0-20% | 0-20% |
| Ir | 0-20% | 0-20% | 0-20% | 0-20% |
| Mg | 0-20% | 0-20% | 0-20% | 0-20% |
| Mn | 0-20% | 0-40% | 0-20% | 0-20% |
| Mo | 0-60% | 0-60% | 0-80% | 0-70% |
| Nb | 0-60% | 0-60% | 0-65% | 20-60% |
| Ni | 0-60% | 5-55% | 0-52% | 0-50% |
| Os | 0-20% | 0-20% | 0-20% | 0-20% |
| Pt | 0-20% | 0-20% | 0-20% | 0-20% |
| Re | 4.5-98% | 4.5-90% | 4.5-80% | 4.5-70% |
| Rh | 0-20% | 0-20% | 0-20% | 0-20% |
| Si | 0-20% | 0-20% | 0-20% | 0-20% |
| Sn | 0-20% | 0-20% | 0-20% | 0-20% |
| Ta | 0-60% | 0-60% | 5-65% | 0-60% |
| Tc | 0-20% | 0-20% | 0-20% | 0-20% |
| Ti | 0-60% | 0-55% | 0-53% | 0-50% |
| V | 0-20% | 0-20% | 2-20% | 0-20% |
| W | 0-60% | 0-60% | 0-80% | 0-70% |
| Y | 0-20% | 0-20% | 0-20% | 0-20% |
| Zr | 0-20% | 0-20% | 0-20% | 5-20% |

| Component | Wt. % | | | |
|---|---|---|---|---|
| | Ex. 9 | Ex. 10 | Ex. 11 | Ex. 12 |
| Ag | 0-5% | 0-5% | 0-5% | 0-5% |
| Al | 0-5% | 0-5% | 1-15% | 0-20% |
| Bi | 0-5% | 0-5% | 0-5% | 0-5% |
| Cr | 1-28% | 1-30% | 0-5% | 0-30% |
| Cu | 0-20% | 0-5% | 0-5% | 0-25% |
| Co | 0-5% | 1-60% | 0-5% | 0-60% |
| Fe | 10-80% | 0-25% | 0-5% | 0-80% |
| Hf | 0-5% | 0-5% | 0-5% | 0-5% |
| Ir | 0-5% | 0-5% | 0-5% | 0-5% |
| Mg | 0-5% | 0-5% | 0-5% | 0-5% |
| Mn | 0-5% | 0-5% | 0-5% | 0-5% |
| Mo | 0-8% | 0-25% | 0-5% | 0-98% |
| Nb | 0-5% | 0-5% | 0-5% | 0-95% |
| Ni | 1-20% | 1-45% | 0-5% | 0-50% |
| Os | 0-5% | 0-5% | 0-5% | 0-5% |

-continued

| | | | | |
|---|---|---|---|---|
| Pt | 0-5% | 0-5% | 0-5% | 0-5% |
| Re | 5-20% | 4.8-20% | 4.5-20% | 4.5-20% |
| Rh | 0-5% | 0-5% | 0-5% | 0-5% |
| Si | 0-5% | 0-5% | 0-5% | 0-5% |
| Sn | 0-5% | 0-5% | 0-5% | 0-5% |
| Ta | 0-5% | 0-5% | 0-5% | 0-98% |
| Tc | 0-5% | 0-5% | 0-5% | 0-5% |
| Ti | 0-5% | 0-5% | 40-93% | 0-93% |
| V | 0-5% | 0-5% | 1-10% | 0-20% |
| W | 0-5% | 0-20% | 0-5% | 0-98% |
| Y | 0-5% | 0-5% | 0-5% | 0-5% |
| Zr | 0-5% | 0-5% | 0-5% | 0-5% |

| | Wt. % | | | |
|---|---|---|---|---|
| Component | Ex. 13 | Ex. 14 | Ex. 15 | Ex. 16 |
| Mo | 30-80% | 35-80% | 30-70% | 35-65% |
| Hf | 0.8-1.4% | 0-2% | 0-2.5% | 0-2.5% |
| Re | 7-49% | 7-49% | 7-60% | 7.5-49% |
| Ta | 0-2% | 0-2% | 0-50% | 0-50% |
| W | 0-2% | 0-2% | 0-50% | 20-50% |

| | Wt. % | | | |
|---|---|---|---|---|
| Component | Ex. 17 | Ex. 18 | Ex. 10 | Ex. 20 |
| W | 20-93% | 60-92% | 20-75% | 5-98% |
| Re | 6-60% | 8-40% | 7.5-47.5% | 0-80% |
| Mo | 0-47.5% | <0.5% | 1-47.5% | 0-80% |

| | Wt. % | | | |
|---|---|---|---|---|
| Component | Ex. 21 | Ex. 22 | Ex. 23 | Ex. 24 |
| Re | 5-60% | 5-60% | 5-60% | 5-60% |
| Mo | 0-55% | 10-55% | 10-55% | 10-55% |
| Bi | 1-42 | 0-32 | 0-32 | 0-32 |
| Cr | 0-32 | 1-42 | 0-32 | 0-32 |
| Ir | 0-32 | 0-32 | 1-42 | 0-32 |
| Nb | 0-32 | 0-32 | 0-32 | 1-42 |
| Ta | 0-32 | 0-32 | 0-32 | 0-32 |
| Ti | 0-32 | 0-32 | 0-32 | 0-32 |
| Y | 0-32 | 0-32 | 0-32 | 0-32 |
| Zr | 0-32 | 0-32 | 0-32 | 0-32 |

| | Wt. % | | | |
|---|---|---|---|---|
| Component | Ex. 25 | Ex. 26 | Ex. 27 | Ex. 28 |
| Re | 5-60% | 5-60% | 5-60% | 5-60% |
| Mo | 15-55% | 15-55% | 15-55% | 15-55% |
| Bi | 0-32 | 0-32 | 0-32 | 0-32 |
| Cr | 0-32 | 0-32 | 0-32 | 0-32 |
| Ir | 0-32 | 0-32 | 0-32 | 0-32 |
| Nb | 0-32 | 0-32 | 0-32 | 0-32 |
| Ta | 1-42 | 0-32 | 0-32 | 0-32 |
| Ti | 0-32 | 1-42 | 0-32 | 0-32 |
| Y | 0-32 | 0-32 | 1-42 | 0-32 |
| Zr | 0-32 | 0-32 | 0-32 | 1-42 |

| | Wt. % | | | |
|---|---|---|---|---|
| Component | Ex. 29 | Ex. 30 | Ex. 31 | Ex. 32 |
| Re | 55-75% | 50-75% | 60-75% | 65-75% |
| Cr | 25-50% | 25-45% | 25-40% | 25-35% |
| Mo | 0-25% | 0-25% | 0-25% | 0-25% |
| Bi | 0-25% | 0-25% | 0-25% | 0-25% |
| Ir | 0-25% | 0-25% | 0-25% | 0-25% |
| Nb | 0-25% | 0-25% | 0-25% | 0-25% |
| Ta | 0-25% | 0-25% | 0-25% | 0-25% |
| V | 0-25% | 0-25% | 0-25% | 0-25% |
| W | 0-25% | 0-25% | 0-25% | 0-25% |
| Mn | 0-25% | 0-25% | 0-25% | 0-25% |
| Tc | 0-25% | 0-25% | 0-25% | 0-25% |
| Ru | 0-25% | 0-25% | 0-25% | 0-25% |
| Rh | 0-25% | 0-25% | 0-25% | 0-25% |
| Hf | 0-25% | 0-25% | 0-25% | 0-25% |

-continued

| | | | | |
|---|---|---|---|---|
| Os | 0-25% | 0-25% | 0-25% | 0-25% |
| Cu | 0-25% | 0-25% | 0-25% | 0-25% |
| Ir | 0-25% | 0-25% | 0-25% | 0-25% |
| Ti | 0-25% | 0-25% | 0-25% | 0-25% |
| Y | 0-25% | 0-25% | 0-25% | 0-25% |
| Zr | 0-25% | 0-25% | 0-25% | 0-25% |
| Ag | 0-25% | 0-25% | 0-25% | 0-25% |
| Al | 0-25% | 0-25% | 0-25% | 0-22% |
| Co | 0-25% | 0-25% | 0-25% | 0-25% |
| Fe | 0-25% | 0-25% | 0-25% | 0-25% |
| Mg | 0-25% | 0-25% | 0-25% | 0-25% |
| Ni | 0-25% | 0-25% | 0-25% | 0-25% |
| Pt | 0-25% | 0-25% | 0-25% | 0-25% |
| Si | 0-25% | 0-25% | 0-25% | 0-25% |
| Sn | 0-25% | 0-25% | 0-25% | 0-25% |

| | Wt. % | | | |
|---|---|---|---|---|
| Component | Ex. 33 | Ex. 34 | Ex. 35 | Ex. 36 |
| Re | 50-75% | 55-72% | 60-70% | 62-70% |
| Cr | 24-49% | 27-44% | 29-39% | 29-37% |
| Mo | 1-15% | 1-10% | 1-8% | 1-5% |
| Bi | 0-15% | 0-10% | 0-8% | 0-5% |
| Ir | 0-15% | 0-10% | 0-8% | 0-5% |
| Nb | 0-15% | 0-10% | 0-8% | 0-5% |
| Ta | 0-15% | 0-10% | 0-8% | 0-5% |
| V | 0-15% | 0-10% | 0-8% | 0-5% |
| W | 0-15% | 0-10% | 0-8% | 0-5% |
| Mn | 0-15% | 0-10% | 0-8% | 0-5% |
| Tc | 0-15% | 0-10% | 0-8% | 0-5% |
| Ru | 0-15% | 0-10% | 0-8% | 0-5% |
| Rh | 0-15% | 0-10% | 0-8% | 0-5% |
| Hf | 0-15% | 0-10% | 0-8% | 0-5% |
| Os | 0-15% | 0-10% | 0-8% | 0-5% |
| Cu | 0-15% | 0-10% | 0-8% | 0-5% |
| Ir | 0-15% | 0-10% | 0-8% | 0-5% |
| Ti | 0-15% | 0-10% | 0-8% | 0-5% |
| Y | 0-15% | 0-10% | 0-8% | 0-5% |
| Zr | 0-15% | 0-10% | 0-8% | 0-5% |
| Ag | 0-15% | 0-10% | 0-8% | 0-5% |
| Al | 0-15% | 0-10% | 0-8% | 0-5% |
| Co | 0-15% | 0-10% | 0-8% | 0-5% |
| Fe | 0-15% | 0-10% | 0-8% | 0-5% |
| Mg | 0-15% | 0-10% | 0-8% | 0-5% |
| Ni | 0-15% | 0-10% | 0-8% | 0-5% |
| Pt | 0-15% | 0-10% | 0-8% | 0-5% |
| Si | 0-15% | 0-10% | 0-8% | 0-5% |
| Sn | 0-15% | 0-10% | 0-8% | 0-5% |

| | Wt. % | | | |
|---|---|---|---|---|
| Component | Ex. 37 | Ex. 38 | Ex. 39 | Ex. 40 |
| Mo | 40-95% | 40-95% | 40-95% | 40-95% |
| Co | ≤0.002% | ≤0.002% | ≤0.002% | ≤0.002% |
| Fe | ≤0.02% | ≤0.02% | ≤0.02% | ≤0.02% |
| Hf | 0.1-2.5% | 0-2.5% | 0-2.5% | 0-2.5% |
| Os | ≤1% | ≤1% | ≤1% | ≤1% |
| Nb | ≤0.01% | ≤0.01% | ≤0.01% | ≤0.01% |
| Pt | ≤1% | ≤1% | ≤1% | ≤1% |
| Re | 5-49% | 5-49% | 5-49% | 5-49% |
| Sn | ≤0.002% | ≤0.002% | ≤0.002% | ≤0.002% |
| Ta | 0-50% | 0-50% | 0-50% | 0-50% |
| Tc | ≤1% | ≤1% | ≤1% | ≤1% |
| Ti | ≤1% | ≤1% | ≤1% | ≤1% |
| V | ≤1% | ≤1% | ≤1% | ≤1% |
| W | 0-50% | 0-50% | 0-50% | 0.5-50% |
| Zr | ≤1% | ≤1% | ≤1% | ≤1% |
| Ag | 0-5% | 0-5% | 0-5% | 0-5% |
| Al | 0-5% | 0-5% | 0-5% | 0-5% |
| Co | 0-5% | 0-5% | 0-5% | 0-5% |
| Mg | 0-5% | 0-5% | 0-5% | 0-5% |
| Ni | 0-5% | 0-5% | 0-5% | 0-5% |
| Si | 0-5% | 0-5% | 0-5% | 0-5% |
| Sn | 0-5% | 0-5% | 0-5% | 0-5% |

-continued

| Component | Wt. % | | |
|---|---|---|---|
| | Ex. 41 | Ex. 42 | Ex. 43 |
| W | 20-95% | 60-95% | 20-80% |
| Re | 5-47.5% | 5-40% | 5-47.5% |
| Mo | 0-47.5% | <0.5% | 1-47.5% |
| Cu | <0.5% | <0.5% | <0.5% |
| Co | ≤0.002% | ≤0.002% | ≤0.002% |
| Fe | ≤0.02% | ≤0.02% | ≤0.02% |
| Hf | <0.5% | <0.5% | <0.5% |
| Os | <0.5% | <0.5% | <0.5% |
| Nb | ≤0.01% | ≤0.01% | ≤0.01% |
| Pt | <0.5% | <0.5% | <0.5% |
| Sn | ≤0.002% | ≤0.002% | ≤0.002% |
| Ta | <0.5% | <0.5% | <0.5% |
| Tc | <0.5% | <0.5% | <0.5% |
| Ti | <0.5% | <0.5% | <0.5% |
| V | <0.5% | <0.5% | <0.5% |
| Zr | <0.5% | <0.5% | <0.5% |
| Ag | 0-5% | 0-5% | 0-5% |
| Al | 0-5% | 0-5% | 0-5% |
| Fe | 0-5% | 0-5% | 0-5% |
| Mg | 0-5% | 0-5% | 0-5% |
| Ni | 0-5% | 0-5% | 0-5% |
| Si | 0-5% | 0-5% | 0-5% |

| Component | Wt. % | | | |
|---|---|---|---|---|
| | Ex. 44 | Ex. 45 | Ex. 46 | Ex. 47 |
| W | 1-94.9% | 1-94.9% | 1-94.9% | 10-95% |
| Cu | 0.1-94% | 0.1-94% | 0.1-94% | 1-84% |
| Co | ≤0.002% | ≤0.002% | ≤0.002% | ≤0.002% |
| Fe | ≤0.02% | ≤0.02% | ≤0.02% | ≤0.02% |
| Hf | 0.1-2.5% | 0-2.5% | 0-2.5% | 0-2.5% |
| Os | ≤1% | ≤1% | ≤1% | ≤1% |
| Mo | 0-5% | 0.1-3% | 0-2% | 0-3% |
| Nb | ≤0.01% | ≤0.01% | ≤0.01% | ≤0.01% |
| Pt | ≤1% | ≤1% | ≤1% | ≤1% |
| Re | 5-40% | 5-40% | 5-40% | 6-40% |
| Sn | ≤0.002% | ≤0.002% | ≤0.002% | ≤0.002% |
| Ta | 0-50% | 0-50% | 0-50% | 0-50% |
| Tc | ≤1% | ≤1% | ≤1% | ≤1% |
| Ti | ≤1% | ≤1% | ≤1% | ≤1% |
| V | ≤1% | ≤1% | ≤1% | ≤1% |
| Zr | ≤1% | ≤1% | ≤1% | ≤1% |
| Ag | 0-5% | 0-5% | 0-5% | 0-5% |
| Al | 0-5% | 0-5% | 0-5% | 0-5% |
| Fe | 0-5% | 0-5% | 0-5% | 0-5% |
| Mg | 0-5% | 0-5% | 0-5% | 0-5% |
| Ni | 0-5% | 0-5% | 0-5% | 0-5% |
| Si | 0-5% | 0-5% | 0-5% | 0-5% |

| Component | Wt. % | | |
|---|---|---|---|
| | Ex. 48 | Ex. 49 | Ex. 50 |
| W | 20-96% | 25-92% | 30-88% |
| Cu | 2-74% | 2-68% | 5-62% |
| Co | ≤0.002% | ≤0.002% | ≤0.002% |
| Hf | 0-2.5% | 0-2.5% | 0-2.5% |
| Os | ≤1% | ≤1% | ≤1% |
| Mo | 0-3% | 0-2% | 0-1% |
| Nb | ≤0.01% | ≤0.01% | ≤0.01% |
| Pt | ≤1% | ≤1% | ≤1% |
| Re | 6-40% | 7-40% | 8-40% |
| Sn | ≤0.002% | ≤0.002% | ≤0.002% |
| Ta | 0-50% | 0.5-50% | 0-50% |
| Tc | ≤1% | ≤1% | ≤1% |
| Ti | ≤1% | ≤1% | ≤1% |
| V | ≤1% | ≤1% | ≤1% |
| Ag | 0-5% | 0-5% | 0-5% |
| Al | 0-5% | 0-5% | 0-5% |
| Fe | 0-5% | 0-5% | 0-5% |
| Mg | 0-5% | 0-5% | 0-5% |
| Ni | 0-5% | 0-5% | 0-5% |
| Si | 0-5% | 0-5% | 0-5% |

-continued

| | Wt. % | | | |
|---|---|---|---|---|
| Component | Ex. 51 | Ex. 52 | Ex. 53 | Ex. 54 |
| W | 25-88% | 35-87% | 40-86% | 50-85% |
| Cu | 5-68% | 5-57% | 5-51% | 5-40% |
| Hf | 0.8-1.4% | 0-2.5% | 0-2.5% | 0-2.5% |
| Re | 0-40% | 0-40% | 0-40% | 0-40% |
| Ta | 0-50% | 0-50% | 0-50% | 0-50% |

| | Wt. % | | |
|---|---|---|---|
| Component | Ex. 55 | Ex. 56 | Ex. 57 |
| Ti | 55-66% | 65-76% | 70-76% |
| Mo | 20-41% | 20-31% | 20-26% |
| Re | 4-20% | 4-20% | 4-20% |
| Y | <0.5% | <0.5% | <0.5% |
| Nb | <0.5% | <0.5% | <0.5% |
| Co | <0.5% | <0.5% | <0.5% |
| Cl | <0.5% | <0.5% | <0.5% |
| Zr | <0.5% | <0.5% | <0.5% |

| | Wt. % | | |
|---|---|---|---|
| Component | Ex. 58 | Ex. 59 | Ex. 60 |
| W | 20-95% | 60-93% | 20-80% |
| Re | 5-47.5% | 7-40% | 5-47.5% |
| Mo | 0-47.5% | <0.5% | 1-47.5% |
| Cu | <0.5% | <0.5% | <0.5% |
| Co | ≤0.002% | ≤0.002% | ≤0.002% |
| Fe | ≤0.02% | <0.02% | ≤0.02% |
| Hf | <0.5% | <0.5% | <0.5% |
| Os | <0.5% | <0.5% | <0.5% |
| Nb | ≤0.01% | ≤0.01% | ≤0.01% |
| Pt | <0.5% | <0.5% | <0.5% |
| Sn | ≤0.002% | ≤0.002% | ≤0.002% |
| Ta | <0.5% | <0.5% | <0.5% |
| Tc | <0.5% | <0.5% | <0.5% |
| Ti | <0.5% | <0.5% | <0.5% |
| V | <0.5% | <0.5% | <0.5% |
| Zr | <0.5% | <0.5% | <0.5% |
| Ag | 0-5% | 0-5% | 0-5% |
| Al | 0-5% | 0-5% | 0-5% |
| Fe | 0-5% | 0-5% | 0-5% |
| Mg | 0-5% | 0-5% | 0-5% |
| Ni | 0-5% | 0-5% | 0-5% |
| Si | 0-5% | 0-5% | 0-5% |

| | Wt. % | | | |
|---|---|---|---|---|
| Component | Ex. 61 | Ex. 62 | Ex. 63 | Ex. 64 |
| Ag | 0-10% | 0-10% | 0-10% | 0-10% |
| Al | 0-10% | 0-10% | 0-10% | 2-10% |
| B | 0-10% | 0-10% | 0-10% | 0-10% |
| Bi | 0-10% | 0-10% | 0-10% | 0-10% |
| Cr | 2-30% | 10-30% | 0-20% | 0-20% |
| Cu | 0-10% | 0-10% | 0-10% | 0-10% |
| Co | 0-10% | 32-70% | 0-10% | 0-10% |
| Fe | 50-80% | 0-20% | 0-10% | 0-10% |
| Hf | 0-10% | 0-10% | 0-10% | 0-10% |
| Ir | 0-10% | 0-10% | 0-10% | 0-10% |
| La | 0-10% | 0-10% | 0-10% | 0-10% |
| Mg | 0-10% | 0-10% | 0-10% | 0-10% |
| Mn | 0-20% | 0-10% | 0-10% | 0-10% |
| Mo | 0-10% | 0-30% | 0-16% | 0-16% |
| Nb | 0-10% | 0-10% | 0-10% | 0-10% |
| Ni | 0.1-30% | 0.1-40% | 0-10% | 0-10% |
| Os | 0-10% | 0-10% | 0-10% | 0-10% |
| Pt | 0-10% | 0-10% | 0-10% | 0-10% |
| Re | 5-40% | 4.8-40% | 4.5-80% | 4.5-80% |
| Rh | 0-10% | 0-10% | 0-10% | 0-10% |
| Se | 0-10% | 0-10% | 0-10% | 0-10% |
| Si | 0-10% | 0-10% | 0-10% | 0-10% |
| Sn | 0-10% | 0-10% | 0-12% | 0-12% |
| Ta | 0-10% | 0-10% | 0-10% | 0-10% |
| Tc | 0-10% | 0-10% | 0-10% | 0-10% |

-continued

| | | | | |
|---|---|---|---|---|
| Ti | 0-10% | 0-10% | 70-91.5% | 70-91.5% |
| V | 0-10% | 0-10% | 0-10% | 0.01-10% |
| W | 0-10% | 0-20% | 0-10% | 0-10% |
| Y | 0-10% | 0-10% | 0-10% | 0-10% |
| Zr | 0-10% | 0-10% | 0-10% | 0-10% |

| | Wt. % | | | |
|---|---|---|---|---|
| Component | Ex. 65 | Ex. 66 | Ex. 67 | Ex. 68 |
| Ag | 0-10% | 0-10% | 0-10% | 0-10% |
| Al | 0-10% | 0-10% | 0-10% | 0-10% |
| B | 0-10% | 0-10% | 0-10% | 0-10% |
| Bi | 0-10% | 0-10% | 0-10% | 0-10% |
| C | 0-10% | 0-20% | 0-20% | 0-10% |
| Cu | 0-10% | 0-10% | 0-50% | 0-10% |
| Co | 0-10% | 0-10% | 0-10% | 0-10% |
| Fe | 0-10% | 0-10% | 0-10% | 0-10% |
| Hf | 0-10% | 0-10% | 0-10% | 0-10% |
| Ir | 0-10% | 0-10% | 0-10% | 0-12% |
| La | 0-10% | 0-10% | 0-10% | 0-10% |
| Mg | 0-10% | 0-10% | 0-10% | 0-10% |
| Mn | 0-10% | 0-10% | 0-10% | 0-10% |
| Mo | 0-55% | 40-93% | 0-50% | 0-20% |
| Nb | 0-10% | 0-10% | 0-10% | 40-85% |
| Ni | 0-45% | 0-10% | 0-10% | 0-10% |
| Os | 0-10% | 0-10% | 0-10% | 0-10% |
| Pt | 0-10% | 0-10% | 0-10% | 0-10% |
| Re | 14-40% | 7-40% | 7-40% | 7-40% |
| Rh | 0-10% | 0-10% | 0-10% | 0-10% |
| Se | 0-10% | 0-10% | 0-10% | 0-10% |
| Si | 0-10% | 0-10% | 0-10% | 0-10% |
| Sn | 0-10% | 0-10% | 0-10% | 0-10% |
| Ta | 35-84% | 0-50% | 0-50% | 0-35% |
| Tc | 0-10% | 0-10% | 0-10% | 0-10% |
| Ti | 0-10% | 0-10% | 0-10% | 0-10% |
| V | 0-10% | 0-10% | 0-10% | 0-10% |
| W | 0.1-25% | 0-50% | 14-10% | 0-15% |
| Y | 0-10% | 0-10% | 0-10% | 0-10% |
| Zr | 0-10% | 0-10% | 0-50% | 0-10% |

| | Wt. % | | | |
|---|---|---|---|---|
| Component | Ex. 69 | Ex. 70 | Ex. 71 | Ex. 72 |
| Ag | 0-10% | 0-10% | 0-5% | 0-5% |
| Al | 0-10% | 0-10% | 0-5% | 5-7% |
| B | 0-10% | 0-10% | 0-5% | 0-5% |
| Bi | 0-10% | 0-10% | 0-5% | 0-5% |
| Cr | 0-10% | 1-95% | 12-28% | 0-5% |
| Cu | 0-10% | 0-10% | 0-5% | 0-5% |
| Co | 0-10% | 0-10% | 36-68% | 0-5% |
| Fe | 0-10% | 0-10% | 0-18% | 0-5% |
| Hf | 0-10% | 0-10% | 0-5% | 0-5% |
| Ir | 0-10% | 0-10% | 0-5% | 0-5% |
| La | 0-10% | 0-10% | 0-5% | 0-5% |
| Mg | 0-10% | 0-10% | 0-5% | 0-5% |
| Mn | 0-10% | 0-10% | 0-5% | 0-5% |
| Mo | 0-10% | 0-20% | 0-12% | 0-5% |
| Nb | 0-10% | 0-10% | 0-5% | 0-5% |
| Ni | 30-58% | 0-10% | 9-36% | 0-5% |
| Os | 0-10% | 0-10% | 0-5% | 0-5% |
| Pt | 0-10% | 0-10% | 0-5% | 0-5% |
| Re | 5-40% | 5-40% | 4.8-40% | 4.5-40% |
| Rh | 0-10% | 0-10% | 0-5% | 0-5% |
| Se | 0-10% | 0-10% | 0-5% | 0-5% |
| Si | 0-10% | 0-10% | 0-5% | 0-5% |
| Sn | 0-10% | 0-10% | 0-5% | 0-5% |
| Ta | 0-10% | 0-10% | 0-5% | 0-5% |
| Tc | 0-10% | 0-10% | 0-5% | 0-5% |
| Ti | 30-58% | 0-40% | 0-5% | 70-91.5% |
| V | 0-10% | 0-10% | 0-5% | 3-6% |
| W | 0-10% | 0-10% | 0-16% | 0-5% |
| Y | 0-10% | 0-10% | 0-5% | 0-5% |
| Zr | 0-10% | 0-20% | 0-5% | 0-5% |

-continued

| | Wt. % | | | |
|---|---|---|---|---|
| Component | Ex. 73 | Ex. 74 | Ex. 75 | Ex. 76 |
| Ag | 0-8% | 0-8% | 0-8% | 0-8% |
| Al | 0-8% | 0-8% | 0-8% | 2-10% |
| B | 0-8% | 0-8% | 0-8% | 0-8% |
| Bi | 0-8% | 0-8% | 0-8% | 0-8% |
| Cr | 2-30% | 10-30% | 0-20% | 0-20% |
| Cu | 0-8% | 0-8% | 0-8% | 0-8% |
| Co | 0-8% | 32-70% | 0-8% | 0-8% |
| Fe | 50-80% | 0-20% | 0-8% | 0-8% |
| Hf | 0-8% | 0-8% | 0-8% | 0-8% |
| Ir | 0-8% | 0-8% | 0-8% | 0-8% |
| La | 0-8% | 0-8% | 0-8% | 0-8% |
| Mg | 0-8% | 0-8% | 0-8% | 0-8% |
| Mn | 0-20% | 0-8% | 0-8% | 0-8% |
| Mo | 0-8% | 0-30% | 0-16% | 0-16% |
| Nb | 0-8% | 0-8% | 0-8% | 0-8% |
| Ni | 0.1-30% | 0.1-40% | 0-8% | 0-8% |
| Os | 0-8% | 0-8% | 0-8% | 0-8% |
| Pt | 0-8% | 0-8% | 0-8% | 0-8% |
| Re | 5-40% | 4.8-40% | 4.5-80% | 4.5-80% |
| Rh | 0-8% | 0-8% | 0-8% | 0-8% |
| Se | 0-8% | 0-8% | 0-8% | 0-8% |
| Si | 0-8% | 0-8% | 0-8% | 0-8% |
| Sn | 0-8% | 0-8% | 0-12% | 0-12% |
| Ta | 0-8% | 0-8% | 0-8% | 0-8% |
| Tc | 0-8% | 0-8% | 0-8% | 0-8% |
| Ti | 0-8% | 0-8% | 70-91.5% | 70-91.5% |
| V | 0-8% | 0-8% | 0-8% | 0.01-10% |
| W | 0-8% | 0-20% | 0-8% | 0-8% |
| Y | 0-8% | 0-8% | 0-8% | 0-8% |
| Zr | 0-8% | 0-8% | 0-8% | 0-8% |

| | Wt. % | | | |
|---|---|---|---|---|
| Component | Ex. 77 | Ex. 78 | Ex. 79 | Ex. 80 |
| Ag | 0-8% | 0-8% | 0-8% | 0-8% |
| Al | 0-8% | 0-8% | 0-8% | 0-8% |
| B | 0-8% | 0-8% | 0-8% | 0-8% |
| Bi | 0-8% | 0-8% | 0-8% | 0-8% |
| Cr | 0-8% | 0-20% | 0-20% | 0-8% |
| Cu | 0-8% | 0-8% | 0-50% | 0-8% |
| Co | 0-8% | 0-8% | 0-8% | 0-8% |
| Fe | 0-8% | 0-8% | 0-8% | 0-8% |
| Hf | 0-8% | 0-8% | 0-8% | 0-8% |
| Ir | 0-8% | 0-8% | 0-8% | 0-12% |
| La | 0-8% | 0-8% | 0-8% | 0-8% |
| Mg | 0-8% | 0-8% | 0-8% | 0-8% |
| Mn | 0-8% | 0-8% | 0-8% | 0-8% |
| Mo | 0-55% | 40-93% | 0-50% | 0-20% |
| Nb | 0-8% | 0-8% | 0-8% | 40-85% |
| Ni | 0-45% | 0-8% | 0-8% | 0-8% |
| Os | 0-8% | 0-8% | 0-8% | 0-8% |
| Pt | 0-8% | 0-8% | 0-8% | 0-8% |
| Re | 14-40% | 7-40% | 7-40% | 7-40% |
| Rh | 0-8% | 0-8% | 0-8% | 0-8% |
| Se | 0-8% | 0-8% | 0-8% | 0-8% |
| Si | 0-8% | 0-8% | 0-8% | 0-8% |
| Sn | 0-8% | 0-8% | 0-8% | 0-8% |
| Ta | 35-84% | 0-50% | 0-50% | 0-35% |
| Tc | 0-8% | 0-8% | 0-8% | 0-8% |
| Ti | 0-8% | 0-8% | 0-8% | 0-8% |
| V | 0-8% | 0-8% | 0-8% | 0-8% |
| W | 0.1-25% | 0-50% | 14-10% | 0-15% |
| Y | 0-8% | 0-8% | 0-8% | 0-8% |
| Zr | 0-8% | 0-8% | 0-50% | 0-8% |

| | Wt. % | | | |
|---|---|---|---|---|
| Component | Ex. 81 | Ex. 82 | Ex. 83 | Ex. 84 |
| Ag | 0-5% | 0-5% | 0-5% | 0-5% |
| Al | 0-5% | 0-5% | 0-5% | 5-7% |
| B | 0-5% | 0-5% | 0-5% | 0-5% |
| Bi | 0-5% | 0-5% | 0-5% | 0-5% |
| C | 0-5% | 1-95% | 12-28% | 0-5% |

-continued

| Component | | | | |
|---|---|---|---|---|
| Cu | 0-5% | 0-5% | 0-5% | 0-5% |
| Co | 0-5% | 0-5% | 36-68% | 0-5% |
| Fe | 0-5% | 0-5% | 0-18% | 0-5% |
| Hf | 0-5% | 0-5% | 0-5% | 0-5% |
| Ir | 0-5% | 0-5% | 0-5% | 0-5% |
| La | 0-5% | 0-5% | 0-5% | 0-5% |
| Mg | 0-5% | 0-5% | 0-5% | 0-5% |
| Mn | 0-5% | 0-5% | 0-5% | 0-5% |
| Mo | 0-5% | 0-20% | 0-12% | 0-5% |
| Nb | 0-5% | 0-5% | 0-5% | 0-5% |
| Ni | 30-58% | 0-5% | 9-36% | 0-5% |
| Os | 0-5% | 0-5% | 0-5% | 0-5% |
| Pt | 0-5% | 0-5% | 0-5% | 0-5% |
| Re | 5-40% | 5-40% | 4.8-40% | 4.5-40% |
| Rh | 0-5% | 0-5% | 0-5% | 0-5% |
| Se | 0-5% | 0-5% | 0-5% | 0-5% |
| Si | 0-5% | 0-5% | 0-5% | 0-5% |
| Sn | 0-5% | 0-5% | 0-5% | 0-5% |
| Ta | 0-5% | 0-5% | 0-5% | 0-5% |
| Tc | 0-5% | 0-5% | 0-5% | 0-5% |
| Ti | 30-58% | 0-40% | 0-5% | 70-91.5% |
| V | 0-5% | 0-5% | 0-5% | 3-6% |
| W | 0-5% | 0-5% | 0-16% | 0-5% |
| Y | 0-5% | 0-5% | 0-5% | 0-5% |
| Zr | 0-5% | 0-20% | 0-5% | 0-5% |

| | Wt. % | | | |
|---|---|---|---|---|
| Component | Ex. 85 | Ex. 86 | Ex. 87 | Ex. 88 |
| Ag | 0-5% | 0-5% | 0-5% | 0-5% |
| Al | 0-5% | 0-5% | 0-5% | 0-5% |
| B | 0-5% | 0-5% | 0-5% | 0-5% |
| Bi | 0-5% | 0-5% | 0-5% | 0-5% |
| Cr | 0-5% | 0-5% | 0-5% | 0-5% |
| Cu | 0-5% | 0-5% | 0-5% | 0-5% |
| Co | 0-5% | 0-5% | 0-5% | 0-5% |
| Fe | 0-5% | 0-5% | 0-5% | 0-5% |
| Hf | 0-5% | 0-5% | 0-5% | 0-5% |
| Ir | 0-5% | 0-5% | 0-5% | 0-5% |
| La | 0-5% | 0-5% | 0-5% | 0-5% |
| Mg | 0-5% | 0-5% | 0-5% | 0-5% |
| Mn | 0-5% | 0-5% | 0-5% | 0-5% |
| Mo | 1-15% | 2-10% | 3-8% | 0-5% |
| Nb | 0-5% | 0-5% | 0-5% | 20-45% |
| Ni | 0-5% | 0-5% | 0-5% | 0-5% |
| Os | 0-5% | 0-5% | 0-5% | 0-5% |
| Pt | 0-5% | 0-5% | 0-5% | 0-5% |
| Re | 0-5% | 0-5% | 0-5% | 0-5% |
| Rh | 0-5% | 0-5% | 0-5% | 0-5% |
| Se | 0-5% | 0-5% | 0-5% | 0-5% |
| Si | 0-5% | 0-5% | 0-5% | 0-5% |
| Sr | 0-5% | 0-5% | 0-5% | 0-5% |
| Ta | 0-5% | 0-5% | 0-5% | 1-15% |
| Tc | 0-5% | 0-5% | 0-5% | 0-5% |
| Ti | 51-70% | 51-70% | 55-70% | 51-70% |
| V | 0-5% | 0-5% | 0-5% | 0-5% |
| W | 0-5% | 0-5% | 0-5% | 0-5% |
| Y | 0-5% | 0-5% | 0-5% | 0-5% |
| Zr | 20-40% | 22-38% | 27-33% | 1-15% |

| | Wt. % | | | |
|---|---|---|---|---|
| Component | Ex. 89 | Ex. 90 | Ex. 91 | Ex. 92 |
| Ag | 0-5% | 0-5% | 0-5% | 0-5% |
| Al | 0-5% | 0-5% | 0-5% | 0-5% |
| B | 0-5% | 0-5% | 0-5% | 0-5% |
| Bi | 0-5% | 0-5% | 0-5% | 0-5% |
| Cr | 0-5% | 0-5% | 0-5% | 0-5% |
| Cu | 0-5% | 0-5% | 0-5% | 0-5% |
| Co | 0-5% | 0-5% | 0-5% | 0-5% |
| Fe | 0-5% | 0-5% | 0-5% | 0-5% |
| Hf | 0-5% | 0-5% | 0-5% | 0-5% |
| Ir | 0-5% | 0-5% | 0-5% | 0-5% |
| L | 0-5% | 0-5% | 0-5% | 0-5% |
| Mg | 0-5% | 0-5% | 0-5% | 0-5% |
| Mn | 0-5% | 0-5% | 0-5% | 0-5% |
| Mo | 0-5% | 0-5% | 0-5% | 0-5% |

-continued

| | | | | |
|---|---|---|---|---|
| Nb | 25-40% | 30-40% | 25-40% | 26-32% |
| Ni | 0-5% | 0-5% | 0-5% | 0-5% |
| Os | 0-5% | 0-5% | 0-5% | 0-5% |
| Pt | 0-5% | 0-5% | 0-5% | 0-5% |
| Re | 0-5% | 0-5% | 0-5% | 0-5% |
| Rh | 0-5% | 0-5% | 0-5% | 0-5% |
| Se | 0-5% | 0-5% | 0-5% | 0-5% |
| Si | 0-5% | 0-5% | 0-5% | 0-5% |
| Sn | 0-5% | 0-5% | 0-5% | 0-5% |
| Ta | 2-8% | 3-6% | 5-15% | 10-14% |
| Tc | 0-5% | 0-5% | 0-5% | 0-5% |
| Ti | 51-70% | 52-63% | 51-68% | 51-62% |
| V | 0-5% | 0-5% | 0-5% | 0-5% |
| W | 0-5% | 0-5% | 0-5% | 0-5% |
| Y | 0-5% | 0-5% | 0-5% | 0-5% |
| Zr | 2-12% | 4-8% | 2-8% | 2-6% |

| | Wt. % | | | |
|---|---|---|---|---|
| Component | Ex. 93 | Ex. 94 | Ex. 95 | Ex. 96 |
| Ag | 0-5% | 0-5% | 0-5% | 0-5% |
| Al | 0-5% | 0-5% | 0-5% | 0-5% |
| B | 0-5% | 0-5% | 0-5% | 0-5% |
| B | 0-5% | 0-5% | 0-5% | 0-5% |
| Cr | 0-5% | 5-35% | 10-30% | 15-25% |
| Cu | 0-5% | 0-5% | 0-5% | 0-5% |
| Co | 0-5% | 20-55% | 25-50% | 35-45% |
| Fe | 0-5% | 3-25% | 0-5% | 0-5% |
| Hf | 0-5% | 0-5% | 0-5% | 0-5% |
| Ir | 0-5% | 0-5% | 0-5% | 0-5% |
| La | 0-5% | 0-5% | 0-5% | 0-5% |
| Mg | 0-5% | 0-5% | 0-5% | 0-5% |
| Mn | 0-5% | 0-5% | 0-5% | 0-5% |
| Mo | 0-5% | 2-15% | 3-12% | 4-9% |
| Nb | 30-40% | 0-5% | 0-5% | 0-5% |
| Ni | 0-5% | 4-23% | 5-20% | 10-18% |
| Os | 0-5% | 0-5% | 0-5% | 0-5% |
| Pt | 0-5% | 0-5% | 0-5% | 0-5% |
| Re | 0-5% | 0-5% | 0-5% | 0-5% |
| Rh | 0-5% | 0-5% | 0-5% | 0-5% |
| Se | 0-5% | 0-5% | 0-5% | 0-5% |
| Si | 0-5% | 0-5% | 0-5% | 0-5% |
| Sn | 0-5% | 0-5% | 0-5% | 0-5% |
| Ta | 1-3% | 0-5% | 0-5% | 0-5% |
| Tc | 0-5% | 0-5% | 0-5% | 0-5% |
| Ti | 51-67% | 0-5% | 0-5% | 0-5% |
| V | 0-5% | 0-5% | 0-5% | 0-5% |
| W | 0-5% | 0-5% | 0-5% | 0-5% |
| Y | 0-5% | 0-5% | 0-5% | 0-5% |
| Zr | 2-5% | 0-5% | 0-5% | 0-5% |

| | Wt. % | | | |
|---|---|---|---|---|
| Component | Ex. 97 | Ex. 98 | Ex. 99 | Ex. 100 |
| Ag | 0-5% | 0-5% | 0-5% | 0-5% |
| Al | 0-5% | 0-5% | 0-5% | 0-5% |
| B | 0-5% | 0-5% | 0-5% | 0-5% |
| Bi | 0-5% | 0-5% | 0-5% | 0-5% |
| Cr | 0-5% | 0-5% | 0-5% | 0-5% |
| Cu | 0-5% | 0-5% | 0-5% | 0-5% |
| Co | 0-5% | 0-5% | 0-5% | 0-5% |
| Fe | 0-5% | 0-5% | 0-5% | 0-5% |
| Hf | 0-5% | 0-5% | 0-5% | 0-5% |
| Ir | 0-5% | 0-5% | 0-5% | 0-5% |
| La | 0-5% | 0-5% | 0-5% | 0-5% |
| Mg | 0-5% | 0-5% | 0-5% | 0-5% |
| Mn | 0-5% | 0-5% | 0-5% | 0-5% |
| Mo | 30-65% | 40-60% | 45-55% | 0-5% |
| Nb | 0-5% | 0-5% | 0-5% | 55-99.75% |
| Ni | 0-5% | 0-5% | 0-5% | 0-5% |
| Os | 0-5% | 0-5% | 0-5% | 0-5% |
| Pt | 0-5% | 0-5% | 0-5% | 0-5% |
| Re | 0-5% | 0-5% | 0-5% | 0-5% |
| Rh | 0-5% | 0-5% | 0-5% | 0-5% |
| Se | 0-5% | 0-5% | 0-5% | 0-5% |
| Si | 0-5% | 0-5% | 0-5% | 0-5% |
| Sn | 0-5% | 0-5% | 0-5% | 0-5% |

-continued

| | | | | |
|---|---|---|---|---|
| Ta | 0-5% | 0-5% | 0-5% | 0-5% |
| Tc | 0-5% | 0-5% | 0-5% | 0-5% |
| Ti | 0-5% | 0-5% | 0-5% | 0-5% |
| V | 0-5% | 0-5% | 0-5% | 0-5% |
| W | 0-5% | 0-5% | 0-5% | 0-5% |
| Y | 0-5% | 0-5% | 0-5% | 0-5% |
| Zr | 30-56% | 40-60% | 45-55% | 0.25-45% |

| | Wt. % | | | |
|---|---|---|---|---|
| Component | Ex. 101 | Ex. 102 | Ex. 103 | Ex. 104 |
| Ag | 0-5% | 0-5% | 0-5% | 0-5% |
| Al | 0-5% | 0-5% | 0-5% | 0-5% |
| B | 0-5% | 0-5% | 0-5% | 0-5% |
| Bi | 0-5% | 0-5% | 0-5% | 0-5% |
| Cr | 0-5% | 0-5% | 0-5% | 0-5% |
| Cu | 0-5% | 0-5% | 0-5% | 0-5% |
| Co | 0-5% | 0-5% | 0-5% | 0-5% |
| Fe | 0-5% | 0-5% | 0-5% | 0-5% |
| Hf | 0-5% | 0-5% | 0-5% | 0-5% |
| Ir | 0-5% | 0-5% | 0-5% | 0-5% |
| La | 0-5% | 0-5% | 0-5% | 0-5% |
| Mg | 0-5% | 0-5% | 0-5% | 0-5% |
| Mn | 0-5% | 0-5% | 0-5% | 0-5% |
| Mo | 0-5% | 0-5% | 0-5% | 0-5% |
| Nb | 75-99.5% | 95-99.25% | 55-78.5% | 68-74.25% |
| Ni | 0-5% | 0-5% | 0-5% | 0-5% |
| Os | 0-5% | 0-5% | 0-5% | 0-5% |
| Pt | 0-5% | 0-5% | 0-5% | 0-5% |
| Re | 0-5% | 0-5% | 0-5% | 0-5% |
| Rh | 0-5% | 0-5% | 0-5% | 0-5% |
| Se | 0-5% | 0-5% | 0-5% | 0-5% |
| Si | 0-5% | 0-5% | 0-5% | 0-5% |
| Sn | 0-5% | 0-5% | 0-5% | 0-5% |
| Ta | 0-5% | 0-5% | 20-35% | 25-30% |
| Tc | 0-5% | 0-5% | 0-5% | 0-5% |
| Ti | 0-5% | 0-5% | 0-5% | 0-5% |
| V | 0-5% | 0-5% | 0-5% | 0-5% |
| W | 0-5% | 0-5% | 1-8% | 0-5% |
| Y | 0-5% | 0-5% | 0-5% | 0-5% |
| Zr | 0.5-25% | 0.75-5% | 0.5-5% | 0.75-3% |

| | Wt. % | | | |
|---|---|---|---|---|
| Element | Ex. 105 | Ex. 106 | Ex. 107 | Ex. 108 |
| Re | 30-75% | 40-75% | 45-75% | 45-70% |
| Cr | 25-70% | 25-65% | 25-55% | 30-55% |
| Mo | 0-25% | 0-25% | 1-25% | 2-25% |
| Bi | 0-25% | 0-25% | 0-25% | 0-25% |
| Cr | 0-25% | 0-25% | 0-25% | 0-25% |
| Ir | 0-25% | 0-25% | 0-25% | 0-25% |
| Nb | 0-25% | 0-25% | 0-25% | 0-25% |
| Ta | 0-25% | 0-25% | 0-25% | 0-25% |
| V | 0-25% | 0-25% | 0-25% | 0-25% |
| W | 0-25% | 0-25% | 0-25% | 0-25% |
| Mn | 0-25% | 0-25% | 0-25% | 0-25% |
| Tc | 0-25% | 0-25% | 0-25% | 0-25% |
| Ru | 0-25% | 0-25% | 0-25% | 0-25% |
| Rh | 0-25% | 0-25% | 0-25% | 0-25% |
| Hf | 0-25% | 0-25% | 0-25% | 0-25% |
| Os | 0-25% | 0-25% | 0-25% | 0-25% |
| Cu | 0-25% | 0-25% | 0-25% | 0-25% |
| Ir | 0-25% | 0-25% | 0-25% | 0-25% |
| Ti | 0-25% | 0-25% | 0-25% | 0-25% |
| Y | 0-25% | 0-25% | 0-25% | 0-25% |
| Zr | 0-25% | 0-25% | 0-25% | 0-25% |

In Examples 1-108, it will be appreciated that all of the above ranges include any value between the range and any other range that is between the ranges set forth above. Any of the above values that include the ≤ symbol includes the range from 0 to the stated value and all values and ranges therebetween.

In another and/or alternative non-limiting aspect of the present disclosure, the metal alloy that is used to partially or fully formed the frame of the prosthetic heart valve includes less than about 5 wt. % (e.g., 0-4.999999 wt. % and all values and ranges therebetween) other metals and/or impurities, typically 0-1 wt. %, more typically 0-0.1 wt. %, even more typically 0-0.01 wt. %, and still even more typically 0-0.001 wt. %. A high purity level of the metal alloy can result in the formation of a more homogeneous alloy, which in turn can result in a more uniform density throughout the metal alloy, and also can result in the desired yield and ultimate tensile strengths of the metal alloy.

In accordance with another and/or alternative aspect of the present disclosure, the frame for a prosthetic heart valve is optionally subjected to one or more manufacturing processes. These manufacturing processes can include, but are not limited to, expansion, laser cutting, etching, crimping, annealing, drawing, pilgering, electroplating, electro-polishing, machining, plasma coating, 3D printed coatings, chemical vapor deposition, chemical polishing, cleaning, pickling, ion beam deposition or implantation, sputter coating, vacuum deposition, etc.

In accordance with another and/or alternative aspect of the present disclosure, the metal alloy optionally includes a certain amount of carbon and oxygen; however, this is not required. These two elements have been found to affect the forming properties and brittleness of the metal alloy. The controlled atomic ratio of carbon and oxygen of the metal alloy can also minimize the tendency of the metal alloy to form micro-cracks during the forming of the metal alloy into a frame for a prosthetic heart valve, and/or during the use and/or expansion of the frame for a prosthetic heart valve in a body. The carbon to oxygen atomic ratio can be as low as about 0.2:1 (e.g., 0.2:1 to 50:1 and all values and ranges therebetween). In one non-limiting formulation, the carbon to oxygen atomic ratio in the metal alloy is generally at least about 0.3:1. Typically the carbon content of the metal alloy is less than about 0.1 wt. % (e.g., 0-0.0999999 wt. % and all values and ranges therebetween), and more typically 0-0.01 wt. %. Carbon contents that are too large can adversely affect the physical properties of the metal alloy. Generally, the oxygen content is to be maintained at very low level. In one non-limiting formulation, the oxygen content is less than about 0.1 wt. % of the metal alloy (e.g., 0-0.0999999 wt. % and all values and ranges therebetween), and typically 0-0.01 wt. %.

In accordance with another and/or alternative aspect of the present disclosure, the metal alloy optionally includes a controlled amount of nitrogen; however, this is not required. Large amounts of nitrogen in the metal alloy can adversely affect the ductility of the metal alloy. This can in turn adversely affect the elongation properties of the metal alloy. In one non-limiting formulation, the metal alloy includes less than about 0.001 wt. % nitrogen (e.g., 0 wt. % to 0.0009999 wt. % and all values and ranges therebetween). It is believed that the nitrogen content should be less than the content of carbon or oxygen in the metal alloy. In one non-limiting formulation, the atomic ratio of carbon to nitrogen is at least about 1.5:1 (e.g., 1.5:1 to 400:1 and all values and ranges therebetween). In another non-limiting formulation, the atomic ratio of oxygen to nitrogen is at least about 1.2:1 (e.g., 1.2:1 to 150:1 and all value and ranges therebetween).

In accordance with another and/or alternative aspect of the present disclosure, the metal alloy that is used to form all or part of the frame for a prosthetic heart valve 1) is not clad, metal coated, metal sprayed, plated and/or formed (e.g., cold worked, hot worked, etc.) onto another metal, or 2) does not have another metal or metal alloy metal sprayed, coated, plated, clad and/or formed onto the metal alloy. It will be appreciated that in some applications, the metal alloy of the present disclosure may be clad, metal sprayed, coated, plated and/or formed onto another metal, or another metal or metal alloy may be plated, metal sprayed, coated, clad and/or formed onto the metal alloy when forming all or a portion of a frame for a prosthetic heart valve.

In accordance with another and/or alternative aspect of the present disclosure, the metal alloy can be used to form a) a coating (e.g., cladding, dip coating, spray coating, plated coating, welded coating, plasma coating, etc.) on a portion of all of a frame for a prosthetic heart valve, or b) a core of a portion or all of a frame for a prosthetic heart valve. The composition of the coating is different from the composition of the material surface to which the metal alloy is coated. The coating thickness of the metal alloy is non-limiting (e.g., 1 μm to 1 inch and all values and ranges therebetween). In one non-limiting example, there is provided a frame for a prosthetic heart valve wherein a core or base layer of the frame for a prosthetic heart valve is formed of a metal or metal alloy (e.g., chromium alloy, titanium, titanium alloy, stainless steel, iron alloy, CoCr alloy, rhenium alloy, molybdenum alloy, tungsten alloy, Ta—W alloy, refractory metal alloy, MoTa alloy, MoRe alloy, etc.) or polymer or ceramic or composite material, and the other layer of the coated frame for a prosthetic heart valve is formed of a different metal or metal alloy. The core or base layer and the other layer of the frame for a prosthetic heart valve can each form 10-99% (and all values and ranges therebetween) of the overall cross section of the frame for a prosthetic heart valve. When the outer metal coating is a rhenium containing alloy, such rhenium alloy can be used to create a hard surface on the frame for a prosthetic heart valve at specific locations as well as all over the surface. In another non-limiting embodiment, the core or base layer of the frame for a prosthetic heart valve can be formed of a rhenium containing alloy and the coating layer includes one or more other materials (e.g., another type of metal or metal alloy [e.g., chromium alloy, titanium, titanium alloy, stainless steel, iron alloy, CoCr alloy, rhenium alloy, molybdenum alloy, tungsten alloy, Ta—W alloy, refractory metal alloy, MoTa alloy, MoRe alloy, etc.), polymer coating, ceramic coating, composite material coating, etc.). Non-limiting benefits of using the rhenium containing alloy in the core or interior layer of the frame for a prosthetic heart valve can include reducing the size of the frame for a prosthetic heart valve, increasing the strength of the frame for a prosthetic heart valve, and/or maintaining or reducing the cost of the frame for a prosthetic heart valve. As can be appreciated, the use of the rhenium containing alloy can result in other or additional advantages. The core or base layer size and/or thickness of the metal alloy are non-limiting. In one non-limiting example, there is provided a frame for a prosthetic heart valve that is at least partially formed from layered materials wherein a top layer is formed of material that is different form one or more other layers and the rhenium containing alloy forms one of the layers below the top layer, and the top layer is formed of a metal that is different from the rhenium containing alloy (e.g., chromium alloy, titanium, titanium alloy, stainless steel, iron alloy, CoCr alloy, rhenium alloy, molybdenum alloy, tungsten alloy, Ta—W alloy, refractory metal alloy, MoTa alloy, MoRe alloy, etc.). The core or lower layer or base layer and the outer layer of the layered material can each form 10-99% (and all values and ranges therebetween) of the overall cross section of the layered material.

In another and/or alternative non-limiting embodiment of the disclosure, the average tensile elongation of the metal alloy used to at least partially form the frame for a prosthetic heart valve is optionally at least about 20% (e.g., 20-50% average tensile elongation and all values and ranges therebetween). An average tensile elongation of at least 20% for the metal alloy is useful to facilitate in the frame for a prosthetic heart valve being properly expanded when positioned in the treatment area of a body. The desired tensile elongation can be obtained from a unique combination of the metals in the metal alloy in combination with achieving the desired purity and composition of the alloy and the desired grain size of the metal alloy.

In accordance with another and/or alternative aspect of the present disclosure, the metal alloy is optionally at least partially formed by a swaging process; however, this is not required. In one non-limiting embodiment, swaging is performed on the metal alloy to at least partially or fully achieve final dimensions of one or more portions of the frame for a prosthetic heart valve. The swaging dies can be shaped to fit the final dimension of the frame for a prosthetic heart valve; however, this is not required.

In accordance with another and/or alternative aspect of the present disclosure, the metal alloy can optionally be nitrided; however, this is not required. The nitrided layer on the metal alloy can function as a lubricating surface during the optional drawing of the metal alloy when partially or fully forming the frame for a prosthetic heart valve.

In accordance with another and/or alternative non-limiting aspect of the present disclosure, the frame for a prosthetic heart valve can optionally be partially (e.g., 1% to 99.99% and all values and ranges therebetween) or fully be coated with and/or include one or more agents. When one or more agents are coated on the prosthetic heart valve, and the prosthetic heart valve includes an enhancement layer, one or more agents are generally coated on the outer surface of the enhancement layer. The term "agent" includes, but is not limited to a substance, pharmaceutical, biologic, veterinary product, drug, and analogs or derivatives otherwise formulated and/or designed to prevent, inhibit and/or treat one or more clinical and/or biological events, and/or to promote healing. Non-limiting examples of clinical events that can be addressed by one or more agents include, but are not limited to, viral, fungus and/or bacterial infection; vascular diseases and/or disorders; lymphatic diseases and/or disorders; cancer; implant rejection; pain; nausea; swelling; organ failure; immunity diseases and/or disorders; cell growth inhibitors, blood diseases and/or disorders; heart diseases and/or disorders; neuralgia diseases and/or disorders; fatigue; genetic diseases and/or disorders; trauma; cramps; muscle spasms; tissue repair; nerve repair; neural regeneration and/or the like.

The type and/or amount of agent included coated on frame for a prosthetic heart valve can vary. In accordance with another and/or alternative aspect of the present disclosure, one or more portions of the frame for a prosthetic heart valve can optionally 1) include the same or different agents, 2) include the same or different amount of one or more agents, 3) include the same or different polymer coatings, 4) include the same or different coating thicknesses of one or more polymer coatings, 5) have one or more portions of the frame for a prosthetic heart valve controllably release and/or uncontrollably release one or more agents, and/or 6) have one or more portions of the frame for a prosthetic heart valve controllably release one or more agents and one or more portions of the frame for a prosthetic heart valve uncontrollably release one or more agents.

In accordance with another and/or alternative aspect of the present disclosure, one or more surfaces of the frame for a prosthetic heart valve can optionally be treated to achieve the desired coating properties of the one or more agents and/or one or more polymers coated on the frame for a prosthetic heart valve. Such surface treatment techniques include, but are not limited to, cleaning, buffing, smoothing, nitriding, annealing, swaging, cold working, etching (chemical etching, plasma etching, etc.), etc. As can be appreciated, other or additional surface treatment processes can be used prior to the coating of one or more agents and/or polymers on the surface of the frame for a prosthetic heart valve.

In another and/or alternative non-limiting aspect of the disclosure, the frame for a prosthetic heart valve can optionally include a marker material that facilitates enabling the frame for a prosthetic heart valve to be properly positioned in a body passageway. The marker material is typically designed to be visible to electromagnetic waves (e.g., x-rays, microwaves, visible light, infrared waves, ultraviolet waves, etc.); sound waves (e.g., ultrasound waves, etc.); magnetic waves (e.g., MRI, etc.); and/or other types of electromagnetic waves (e.g., microwaves, visible light, infrared waves, ultraviolet waves, etc.).

In accordance with another and/or alternative aspect of the present disclosure, the frame for a prosthetic heart valve or one or more regions of the frame for a prosthetic heart valve can optionally be constructed by use of one or more microelectromechanical manufacturing (MEMS) techniques (e.g., micro-machining, laser micro-machining, micro-molding, etc.); however, other or additional manufacturing techniques can be used.

In accordance with another and/or alternative aspect of the present disclosure, the frame for a prosthetic heart valve can optionally include one or more surface structures (e.g., pore, channel, pit, rib, slot, notch, bump, teeth, needle, well, hole, groove, etc.). These structures can be at least partially formed by MEMS (e.g., micro-machining, etc.) technology and/or other types of technology.

In accordance with another and/or alternative aspect of the present disclosure, the frame for a prosthetic heart valve can optionally include one or more micro-structures (e.g., micro-needle, micro-pore, micro-cylinder, micro-cone, micro-pyramid, micro-tube, micro-parallelopiped, micro-prism, micro-hemisphere, teeth, rib, ridge, ratchet, hinge, zipper, zip-tie like structure, etc.) on the surface of the frame for a prosthetic heart valve. As defined herein, a "micro-structure" is a structure having at least one dimension (e.g., average width, average diameter, average height, average length, average depth, etc.) that is no more than about 2 mm, and typically no more than about 1 mm.

In another and/or alternative aspect of the disclosure, the frame for a prosthetic heart valve can optionally be an expandable device that can be expanded by use of some other device (e.g., balloon, etc.). The frame for a prosthetic heart valve can be fabricated from a material that has no or substantially no shape-memory characteristics.

In accordance with another and/or alternative aspect of the present disclosure, there is optionally provided a near net process for a frame of the frame for a prosthetic heart valve. In one non-limiting embodiment of the disclosure, there is provided a method of powder pressing materials and increasing the strength post-sintering by imparting additional cold work. In one non-limiting embodiment, the green part is pressed and then sintered. Thereafter, the sintered part is again pressed to increase its mechanical strength by imparting cold work into the pressed and sintered part.

In accordance with another and/or alternative aspect of the present disclosure, the metal alloy used to at least partially or fully form the frame for a prosthetic heart valve can optionally be initially formed into a blank, a rod, a tube, etc., and then finished into final form by one or more finishing processes. The metal alloy blank, rod, tube, etc., can be formed by various techniques such as, but not limited to, 1) melting the metal alloy and/or metals that form the metal alloy (e.g., vacuum arc melting, etc.) and then extruding and/or casting the metal alloy into a blank, rod, tube, etc., 2) melting the metal alloy and/or metals that form the metal alloy, forming a metal strip, and then rolling and welding the strip into a blank, rod, tube, etc., 3) consolidating the metal powder of the metal alloy and/or metal powder of metals that form the metal alloy into a blank, rod, tube, etc., or 4) 3-D printing the metal powder of the metal alloy and/or metal powder of metals that form the metal alloy into a blank, rod, tube, etc. When the metal alloy is formed into a blank, the shape and size of the blank is non-limiting.

In accordance with another and/or alternative aspect of the present disclosure, when the metal powder is consolidated to form the metal alloy into a blank, rod, tube, etc., the metal powder is pressed together to form a solid solution of the metal alloy into a near net frame for a prosthetic heart valve, near net component of a frame for a prosthetic heart valve, blank, rod, tube, etc. Typically, the pressing process is by an isostatic process (i.e., uniform pressure applied from all sides on the metal powder); however other processes can be used. When the metal powders are pressed together isostatically, cold isostatic pressing (CIP) is typically used to consolidate the metal powders; however, this is not required. The pressing process can be performed in an inert atmosphere, an oxygen-reducing atmosphere (e.g., hydrogen, argon and hydrogen mixture, etc.), and/or under a vacuum; however, this is not required.

In accordance with another and/or alternative aspect of the present disclosure, when metal powder is used to 3D print a frame for a prosthetic heart valve, component of a frame for a prosthetic heart valve, blank, rod, tube, etc., the average particle size of the metal powder is optionally 2-62 microns, and more particularly about 5-49.9 microns, the average density of the metal powders is greater than 5 g/cm$^3$, and the metal powder is generally spherical-shaped, and the Hall flow (s/50 g) is less than 30 seconds (e.g., 2-29.99 seconds and all values and ranges therebetween). In another non-limiting embodiment of the disclosure, the average tensile elongation of the metal alloy used to partially or fully form the prosthetic heart valve is optionally at least about 25% (e.g., 25%-50% average tensile elongation and all values and ranges therebetween).

In accordance with another and/or alternative non-limiting aspect of the present disclosure, one or more components of the prosthetic heart valve (e.g., frame, inner skirt, outer skirt, leaflets, material used to secure leaflets to frame, etc.) can be partially (e.g., 1% to 99.99% and all values and ranges therebetween) or fully be coated with an enhancement layer to improve one or more properties of the prosthetic heart valve (e.g., change exterior color of material having coated surface, increase surface hardness by use of the coated surface, increase surface toughness material having coated surface, reduced friction via use of the coated surface, improve scratch resistance of material that has the coated surface, improve impact wear of coated surface, improve resistance to corrosion and oxidation of coated material, form a non-stick coated surface, improve biocompatibility of material having the coated surface, reduce toxicity of material having the coated surface, reduce ion release from material having the coated surface, the enhancement layer forms a surface that is less of an irritant to cell about the coated surface after the prosthetic heart valve is implanted, reduces the rate to which cells grown on coated surface after prosthetic heart valve is implanted, reduce rate to which leaflets fail to properly operate after prosthetic heart valve is implanted, etc.). In one non-limiting embodiment, only the frame of the prosthetic heart valve includes the enhancement layer, and wherein the frame is partially (e.g., 1-99.99% and all values and ranges therebetween) or fully coated with the enhancement layer. In another non-limiting embodiment, only one or more of all of the leaflets of the prosthetic heart valve include the enhancement layer, and wherein one or more or all of the leaflets are partially (e.g., 1-99.99% and all values and ranges therebetween) or fully coated with the enhancement layer. In another non-limiting embodiment, only the inner skirt of the prosthetic heart valve includes the enhancement layer, and wherein the inner skirt is partially (e.g., 1-99.99% and all values and ranges therebetween) or fully coated with the enhancement layer. In another non-limiting embodiment, only the outer skirt of the prosthetic heart valve includes the enhancement layer, and wherein the outer skirt is partially (e.g., 1-99.99% and all values and ranges therebetween) or fully coated with the enhancement layer. In another non-limiting embodiment, two or more or all of a) the frame, b) one or more or all of the leaflets, c) the inner skirt and d) the outer skirt of the prosthetic heart valve are partially (e.g., 1-99.99% and all values and ranges therebetween) or are fully coated with the enhancement layer. Non-limiting enhancement layers that can be applied to a portion or all of the outer surface of one or more components of the prosthetic heart valve includes chromium nitride (CrN), diamond-like carbon (DLC), titanium nitride (TiN), titanium oxynitride or titanium nitride oxide (TiNOx), zirconium nitride (ZrN), zirconium oxide (ZrO$_2$), zirconium oxynitride (ZrNxOy) [e.g., cubic ZrN:O, cubic ZrO$_2$:N, tetragonal ZrO$_2$:N, and monoclinic ZrO$_2$:N phase coatings], oxyzirconium-nitrogen-carbon ((ZrNC), zirconium OxyCarbide (ZrOC), and combinations of such coatings. In one non-limiting embodiment, the one or more enhancement layers are optionally applied to a portion or all of the outer surface of one or more components of the prosthetic heart valve by a vacuum process using an energy source to vaporize material and deposit a thin layer of enhancement layer material. Such vacuum coating process, when used, can include a physical vapor deposition (PVD) process (e.g., sputter deposition, cathodic arc deposition or electron beam heating, etc.), chemical vapor deposition (CVD) process, atomic layer deposition (ALD) process, or a plasma-enhanced chemical vapor deposition (PE-CVD) process. In one non-limiting embodiment, the coating process is one or more of a PVD, CVD, ALD and PE-CVD, and wherein the coating process occurs at a temperature of 200-400° C. (and all values and ranges therebetween) for at least 10 minutes (e.g., 10-400 minutes and all values and ranges therebetween). In another non-limiting embodiment, the coating process is one or more of a PVD, CVD, ALD and PE-CVD, and wherein the coating process occurs at a temperature of 220-300° C. for 60-120 minutes. In another non-limiting embodiment, when the materials of the one or more enhancement layers are to be applied to the outer surface of the frame of the prosthetic heart valve that is partially or fully formed of a metal alloy, the materials of the one or more enhancement layers can optionally be combine with one or more metals in the metal alloy, and/or combined with nitrogen, oxygen, carbon, or other elements that are in the metal alloy and/or present in the atmosphere about the metal alloy to a form an enhancement layer on the outer surface of the metal alloy. In another non-limiting embodiment, when the materials of the one or more enhancement layers are to be applied to the outer surface of the frame for a prosthetic heart valve that is partially or fully formed of a metal alloy, the materials of the one or more enhancement layers can optionally be used to form various coating colors on the outer surface of the metal alloy (e.g., gold, copper, brass, black, rose gold, chrome, blue, silver, yellow, green, etc.). In another non-limiting embodiment, the thickness of the enhancement layer is greater than 1 nanometer (e.g., 2 nanometers to 100 microns and all values and ranges therebetween), and typically 0.1-25 microns, and more typically 0.2-10 microns. In another non-limiting embodiment, the hardness of the enhancement layer can be at least 5 GPa (ASTM C1327-15 or ASTM C1624-05), typically 5-50 GPa (and all values and ranges therebetween), more typically 10-25 GPa, and still more typically 14-24 GPa. In another non-limiting embodiment, the coefficient of friction (COF) of the enhancement layer can be 0.04-0.2 (and all values and ranges therebetween), and typically 0.6-0.15. In another non-limiting embodiment, the wear rate of the enhancement layer can be $0.5\times10^{-7}$ mm$^3$/N-m to $3\times10^{-7}$ mm$^3$/N-m (an all values and ranges therebetween), and typically $1.2\times10^{-7}$ mm$^3$/N-m to $2\times10^{-7}$ mm$^3$/N-m. In another non-limiting embodiment, silicon-based precursors (e.g., trimethysilane, tetramethylsilane, hexachlorodisilane, silane, dichlorosilane, trichlorosilane, silicon tetrachloride, tris(dimethylamino) silane, bis(tert-butylamino)silane, trisilylamine, allyltrimethoxysilane, (3-aminopropyl)triethoxysilane, butyltrichlorosilane, n-sec-butyl(trimethylsilyl)amine, chloropentamethyldisilane, 1,2-dichlorotetramethyldisilane, [3-(diethylamino)propyl]trimethoxysilane, 1,3-diethyl-1,1,3,3-tetramethyldisilazane, dimethoxydimethylsilane, dodecamethylcyclohexasilane, hexamethyldisilane, isobutyl (trimethoxy)silane, methyltrichlorosilane, 2,4,6,8,10-pentamethylcyclopentasiloxane, pentamethyldisilane, n-propyltriethoxysilane, silicon tetrabromide, silicon tetrabromide, etc.) can optionally be used to facilitate in the application of the enhancement layer to one or more portions or all of the prosthetic heart valve. In one non-limiting embodiment, the enhancement layer includes no more than 0.1 wt. % nickel, no more than 0.1 wt. % chromium, and/or no more than 0.1 wt. % cobalt. In another non-limiting embodiment, the outer surface of the frame of the prosthetic heart valve includes no more than 0.1 wt. % nickel, no more than 0.1 wt. % chromium, and/or no more than 0.1 wt. % cobalt. The adhesion layer includes no more than 0.1 wt. % nickel, no more than 0.1 wt. % chromium, and/or no more than 0.1 wt. % cobalt.

In accordance with another and/or alternative non-limiting aspect of the present disclosure, one or more components of the prosthetic heart valve can be partially or fully coated with an enhancement layer composition that includes a chromium nitride (CrN) coating. A portion or all of the prosthetic heart valve can be partially or fully coated with the chromium nitride (CrN) coating. The enhancement layer can be used to improve hardness, improve toughness, reduced friction, resistant impact wear, improve resistance to corrosion and oxidation, and/or form a reduced stick surface when in contact with many different materials. In accordance with one non-limiting embodiment, the chromium nitride (CrN) coating generally includes 40-85 wt. % Cr (and all values and ranges therebetween), 15-60 wt. % N (and all values and ranges therebetween), 0-10 wt. % Re (and all values and ranges therebetween), 0-10 wt. % Si (and all values and ranges therebetween), 0-2 wt. % O (and all values and ranges therebetween), and 0-2 wt. % C (and all values and ranges therebetween). In one non-limiting coating process, all or a portion of the outer surface of one or more components of the prosthetic heart valve are initially coated with Cr metal. The Cr metal coating can be applied by PVD, CVD, ALD and PE-CVD in an inert environment. The coating thickness of Cr metal is 0.5-15 microns. Thereafter, the Cr metal coating is exposed to nitrogen gas and/or a nitrogen containing gas compound to cause the nitrogen to react with the Cr metal coating to form a layer of CrN on the outer surface of the Cr metal coating and/or the outer surface of one or more components of the prosthetic heart valve. Particles of Cr metal can optionally be mixed with nitrogen gas and/or a nitrogen containing gas compound to facilitate in the formation of the CrN coating. When Cr metal particles are used, the initial Cr coating layer on the outer surface of one or more components of the prosthetic heart valve can optionally be eliminated. In another non-limiting embodiment, the enhancement layer composition generally includes 65-80 wt. % Cr, 15-30 wt. % N, 0-8 wt. % Re, 0-1 wt. % Si, 0-1 wt. % O, and 0-1 wt. % C.

In accordance with another and/or alternative non-limiting aspect of the present disclosure, one or more components of the prosthetic heart valve can be partially or fully coated with an enhancement layer composition that includes a diamond-Like Carbon (DLC) coating. A portion or all of the prosthetic heart valve can be partially or fully coated with the diamond-Like Carbon (DLC) coating. The enhancement layer can be used to improve hardness, improve toughness, reduced friction, resistant impact wear, improve resistance to corrosion and oxidation, improve biocompatibility, and/or form a reduced stick surface when in contact with many different materials. In one non-limiting embodiment, the diamond-Like Carbon (DLC) coating generally includes 60-99.99 wt. % C (and all values and ranges therebetween), 0-2 wt. % N (and all values and ranges therebetween), 0-10 wt. % Re (and all values and ranges therebetween), 0-20 wt. % Si (and all values and ranges therebetween), and 0-2 wt. % O (and all values and ranges therebetween). The carbon coating can be applied by PVD, CVD, ALD and PE-CVD in an inert environment. The carbon layer can be applied by use of methane and/or acetylene gas; however, other or additional carbon sources can be used. The coating thickness of the carbon is 0.5-15 microns. In another non-limiting embodiment, all or a portion of the prosthetic heart valve are coated with the enhancement layer composition that generally includes 90-99.99 wt. % C, 0-1 wt. % N, 0-8 wt. % Re, 0-1 wt. % Si, and 0-1 wt. % O.

In accordance with another and/or alternative non-limiting aspect of the present disclosure, one or more components of the prosthetic heart valve can be partially or fully coated with an enhancement layer composition that includes a titanium nitride (TiN) coating. A portion or all of the outer surface of the one or more components of the prosthetic heart valve can include the titanium nitride (TiN) coating. The enhancement layer can be used to improve hardness, improve toughness, improve resistance to corrosion and oxidation, reduced friction, and/or form a reduced stick surface when in contact with many different materials. In one non-limiting embodiment, all or a portion of the outer surface of the one or more components of the prosthetic heart valve are optionally initially coated with Ti metal. The Ti metal coating, when applied, can be applied by PVD, CVD, ALD and PE-CVD in an inert environment. The coating thickness of Ti metal is 0.05-15 microns (and all values and ranges therebetween). As can be appreciated, the initial Ti coating is optional. Thereafter, the Ti metal coating, when applied, is exposed to nitrogen gas and/or a nitrogen containing gas compound and optionally titanium particles to cause the nitrogen to react with the Ti metal coating and/or titanium metal particles to form a layer of TiN on the outer surface of the Ti metal coating and/or the outer surface of the one or more components of the prosthetic heart valve. If a titanium layer is not preapplied, the TiN coating can be formed by exposing the outer surface of one or more components of the prosthetic heart valve to titanium particles and nitrogen gas and/or a nitrogen containing gas compound. The coating thickness of the TiN coating is generally at least 0.1 microns (e.g., 0.1-15 microns and all values and ranges therebetween), and typically 0.2-2 microns.

In accordance with another and/or alternative non-limiting aspect of the present disclosure, one or more components of the prosthetic heart valve can be partially or fully coated with an enhancement layer composition that includes a titanium oxynitride or titanium nitride oxide (TiNOx) coating. A portion or all of the outer surface of the one or more components of the prosthetic heart valve can include the titanium oxynitride or titanium nitride oxide (TiNOx) coating. The enhancement layer can be used to improve hardness, improve toughness, improve resistance to corrosion and oxidation, reduced friction, and/or form a reduced stick surface when in contact with many different materials, and/or promote nitric oxide formation on the surface of the coating. In one non-limiting embodiment, all or a portion of the outer surface of the one or more components of the prosthetic heart valve are optionally initially coated with Ti metal. The Ti metal coating, when applied, can be applied by PVD, CVD, ALD and PE-CVD in an inert environment. The coating thickness of Ti metal is 0.05-15 microns (and all values and ranges therebetween). As can be appreciated, the initial Ti coating is optional. Thereafter, the Ti metal coating is exposed to titanium particles and a nitrogen and oxygen mixture that can include nitrogen gas, oxygen gas, a nitrogen containing gas compound and/or an oxygen containing gas compound to cause the nitrogen and oxygen to react with the Ti metal coating, if such coating is used, and/or with the Ti metal particles to form a layer of TiNOx on the outer surface of the Ti metal coating and/or the outer surface of one or more components of the prosthetic heart valve. The ratio of the N to the O can be varied to control the amount of O in the TiNOx coating. If a titanium layer is not preapplied, the TiNOx coating can be formed by exposing one or more components of the prosthetic heart valve to titanium particles and a nitrogen and oxygen source such as nitrogen gas, oxygen gas, a nitrogen containing gas compound and/or an oxygen containing gas compound. The ratio of N to O when forming the TiNOx coating is generally 1:10 to 10:1 (and all values and ranges therebetween). The coating thickness of the TiNOx coating is generally at least 0.1 microns (e.g., 0.1-15 microns and all values and ranges therebetween), and typically 0.2-2 microns. In another non-limiting embodiment, a TiNOx coating is applied to a portion or all of the outer surface of the one or more components of the prosthetic heart valve, and the TiNOx coating is formed by a) exposing the outer surface of a portion of all of the one or more components of the prosthetic heart valve to Ti particles (PVD, CVD, ALD and PE-CVD process) and/or a Ti containing solution to form a Ti layer on a portion of all of the one or more components of the prosthetic heart valve, and wherein the thickness of the Ti coating is 0.05-5 microns, and b) exposing the Ti coating to a nitrogen and oxygen source such as nitrogen gas, oxygen gas, a nitrogen containing gas compound and/or an oxygen containing gas compound to form a TiNOx coating, and wherein ratio of N to O when forming the TiNOx coating is generally 1:10 to 10:1, and wherein the coating thickness of the TiNOx coating is 0.2-5 microns. In another non-limiting embodiment, a TiNOx coating is applied to a portion or all of the outer surface of the one or more components of the prosthetic heart valve, and the TiNOx coating is formed by exposing a portion or all of the outer surface of the prosthetic heart valve to Ti particles and a nitrogen and oxygen source such as nitrogen gas, oxygen gas, a nitrogen containing gas compound and/or an oxygen containing gas compound to form a TiNOx coating, and wherein ratio of N to O when forming the TiNOx coating is generally 1:10 to 10:1, and wherein the coating thickness of the TiNOx coating is 0.2-5 microns. In another non-limiting embodiment, the enhancement layer composition generally includes 20-85 wt. % Ti (and all values and ranges therebetween), 0.5-35 wt. % N (and all values and ranges therebetween), 0-10 wt. % Re (and all values and ranges therebetween), and 0.5-35 wt. % O (and all values and ranges therebetween). In another non-limiting embodiment, a coating of TiNOx was formed on one or more components of the prosthetic heart valve by reactive physical vapor deposition in a vacuum chamber. Depending on the oxygen-nitrogen ratio during vapor deposition, a coating deposit of TiNOx with defined composition and resistivity can be coated on the outer surface of the one or more components of the prosthetic heart valve.

In accordance with another and/or alternative non-limiting aspect of the present disclosure, the prosthetic heart valve can be partially or fully coated with an enhancement layer composition that includes a zirconium nitride (ZrN) coating. The enhancement layer can be used to improve hardness, improve toughness, improve resistance to corrosion and oxidation, reduced friction, and/or form a reduced stick surface when in contact with many different materials. In one non-limiting embodiment all or a portion of the outer surface of the one or more components of the prosthetic heart valve is initially coated with Zr metal. The Zr metal coating can be applied by PVD, CVD, ALD and PE-CVD in an inert environment. The coating thickness of Zr metal is 0.5-15 microns. Thereafter, the Zr metal coating is exposed to nitrogen gas and/or a nitrogen containing gas compound to cause the nitrogen to react with the Zn metal coating to form a layer of ZrN on the outer surface of the Zr metal coating and/or the outer surface of one or more components of the prosthetic heart valve. Particles of Zr metal can optionally be mixed with nitrogen gas and/or a nitrogen containing gas compound to facilitate in the formation of the ZrN coating. When Zr metal particles are used, the initial Zr coating layer on the outer surface of one or more components of the prosthetic heart valve can optionally be eliminated. The ZrN coating has been found to produce a gold-colored enhancement layer color. In another non-limiting embodiment, the enhancement layer composition generally includes 35-90 wt. % Zr (and all values and ranges therebetween), 5-25 wt. % N (and all values and ranges therebetween), 0-10 wt. % Re (and all values and ranges therebetween), 0-20 wt. % Si (and all values and ranges therebetween), 0-2 wt. % O (and all values and ranges therebetween), and 0-2 wt. % C (and all values and ranges therebetween). In another non-limiting embodiment, the enhancement layer composition generally includes 80-90 wt. % Zr, 10-20 wt. % N, 0-8 wt. % Re, 0-1 wt. % Si, 0-1 wt. % O, and 0-1 wt. % C.

In accordance with another and/or alternative non-limiting aspect of the present disclosure, the prosthetic heart valve can be partially or fully coated with an enhancement layer composition that includes a zirconium oxide ($ZrO_2$) coating. The enhancement layer can be used to improve hardness, improve toughness, improve resistance to corrosion and oxidation, reduced friction, and/or form a reduced stick surface when in contact with many different materials. In one non-limiting embodiment all or a portion of the outer surface of the one or more components of the prosthetic heart valve is initially coated with Zr metal. The Zr metal coating can be applied by PVD, CVD, ALD and PE-CVD in an inert environment. The coating thickness of Zr metal is 0.5-15 microns. Thereafter, the Zr metal coating is exposed to oxygen gas and/or oxygen containing gas compound to cause the oxygen to react with the Zn metal coating to form a layer of zirconium oxide ($ZrO_2$) on the outer surface of the Zr metal coating and/or the outer surface of the one or more components of the prosthetic heart valve. Particles of Zr metal can optionally be mixed with oxygen gas and/or an oxygen containing gas compound to facilitate in the formation of the $ZrO_2$ coating. When Zr metal particles are used, the initial Zr coating layer on the outer surface of one or more components of the prosthetic heart valve can optionally be eliminated. The zirconium oxide ($ZrO_2$) coating has been found to produce a blue colored enhancement layer color. In another non-limiting embodiment, the enhancement layer composition generally includes 35-90 wt. % Zr (and all values and ranges therebetween), 10-35 wt. % O (and all values and ranges therebetween), 0-2 wt. % N (and all values and ranges therebetween), 0-10 wt. % Re (and all values and ranges therebetween), 0-20 wt. % Si (and all values and ranges therebetween), and 0-2 wt. % C (and all values and ranges therebetween). In another non-limiting embodiment, the enhancement layer composition generally includes 70-80 wt. % Zr, 20-30 wt. %, 0-1 wt. % N, 0-8 wt. % Re, 0-1 wt. % Si, and 0-1 wt. % C.

In accordance with another and/or alternative non-limiting aspect of the present disclosure, the prosthetic heart valve can be partially or fully coated with an enhancement layer composition that includes both a zirconium oxide ($ZrO_2$) coating and a zirconium nitride coating (ZrN). The enhancement layer can be used to improve hardness, improve toughness, improve resistance to corrosion and oxidation, reduced friction, and/or form a reduced stick surface when in contact with many different materials. In one non-limiting embodiment all or a portion of the outer surface of the metal alloy is initially coated with Zr metal. The Zr metal coating can be applied by PVD, CVD, ALD and PE-CVD in an inert environment. The coating thickness of Zr metal is 0.5-15 microns. Thereafter, the Zr metal coating is exposed to a) both oxygen gas and/or oxygen containing gas compound and also to nitrogen gas and/or nitrogen containing gas compound, b) nitrogen gas and/or nitrogen containing gas compound and then to oxygen gas and/or oxygen containing gas compound, or c) oxygen gas and/or oxygen gas containing compound and then to nitrogen gas and/or nitrogen gas containing compound. The coating composition of the zirconium oxide ($ZrO_2$) coating and the zirconium nitride coating (ZrN) are similar or the same as discussed above. As discussed above, Particles of Zr metal can optionally be mixed with oxygen gas and/or an oxygen containing gas compound to facilitate in the formation of the $ZrO_2$ coating and the nitrogen gas and/or nitrogen gas containing compound to facilitate in the formation of the ZrN coating. When Zr metal particles are used, the initial Zr coating layer on the outer surface of one or more components of the prosthetic heart valve can optionally be eliminated.

In accordance with another and/or alternative non-limiting aspect of the present disclosure, the prosthetic heart valve can be partially or fully coated with an enhancement layer composition that includes a zirconium oxycarbide (ZrOC) coating. The enhancement layer can be used to improve hardness, improve toughness, improve resistance to corrosion and oxidation, reduced friction, and/or form a reduced stick surface when in contact with many different materials. In one non-limiting embodiment all or a portion of the outer surface of the metal alloy is initially coated with Zr metal. The Zr metal coating can be applied by PVD, CVD, ALD and PE-CVD in an inert environment. The coating thickness of Zr metal is 0.5-15 microns. Thereafter, the Zr metal coating is exposed to a) both to oxygen gas and/or an oxygen containing gas compound and to carbon and/or a carbon containing gas compound (e.g., methane and/or acetylene gas), b) carbon and/or a carbon containing gas compound and then to oxygen gas and/or an oxygen containing gas compound, or c) oxygen gas and/or oxygen containing gas compound and then to carbon and/or carbon containing gas compound. Particles of Zr metal can optionally be mixed with oxygen gas and/or an oxygen containing gas compound and the carbon and/or carbon containing gas compound to facilitate in the formation of the zirconium oxycarbide (ZrOC) coating. When Zr metal particles are used, the initial Zr coating layer on the outer surface of one or more components of the prosthetic heart valve can optionally be eliminated. In another non-limiting embodiment, the enhancement layer composition generally includes 40-95 wt. % Zr (and all values and ranges therebetween), 5-25 wt. % O (and all values and ranges therebetween), and 10-40 wt. % C (and all values and ranges therebetween), 0-2 wt. % N (and all values and ranges therebetween), 0-10 wt. % Re (and all values and ranges therebetween), and 0-20 wt. % Si (and all values and ranges therebetween). In another non-limiting embodiment, the enhancement layer composition generally includes 40-65 wt. % Zr, 5-25 wt. % O, and 25-40 wt. % C, 0-1 wt. % N, 0-8 wt. % Re, and 0-1 wt. % Si.

In accordance with another and/or alternative non-limiting aspect of the present disclosure, one or more components of the prosthetic heart valve can be partially or fully coated with an enhancement layer composition that includes a zirconium oxynitride (ZrNxOy) [e.g., cubic ZrN:O, cubic $ZrO_2$:N, tetragonal $ZrO_2$:N, and monoclinic $ZrO_2$:N phase coatings]. A portion or all of the outer surface of the one or more components of the prosthetic heart valve can include the zirconium oxynitride (ZrNxOy). The enhancement layer can be used to improve hardness, improve toughness, improve resistance to corrosion and oxidation, reduced friction, form a reduced stick surface when in contact with many different materials, and/or promote nitric oxide formation on the surface of the coating. In one non-limiting embodiment, all or a portion of the outer surface of the one or more components of the prosthetic heart valve are optionally initially coated with Zr metal. The Zr metal coating, when applied, can be applied by PVD, CVD, ALD and PE-CVD in an inert environment. The coating thickness of Zr metal is 0.05-15 microns (and all values and ranges therebetween). As can be appreciated, the initial Zr coating is optional. Thereafter, the Zr metal coating is exposed to zirconium particles and a nitrogen and oxygen mixture that can include nitrogen gas, oxygen gas, a nitrogen containing gas compound and/or an oxygen containing gas compound to cause the nitrogen and oxygen to react with the Zr metal coating, if such coating is used, and/or with the Zr metal particles to form a layer of ZrNxOy on the outer surface of the Zr metal coating and/or the outer surface of the one or more components of the prosthetic heart valve. The ratio of the N to the O can be varied to control the amount of O and N in the ZrNxOy coating. If a zirconium layer is not preapplied, the ZrNxOy coating can be formed by exposing the outer surface of one or more components of the prosthetic heart valve to zirconium particles and a nitrogen and oxygen source such as nitrogen gas, oxygen gas, a nitrogen containing gas compound and/or an oxygen containing gas compound. The ratio of N to O when forming the ZrNxOy coating is generally 1:10 to 10:1 (and all values and ranges therebetween). The coating thickness of the ZrNxOy coating is generally at least 0.1 microns (e.g., 0.1-15 microns and all values and ranges therebetween), and typically 0.2-2 microns. In another non-limiting embodiment, a ZrNxOy coating is applied to a portion or all of the outer surface of the one or more components of the prosthetic heart valve, and the ZrNxOy coating is formed by a) exposing the outer surface of a portion of all of the one or more components of the prosthetic heart valve to Zr particles (PVD, CVD, ALD and PE-CVD process) and/or a Zr containing solution to form a Zr layer on a portion of all of the one or more components of the prosthetic heart valve, and wherein the thickness of the Zr coating is 0.05-5 microns, and b) exposing the Zr coating to a nitrogen and oxygen source such as nitrogen gas, oxygen gas, a nitrogen containing gas compound and/or an oxygen containing gas compound to form a ZrNxOy coating, and wherein ratio of N to O when forming the ZrNxOy coating is generally 1:10 to 10:1, and wherein the coating thickness of the ZrNxOy coating is 0.2-5 microns. In another non-limiting embodiment, a ZrNxOy coating is applied to a portion or all of the outer surface of the one or more components of the prosthetic heart valve, and the ZrNxOy coating is formed by exposing a portion or all of the outer surface of the one or more components of the prosthetic heart valve to Zr particles and a nitrogen and oxygen source such as nitrogen gas, oxygen gas, a nitrogen containing gas compound and/or an oxygen containing gas compound to form a ZrNxOy coating, and wherein ratio of N to O when forming the ZrNxOy coating is generally 1:10 to 10:1, and wherein the coating thickness of the ZrNxOy coating is 0.2-5 microns. In another non-limiting embodiment, the enhancement layer composition generally includes 20-85 wt. % Zr (and all values and ranges therebetween), 0.5-35 wt. % N (and all values and ranges therebetween), and 0.5-35 wt. % O (and all values and ranges therebetween). In another non-limiting embodiment, a coating of ZrNxOy was formed on one or more components of the prosthetic heart valve by reactive physical vapor deposition in a vacuum chamber. Depending on the oxygen-nitrogen ratio during vapor deposition, a coating deposit of ZrNxOy with defined composition and resistivity can be coated on the outer surface of the one or more components of the prosthetic heart valve.

In accordance with another and/or alternative non-limiting aspect of the present disclosure, the prosthetic heart valve can be partially or fully coated with an enhancement layer composition that includes a zirconium-nitrogen-carbon (ZrNC) coating. The enhancement layer can be used to improve hardness, improve toughness, improve resistance to corrosion and oxidation, reduced friction, and/or form a reduced stick surface when in contact with many different materials. In one non-limiting embodiment all or a portion of the outer surface of the one or more components of the prosthetic heart valve is initially coated with Zr metal. The Zr metal coating can be applied by PVD, CVD, ALD and PE-CVD in an inert environment. The coating thickness of Zr metal is 0.5-15 microns. Thereafter, the Zr metal coating is exposed to nitrogen gas and/or a nitrogen containing gas compound and then to carbon and/or a carbon containing gas compound (e.g., methane and/or acetylene gas). The color of the ZrNC will vary depending on the amount of C and N in the coating. Particles of Zr metal can optionally be mixed with nitrogen gas and/or a nitrogen containing gas compound and the carbon and/or a carbon containing gas compound to facilitate in the formation of the ZrNC coating. When Zr metal particles are used, the initial Zr coating layer on the outer surface of one or more components of the prosthetic heart valve can optionally be eliminated. In one non-limiting embodiment, the enhancement layer composition generally includes 40-95 wt. % Zr (and all values and ranges therebetween), 5-40 wt. % N (and all values and ranges therebetween), and 5-40 wt. % C (and all values and ranges therebetween), 0-2 wt. % O (and all values and ranges therebetween), 0-10 wt. % Re (and all values and ranges therebetween), and 0-20 wt. % Si (and all values and ranges therebetween). In another non-limiting embodiment, the enhancement layer composition generally includes 40-80 wt. % Zr, 5-25 wt. % N, and 5-25 wt. % C, 0-1 wt. % O, 0-8 wt. % Re, and 0-1 wt. % Si.

In accordance with another and/or alternative non-limiting aspect of the present disclosure, there is provided a prosthetic heart valve that includes an expandable frame, a leaflet structure supported by the frame, and an optional inner skirt secured to the surface of the frame and/or leaflet structure.

In accordance with another and/or alternative non-limiting aspect of the present disclosure, the expandable frame of the prosthetic heart valve is configured to be radially collapsible to a collapsed or crimped state for introduction into the body (e.g., on a delivery catheter, etc.) and radially expandable to an expanded state for implanting the prosthetic heart valve at a desired location in the heart. The expandable frame of the prosthetic heart valve is formed of a plastically-expandable material that permits crimping of the frame to a smaller profile for delivery and expansion of the frame at the treatment site. The expansion of the crimped frame of the prosthetic heart can be by an expansion device such as, but not limited to, a balloon of on a balloon catheter. The expandable frame and/or prosthetic heart valve can be configured to be crimped to a diameter of less than 24 FR (e.g., less than 8 mm, 5-7.9 mm, etc.) and the expandable frame and/or prosthetic heart valve can be configured to be expanded to a diameter of at least 14 mm (e.g., 14-35 mm and all values and ranges therebetween); however, it can be appreciated that the expandable frame and/or prosthetic heart valve can be designed to be crimped to larger diameters, and/or be expanded to larger diameters.

In accordance with another and/or alternative non-limiting aspect of the present disclosure, the expandable frame of the prosthetic heart valve is formed of a plurality of angularly spaced angular articulating members and vertically extending axial longitudinal members. The angular articulating members and vertically extending axial longitudinal members are interconnected to form one or more of the angular articulating members and/or vertically extending axial longitudinal members can have the same or different thicknesses and/or cross-sectional shape and/or cross-sectional area.

In accordance with another and/or alternative non-limiting aspect of the present disclosure, the prosthetic heart valve includes a) an expandable frame that is balloon expandable, mechanically expandable or self-expanding, and b) a least 1 leaflet (e.g., 1-6 leaflets and all values and ranges therebetween). The one or more leaflets are supported by the expandable frame. The prosthetic heart valve can include an inner and/or outer skirt. The expandable frame has multiple frame cells organized in rows or columns arranged in a cylindrical shape with a proximal and distal end. The metal frame is formed of a metal alloy that plastically deforms and/or elastically deforms to enable the expandable frame to be expanded and compressed (crimped) to different geometrical states.

In accordance with another and/or alternative non-limiting aspect of the present disclosure, the frame has an open cell configuration wherein the cells of the expandable metal frame comprise axial longitudinal members and angular articulating members, wherein the angular articulating members are connected to each other through articulating joints, and wherein the axial longitudinal members are connected to angular articulating members through a base join. In one non-limiting embodiment, the expandable frame has no more than 20% longitudinal foreshortening along a longitudinal axis of the expandable frame when the expandable frame is plastically deformed (e.g., expanded from the crimped to the uncrimped position), and typically no more than 5% longitudinal foreshortening, and the frame cells are comprised of at least two axial longitudinal members, and at least two angular articulating member pairs, wherein each member pair includes at least two angular articulating members connected by an articulating joint, and wherein during expansion or compression of the expandable frame, the overall longitudinal length of the frame cells do not exceed the height of the axial longitudinal members. In one non-limiting configuration, the expandable frame is formed of multiple non-foreshortening frame cells. In another non-limiting configuration, the angular articulating members in all cells in a row of frame cells and/or in a column of frame cells have the same length. In another non-limiting configuration, the length of the angular articulating members is measured from peak to peak of joints defining the ends of an angular articulating member, and wherein the sum of the length of the angular articulating members is less than or equal to the sum of the length of the axial longitudinal members. In another non-limiting configuration, the geometry of the angular articulating member has independent curvature on its width through at least a portion of the length of the angular articulating member. In another non-limiting embodiment, the complete frame does not foreshorten during the expansion and/or crimping of the expandable frame even when one or more of the frame cells foreshorten during the expansion and/or crimping of the expandable frame. In another non-limiting configuration, the longitudinal length between the proximal end of the expandable frame and the distal end of the expandable frame is mostly constant or constant during changes in diameter of the expandable frame. In another non-limiting configuration, one or more longitudinal posts extend through the complete distance from the distal end to the proximal end of the expandable frame. In another non-limiting configuration, the expandable frame includes at least one axial longitudinal member extending from the distal end of the frame to the proximal end of the frame, and a commissural attachment area is located between the proximal and distal ends of the expandable frame. In another non-limiting configuration, a longitudinal distance from the commissural attachment area to the proximal end of the frame is predominantly constant during expansion and/or crimping of the expandable frame. In another non-limiting configuration, the rows and columns of the frame cells of the expandable frame are made of frame cells of equal width or equal height as adjacent circumferential or axial cells. In another non-limiting configuration, the difference in cross-sectional area of a window area of one or more frame cells of the expandable frame do not differ by more than 20% when compared to other cells in the same row of frame cell, and/or in the same column cells in in the expandable frame. In another non-limiting configuration, the expandable frame is made of even or odd numbers of cells per row. In another non-limiting configuration, the expandable frame includes an odd numbers of cells. In another non-limiting configuration, one or more or all of the rows of cells of the expandable frame are formed of 9 cells. In another non-limiting configuration, only the distal row is constructed from an odd number of frame cells, and the other rows are formed of an even number of frame cells. In another non-limiting configuration, the prosthetic heart valve is inserted in the heart such that when the expandable frame is expanded, one or more of the frame cells will partially or fully be positioned across the access to a coronary artery.

In accordance with another and/or alternative non-limiting aspect of the present disclosure, the material used to form the expandable metal frame contains little or no nickel. Nickel and cobalt are commonly used alloys in the frames of commercial prosthetic heart valves, even though such materials have exhibited suboptimal results in terms of biocompatibility. In one non-limiting embodiments, the metal alloy used to form the expandable frame includes only trace amounts (e.g., less than 0.1 wt. %) of cobalt and/or nickel. In another non-limiting configuration, the metal alloy used to form the expandable frame is completely absent nickel and/or cobalt. In another non-limiting configuration, the metal alloy used to form the expandable frame includes rhenium and optionally chromium and/or molybdenum. In another non-limiting configuration, the metal alloy used to form the expandable frame includes up to 70 wt. % rhenium and one or more metals selected from the group consisting of Mo, Cr, Co, Ni, Ti, Ta, Nb, Zr, and/or W.

In accordance with another and/or alternative non-limiting aspect of the present disclosure, the material used to form the expandable metal frame has high yield strength to confer radial strength to the expandable frame. In one non-limiting embodiment, the material used to form the expandable metal frame has a yield strength of at least 110 ksi. In one non-limiting embodiment, the material used to form the expandable metal frame has an elongation of at least 20%. In one non-limiting embodiment, the material used to form the expandable metal frame has a yield strength of at least 110 Ksi and an elongation of at least 20%. In one non-limiting embodiment, the material used to form the expandable metal frame has a yield strength of at least 110 Ksi and and/or an elongation of at least 20% when the expandable frame is in its finished state (e.g., Finished state is defined as material properties after undergoing any material processing such as heating, annealing, cold working, during manufacturing, hot working, etc. Finished state implies the material ready to be sterilized or implanted or shipped to customer in the form of a medical device). In one non-limiting embodiment, the material used to form the expandable metal frame has a low recoil to limit tissue or conduction damage during implantation. In another non-limiting embodiment, the material used to form the expandable metal frame has a modulus of elasticity of at least 52000 ksi and/or a recoil of no more than 5% when the frame is plastically deformed (e.g., expanded from the crimped to the expanded state, crimped, etc.) and no further expansion force is being applied to the expanded frame (e.g., the delivery balloon has been deflated and applies no load on the expanded frame).

In accordance with another and/or alternative non-limiting aspect of the present disclosure, the expandable frame can include distinguishing features which allows for rotational alignment of the expandable frame with the commissures of the native heart valve. In one non-limiting embodiment, the one or more distinguishing feature on the expandable heart valve are asymmetrical for identification of rotational alignment of the expandable frame. In another non-limiting embodiment, the one or more distinguishing features are attached directly to the commissure of the prosthetic heart valve frame. In another non-limiting embodiment, the one or more the distinguishing feature can be formed of radiopaque material which allows for high visibility during the insertion procedure of the prosthetic heart valve in the heart. In another non-limiting embodiment, the one or more distinguishing feature are at least partially made from a material with a density of at least 10 mg/cm$^3$. The one or more distinguishing feature can be formed of the same or different material from the main body of the frame.

In accordance with another and/or alternative non-limiting aspect of the present disclosure, the expandable frame of the prosthetic heart valve can be optionally coated with a polymer material (e.g., silicone, PTFE, ePTFE, polyurethane, polyolefins, hydrogels, biological materials (e.g., pericardium or biological polymers such as collagen, gelatin, or hyaluronic acid derivatives), etc.). The coating can be used to partially or fully encapsulate the angular articulating members and/or vertically extending axial longitudinal members on the frame and/or to fill-in the openings between the angular articulating members and/or vertically extending axial longitudinal members on the frame.

In accordance with another and/or alternative non-limiting aspect of the present disclosure, there is provided a prosthetic heart valve that optionally includes an inner skirt, and wherein the inner skirt is partially or fully made out of a woven material; however, non-woven materials can also or alternatively be used. In another non-limiting embodiment, the inner skirt (when used) can be used to 1) at least partially seal and/or prevent perivalvular leakage, 2) at least partially secure the leaflet structure to the frame, 3) at least partially protect the leaflets from damage during the crimping and/or expansion process, and/or 4) at least partially protect the leaflets from damage during the operation of the prosthetic heart valve in the heart.

In accordance with another and/or alternative non-limiting aspect of the present disclosure, there is provided a prosthetic heart valve that optionally includes an outer or sleeve is partially or fully made out of a woven material; however, non-woven materials can also or alternatively be used. The size, configuration, and thickness of the outer skirt is non-limiting. The thickness of the outer skirt is generally 0.1-20 mils (and all values and ranges therebetween).

In accordance with another and/or alternative non-limiting aspect of the present disclosure, the prosthetic heart valve includes a leaflet structure that can be can be attached to the frame and/or skirt by one or more arrangement (e.g., sutures, melted bold, adhesive, clamp arrangement, etc.). The material used to form the leaflet structures include polymers, bovine pericardial tissue, bovine tissue, porcine tissue, biocompatible synthetic materials, or various other suitable natural or synthetic materials. The tissue used to form the one or more leaflets can optionally be treated/stabilized through a method of collagen cross linking and thereafter stored dry or wet (e.g., tissue is stored dry after a glycerin-based dehydration process, etc.). In one non-limiting embodiment, the leaflet structure comprised of two or more leaflets.

In accordance with another and/or alternative non-limiting aspect of the present disclosure, one or more components of the prosthetic heart valve (e.g., frame, inner skirt, outer skirt, leaflets, material used to secure leaflets to frame, etc.) can optionally be partially (e.g., 1% to 99.99% and all values and ranges therebetween) or fully be coated with one or more agents. When one or more agents are coated on one or more components of the prosthetic heart valve, and one or more components of the prosthetic heart valve includes an enhancement layer, such one or more agents are generally coated on the outer surface of the enhancement layer. If one or more components of the prosthetic heart valve are absent an enhancement layer, such one or more agents can be directly applied to the outer surface of the one or more components of the prosthetic heart valve are absent an enhancement layer. In accordance with another and/or alternative non-limiting aspect of the present disclosure, one or more portion of the prosthetic heart valve (e.g., frame, etc.) can optionally include a marker material that facilitates enabling the prosthetic heart valve to be properly positioned in the treatment area of the heart. In accordance with another and/or alternative non-limiting aspect of the present disclosure, one or more portions of the structures can be at least partially formed by MEMS (e.g., micro-machining, etc.) technology and/or other types of technology (e.g., 3D printing, etc.).

In accordance with another and/or alternative non-limiting aspect of the present disclosure, one or more portions of the prosthetic heart valve (e.g., frame, leaflets, inner skirt, outer skirt, etc.) can optionally include one or more microstructures (e.g., micro-needle, micro-pore, micro-cylinder, micro-cone, micro-pyramid, micro-tube, micro-parallelopiped, micro-prism, micro-hemisphere, teeth, rib, ridge, ratchet, hinge, zipper, zip-tie-like structure, etc.) on the surface of the one or more portions of the prosthetic heart valve. Non-limiting examples of structures that can be formed on the one or more portions of the prosthetic heart valve are illustrated in U.S. Pat. Nos. 7,255,710 and 7,141,063, which are incorporated herein by reference.

In accordance with another and/or alternative non-limiting aspect of the present disclosure, the frame of the prosthetic heart valve can optionally be an expandable device that can be expanded by use of some other device (e.g., balloon, etc.).

In accordance with another and/or alternative non-limiting aspect of the present disclosure, the frame of the prosthetic heart valve can optionally be fabricated from a material having no or substantially no shape-memory characteristics.

In accordance with another and/or alternative non-limiting aspect of the present disclosure, the frame of the prosthetic heart valve can optionally be fabricated from a material having shape-memory characteristics.

In accordance with another and/or alternative aspect of the present disclosure, the metal alloy used to at least partially form the frame of the prosthetic heart valve is. (e.g., pressure and/or sintering process), or 4) 3-D printing the metal powder of the metal alloy and/or metal powder of metals that form the metal alloy into a blank, rod, tube, etc.

In another non-limiting embodiment, one or more of the leaflets can optionally include reinforcing structures or strips to 1) facilitate in securing the leaflets together, 2) facilitate in securing the leaflets to the skirt and/or frame, and/or 3) inhibit or prevent tearing or other types of damage to the leaflets.

In accordance with another and/or alternative non-limiting aspect of the present disclosure, there is provided a prosthetic heart valve that is configured to be inserted into a desired location in the body (e.g., the aortic valve, tricuspid valve, pulmonary valve, mitral valve). The frame of the prosthetic heart valve can be at least partially formed of a plastically-expandable material that permits crimping of the frame to a smaller profile for delivery and expansion of the prosthetic heart valve to a larger profile. The expansion of the crimped frame can be optionally be by use of an expansion device such as, but not limited to, a balloon of on a balloon catheter. As can be appreciated, the frame of the prosthetic heart valve can be formed of a self-expanding metal alloy.

In accordance with another and/or alternative non-limiting aspect of the present disclosure, the optional use of a metal alloy to partially or fully form the frame of the prosthetic heart valve wherein the metal alloy includes at least 15 awt. % rhenium can be used to increase the strength and/or hardness and/or durability of the frame of the prosthetic heart valve as compared with stainless steel or chromium-cobalt alloys or titanium alloys; thus, less quantity of metal alloy that includes at least 15 awt. % rhenium can be used in the frame of the prosthetic heart valve to achieve similar strengths as compared to frames of prosthetic heart valves formed of different metals. As such, the resulting prosthetic heart valve can be made smaller and less bulky by use of the metal alloy that includes at least 15 awt. % rhenium without sacrificing the strength and durability of the prosthetic heart valve. Such a prosthetic heart valve can have a smaller profile, thus can be inserted in smaller areas, openings, and/or passageways. The metal alloy that includes at least 15 awt. % rhenium also can increase the radial strength of the frame of the prosthetic heart valve. For instance, the thickness of the angular articulating members and/or vertically extending axial longitudinal members of the frame of the prosthetic heart valve and/or the wires used to at least partially form the frame of the prosthetic heart valve can be made thinner and achieve a similar or improved radial strength as compared with thicker walled frames of prosthetic heart valves formed of stainless steel, titanium alloys, or cobalt and chromium alloys. The metal alloy that includes at least 15 awt. % rhenium also can improve stress-strain properties, bendability and flexibility of the frame of the prosthetic heart valve, thus increase the life of the prosthetic heart valve. For instance, the prosthetic heart valve can be used in regions that subject the prosthetic heart valve to bending. Due to the improved physical properties of the prosthetic heart valve from the metal alloy that includes at least 15 awt. % rhenium, the prosthetic heart valve has improved resistance to fracturing in such frequent bending environments. In addition or alternatively, the improved bendability and flexibility of the frame of the prosthetic heart valve due to the use of the metal alloy that includes at least 15 awt. % rhenium can enable the prosthetic heart valve to be more easily inserted into various regions of a body. The metal alloy that includes at least 15 awt. % rhenium can also reduce the degree of recoil during the crimping and/or expansion of the frame of the prosthetic heart valve. For example, the prosthetic heart valve better maintains its crimped form and/or better maintains its expanded form after expansion due to the use of the metal alloy that includes at least 15 awt. % rhenium. As such, when the prosthetic heart valve is to be mounted onto a delivery device when the prosthetic heart valve is crimped, the prosthetic heart valve better maintains its smaller profile during the insertion of the prosthetic heart valve into various regions of a body. Also, the prosthetic heart valve better maintains its expanded profile after expansion so as to facilitate in the success of the prosthetic heart valve in the treatment area. In addition to the improved physical properties of the prosthetic heart valve by use of the metal alloy that includes at least 15 awt. % rhenium, the metal alloy that includes at least 15 awt. % rhenium can optionally have improved radiopaque properties as compared to standard materials such as stainless steel or cobalt-chromium alloy, thus reducing or eliminating the need for using marker materials on the prosthetic heart valve.

In accordance with another and/or alternative non-limiting aspect of the present disclosure, the optional use of the metal alloy that includes at least 15 awt. % rhenium to form all or a portion of the prosthetic heart valve can result in several advantages over prosthetic heart valves formed from other materials. These advantages include, but are not limited to:

The metal alloy that includes at least 15 awt. % rhenium used to partially or fully form the frame of the prosthetic heart valve optionally has increased strength and/or hardness as compared with stainless steel, chromium-cobalt alloys, or titanium alloys, thus a less quantity of metal alloy can be used in the prosthetic heart valve to achieve similar strengths as compared to prosthetic heart valves formed of different metals. As such, the resulting prosthetic heart valve can be made smaller and less bulky by use of the metal alloy that includes at least 15 awt. % rhenium without sacrificing the strength and durability of the prosthetic heart valve. The prosthetic heart valve can also have a smaller profile, thus can be inserted into smaller areas, openings, and/or passageways. The thinner angular articulating members and/or vertically extending axial longitudinal members of metal alloy that includes at least 15 awt. % rhenium to form the frame or other portions of the prosthetic heart valve can be used to form a frame or other portion of the prosthetic heart valve having a strength that would require thicker angular articulating members and/or vertically extending axial longitudinal members or other structures of the prosthetic heart valve when formed by stainless steel, chromium-cobalt alloys, or titanium alloys.

The increased strength of the metal alloy that includes at least 15 awt. % rhenium used in the frame of the prosthetic heart valve optionally results in the increased radial strength of the prosthetic heart valve. For instance, the thickness of the walls of the prosthetic heart valve can optionally be made thinner and achieve a similar or improved radial strength as compared with thicker walled prosthetic heart valves formed of stainless steel, cobalt and chromium alloy, or titanium alloy.

The metal alloy that includes at least 15 awt. % rhenium used to partially or fully form the frame of the prosthetic heart valve optionally has a reduced degree of recoil during the crimping and/or expansion of the prosthetic heart valve compared with stainless steel, chromium-cobalt alloys, or titanium alloys. The prosthetic heart valve formed of the metal alloy that includes at least 15 awt. % rhenium better maintains its crimped form and/or better maintains its expanded form after expansion due to the use of the metal alloy. As such, when the prosthetic heart valve is to be mounted onto a delivery device when the prosthetic heart valve is crimped, the prosthetic heart valve better maintains its smaller profile during the insertion of the prosthetic heart valve in a body passageway. Also, the prosthetic heart valve better maintains its expanded profile after expansion to facilitate in the success of the prosthetic heart valve in the treatment area.

The use of the metal alloy that includes at least 15 awt. % rhenium in the frame of the prosthetic heart valve optionally results in the prosthetic heart valve better conforming to an irregularly shaped body passageway when expanded in the body passageway compared to a prosthetic heart valve formed by stainless steel, chromium-cobalt alloys, or titanium alloys.

The metal alloy that includes at least 15 awt. % rhenium used to partially or fully form the frame of the prosthetic heart valve optionally has improved radiopaque properties compared to standard materials such as stainless steel or cobalt-chromium alloy, thus reducing or eliminating the need for using marker materials on the prosthetic heart valve. For example, the metal alloy is at least about 10-20% more radiopaque than stainless steel or cobalt-chromium alloy.

The metal alloy that includes at least 15 awt. % rhenium used to partially or fully form the frame of the prosthetic heart valve optionally has improved fatigue ductility when subjected to cold-working compared to the cold-working of stainless steel, chromium-cobalt alloys, or titanium alloys.

The metal alloy that includes at least 15 awt. % rhenium used to partially or fully form the frame of the prosthetic heart valve optionally has improved durability compared to stainless steel, chromium-cobalt alloys, or titanium alloys.

The metal alloy that includes at least 15 awt. % rhenium used to partially or fully form the frame of the prosthetic heart valve optionally has improved hydrophilicity compared to stainless steel, chromium-cobalt alloys, or titanium alloys.

The metal alloy that includes at least 15 awt. % rhenium used to partially or fully form the frame of the prosthetic heart valve can optionally better conform to an irregularly shaped body passageway when expanded in the treatment area as compared to similar sized and shaped frames that are formed of stainless steel, chromium-cobalt alloys, or titanium alloys.

The metal alloy that includes at least 15 awt. % rhenium used to partially or fully form the frame of the prosthetic heart valve optionally has reduced ion release in the body passageway compared to stainless steel, chromium-cobalt alloys, or titanium alloys.

The metal alloy that includes at least 15 awt. % rhenium used to partially or fully form the frame of the prosthetic heart valve optionally is less of an irritant to the body than stainless steel, cobalt-chromium alloy, or titanium alloys, thus can result in reduced inflammation, faster healing, increased success rates of the prosthetic heart valve. When the prosthetic heart valve is expanded in a body passageway, some minor damage to the interior of the passageway can occur. When the body begins to heal such minor damage, the body has less adverse reaction to the presence of the metal alloy compared to other metals such as stainless steel, cobalt-chromium alloy, or titanium alloy. When one or more portion of the prosthetic heart valve includes an enhancement layer (e.g., TiNOx, ZrNxOy, etc.), such enhancement layer can be used to optionally further reduce irritation to the cells about the expanded prosthetic heart valve and/or facilitate in the generation of nitric oxide on the surface of the enhancement layer, and thus reduce and/or slow the growth rate of cells from the heart onto the frame and/or leaflets of the prosthetic heart valve.

The metal alloy that includes at least 15 awt. % rhenium used to partially or fully form the frame of the prosthetic heart valve optionally has a magnetic susceptibility that is lower than similar sized and shaped frames that are formed of stainless steel, chromium-cobalt alloys, or titanium alloys, thus resulting in less incidence of potential defects to the prosthetic heart valve or complications to the patent after implantation of the prosthetic heart valve when the patient is subjected to an MRI or other prosthetic heart valve that generates a strong magnetic field.

In accordance with another and/or alternative non-limiting aspect of the present disclosure, the frame of the prosthetic heart valve that is formed of metal alloy that includes at least 15 awt. % rhenium optionally has one or features that include, but are not limited to:

High Radial Strength.
Small or Low Crimp Profile.
Reduce Recoil when expanded and/or crimped.
Little or No Longitudinal Foreshortening when expanded.
Smooth curvature at peaks and along angular articulating members.
Symmetrical Design for restoration of valve function and visualization of frame.
Physical Markers on frame for commissural alignment.
Open 9 cell design.
Open cell aligned with Coronary for hemodynamic and reintervention.

In accordance with another and/or alternative non-limiting aspect of the present disclosure, the prosthetic heart valve includes radially collapsible and expandable frame, and a leaflet structure comprising a plurality of leaflets. The prosthetic heart valve can optionally include an annular skirt member, which annular skirt member can be positioned between the frame and the leaflet structure. Each side of the leaflets can be secured to an adjacent leaflet. The leaflets are connected to the frame of the prosthetic heart valve.

In accordance with another and/or alternative non-limiting aspect of the present disclosure, the prosthetic heart valve includes a radially collapsible and expandable frame that includes plurality of angular articulating members, a plurality of axial longitudinal members, and optionally one or more frame opening arrangements, and wherein the angular articulating members, the plurality of axial longitudinal members, and the optional one or more frame opening arrangements are connected together to form a plurality of cells in the frame. In one non-limiting arrangement, the expandable frame includes angular articulating members having first and second ends, and wherein a plurality of the angular articulating members have first and second ends that are connected to the axial longitudinal members, and/or frame opening arrangements. The combination of angular articulating members and axial longitudinal members or the combination of angular articulating members, axial longitudinal members, and frame opening arrangements are used to form each of the cells in the frame. In one non-limiting arrangement, the frame can be formed of two or more sets of cells, wherein each set of cells includes the same number of cells, and each of the set of cells optionally has the same number of cells, and each set of cells optionally have the same shape and size of cells that exist in one or more of the other sets of cells. In one non-limiting configuration, the frame is formed of three sets of cells, wherein each set of cell includes 6-9 cells. As can be appreciated, the frame can include 2-10 sets of cells (and all values and ranges therebetween) and each set of cells can include 2-16 cells (and all values and ranges therebetween). In one non-limiting configuration, the number, shape and size of the cells in each of the three sets of cells are mirror images of one another, and have the same shape and size.

In accordance with another and/or alternative non-limiting aspect of the present disclosure, the prosthetic heart valve includes a radially collapsible and expandable frame that includes one or more frame opening arrangements that are located on the top portion of the frame. Each of the frame opening arrangements can include a lower frame opening and an optional upper frame opening.

In accordance with another and/or alternative non-limiting aspect of the present disclosure, the prosthetic heart valve includes a radially collapsible and expandable frame that includes a plurality of the axial longitudinal members. In one non-limiting embodiment, one or more of the axial longitudinal members extends 80-100% (and all values and ranges therebetween) of the longitudinal length of the frame. In one non-limiting configuration, at least 50% (e.g., 50-100% and all values and ranges therebetween) of the axial longitudinal members extends 80-100% of the longitudinal length of the frame. In another non-limiting configuration, 10-45% (and all values and ranges therebetween) of the axial longitudinal members in the frame extend less than 80% (e.g., 30-79% and all values and ranges therebetween) of the longitudinal length of the frame. In another non-limiting configuration, 20-40% of the axial longitudinal members in the frame extend less than 80% of the longitudinal length of the frame. In another non-limiting embodiment, the axial longitudinal member is configured to limit or eliminate longitudinal foreshortening of the frame when the frame is plastically deformed (e.g., expanded from the crimped to the expanded position). When the frame includes a plurality of axial longitudinal members that have a longitudinal length of 80-100% of the longitudinal length of the frame and are spaced at various location about the about the perimeter of the frame, the axial longitudinal members facilitate in inhibiting or preventing longitudinal foreshortening of the frame when expanded. In one non-limiting configuration, a) the longitudinal length of two or more of the axial longitudinal members is 90-100% of the longitudinal length of the frame, and/or b) the one or more of the axial longitudinal members that are connected to a frame opening arrangement has a combined longitudinal length of 90-100% the longitudinal length of the frame, and wherein the axial longitudinal member configurations of a) and/or b) facilitate in inhibiting or preventing longitudinal foreshortening of the frame when expanded.

In accordance with another and/or alternative non-limiting aspect of the present disclosure, the prosthetic heart valve includes a radially collapsible and expandable frame that includes a plurality of the axial longitudinal members that are optionally formed of a plurality of axial longitudinal member segments. The one or more axial longitudinal members can be formed of a single piece of material or be formed of a plurality of pieces of material that have been connected together (e.g., solder connection, weld connection, adhesive connection, mechanical connection, etc.). The number of axial longitudinal member segments that are used to form each of the axial longitudinal members is non-limiting. In one non-limiting arrangement, the axial longitudinal members are formed of 2-3 axial longitudinal member segments. In one non-limiting embodiment, one or more or all of the axial longitudinal members are formed of a plurality of axial longitudinal member segments. In another non-limiting embodiment, one or more of the axial longitudinal members are formed for a single strut segment, and one or more of the axial longitudinal members are formed of a plurality of axial longitudinal member segments. In one non-limiting configuration, the frame includes one or more of the axial longitudinal members that are formed for a single strut segment, and one or more of the axial longitudinal members that are formed of a plurality of axial longitudinal member segments, and wherein a larger number (e.g., 55-90% and all values and ranges therebetween) of the axial longitudinal members are formed of a plurality of axial longitudinal member segments. In another non-limiting embodiment, the axial longitudinal member segments that form each of the axial longitudinal members are generally aligned along the longitudinal axis of the axial longitudinal member. In another non-limiting embodiment, thickness, width, and/or cross-sectional area of the axial longitudinal member along the longitudinal axis of the axial longitudinal member can be constant or vary. In one non-limiting configuration, the thickness, width, and/or cross-sectional area of each of the axial longitudinal members along the longitudinal axis of the axial longitudinal member varies. In another non-limiting configuration, one or more of the axial longitudinal member segments that are located closer to a top portion of the frame have a thickness, width, and/or cross-sectional area that is less than a thickness, width and/or cross-sectional area of one or more of the axial longitudinal member segments that are located below the axial longitudinal member segments that are located closer to a top portion of the frame. In another on-limiting embodiment, when the axial longitudinal member is formed of two or more axial longitudinal member segments, the longitudinal length of the axial longitudinal member segments can be the same or different. In one non-limiting configuration, the axial longitudinal members that are formed of two or more axial longitudinal member segments have two or more of the axial longitudinal member segments being different longitudinal lengths.

In accordance with another and/or alternative non-limiting aspect of the present disclosure, the prosthetic heart valve includes a radially collapsible and expandable frame that includes a plurality of the angular articulating members. In one non-limiting embodiment, the frame includes at least two rows (e.g., 2-12 and all values and ranges therebetween) of angular articulating members. In another non-limiting embodiment, the shape, size, and/or configuration of a plurality or a majority or all of the angular articulating members on each row of angular articulating members are the same. In one non-limiting configuration, the shape, size, and configuration of all of the angular articulating members on one or more rows of angular articulating members are the same. In another no-limiting configuration, the shape, size, and configuration of some of the angular articulating members on a row of angular articulating members are different from other angular articulating members on the same row of angular articulating members.

In accordance with another and/or alternative non-limiting aspect of the present disclosure, the prosthetic heart valve includes a radially collapsible and expandable frame that includes a plurality of the angular articulating members wherein a plurality, a majority or all of the angular articulating members are formed of a centrally located arcuate portion or semi-circular portion, and first and second arms that extend from each side of the semi-circular portion. In one non-limiting embodiment, each of the first and second arms include one or more undulations. In another non-limiting embodiment, the longitudinal length of one or both arms are greater than a width of the semi-circular portion. In another non-limiting configuration, the combined longitudinal length of the two arms constitutes at least 60% (e.g., 60-95% and all values and ranges therebetween) of the total longitudinal length of the angular articulating members. In another non-limiting embodiment, a plurality of the angular articulating members has first and second arms that are the same length, size, shape, and/or configuration. In one non-limiting configuration, a plurality of the angular articulating members has first and second arms that are the same length, size, shape, and configuration. In one non-limiting configuration, a plurality of the angular articulating members has first and second arms that are not the same length, size, shape, and/or configuration. In another non-limiting configuration, the semi-circular portion has an arc length of 60-190° (and all values and ranges therebetween) when the frame is in the expanded orientation, and the semi-circular portion has an arc length of 80-340° (and all values and ranges therebetween) when the frame is in the crimped or collapsed orientation.

In accordance with another and/or alternative non-limiting aspect of the present disclosure, the prosthetic heart valve includes a radially collapsible and expandable frame that includes three or more rows of the angular articulating members and wherein the spacing of the angular articulating members between adjacently positioned rows of angular articulating members can be the same or different.

In accordance with another and/or alternative non-limiting aspect of the present disclosure, the prosthetic heart valve includes a radially collapsible and expandable frame that includes one or more frame opening arrangements that can optionally be used as securing locations for the one or more leaflet structures, leaflet, inner skirt, and/or outer skirt. In one non-limiting embodiment, one or more of the frame opening arrangements includes a first and optionally a second frame opening. The size and shape of the lower frame opening and optional an upper frame opening are non-limiting. In one non-limiting configuration, the one or more optional upper frame openings can be used as a marker to facilitate in the proper positioning of the frame and prosthetic heart valve in the heart.

In accordance with another and/or alternative non-limiting aspect of the present disclosure, the prosthetic heart valve includes a radially collapsible and expandable frame that includes one or more of the following features: a) high radial strength after expansion of the frame, b) small crimp profile; c) use of a material that minimal recoil after expansion of the frame; d) little or no longitudinal foreshortening of the frame during expansion; e) smooth curvature at peaks and along angular articulating members and/or the axial longitudinal members of the frame; f) symmetrical design for restoration of valve function and visualization of frame; g) markers on frame for commissural alignment; and/or h) open cell aligned with coronary for hemodynamic and reintervention.

One non-limiting object of the present disclosure is the provision of a prosthetic heart valve wherein a portion or all of the outer surface of one or more components (e.g., frame, one or more leaflets, inner skirt, outer skirt, material used to connect leaflets to frame, etc.) of the prosthetic heart valve are coated with an enhancement layer.

Another and/or alternative non-limiting object of the present disclosure is the provision of a prosthetic heart valve wherein a portion or all of the outer surface of one or more components of the prosthetic heart valve are coated with an enhancement layer that includes TiNOx and/or ZrNxOy so as to promote the formation of nitric oxide on the surface of the enhancement layer.

Another and/or alternative non-limiting object of the present disclosure is the provision of a prosthetic heart valve that includes a frame has a novel geometry in combination with the frame being partially or fully formed of the rhenium containing alloy to enable the formation of a frame that a) has an open cell geometry in the frame of the prosthetic heart valve that can be used to reduce delivery system size reducing vascular and neurological complications, b) with high radial strength using an open cell pattern due to the high yield strength and ultimate tensile strength of the rhenium containing metal alloy, c) having improved restoration of the physiologic EOA in challenging, heavily calcified valves that exert high force on the bioprosthetic valve, while allowing a reduced crimp diameter for vascular access, d) has improved restoration of the physiologic EOA that results in greater longevity of the bioprosthetic valve, c) that includes a material having lower recoil than the traditional materials of stainless steel, chromium-cobalt, or titanium alloys resulting in less recoil of the frame when expanded which leads to decreased risk of valve embolization, decreased paravalvular leak due to improved conformability of the native anatomy, more accurate restoration of the physiologic EOA, and decrease conduction system injury due to a lower balloon inflation diameter required to obtain the physiologic EOA after balloon inflation, f) having an open cell geometry that allows for a frame geometry with no longitudinal foreshortening, which allows for more accurate placement of the valve in the native annulus, since a frame with no longitudinal foreshortening has a shorter initial frame length allowing for a shorter balloon, which decreases conduction system injury, g) having an open cell geometry with commissural alignment markers and an open cell between the commissures that allows for proper placement of the bioprosthetic valve in relation to the native commissures of the valve for proper hemodynamic function in regard to wash out of the valve and blood flow to the coronaries, which leads to better durability and longevity of the valve, and access and reintervention of the coronaries preventing future adverse events, h) having an open cell geometry with radial symmetry, longitudinal symmetry, and no longitudinal foreshortening allows for symmetrical and cylindrical expansion of the prosthetic valve resulting in lower rates of leaflet thrombosis and structural valve deterioration, and i) is formed of a rhenium containing metal alloy with no nickel content that prevents allergic response due to the presence of nickel and restenosis associated with nickel content.

Another and/or alternative non-limiting object of the present disclosure is the provision of a prosthetic heart valve for implantation into a heart; the prosthetic heart valve includes an expandable metal frame, a leaflet structure supported by the expandable metal frame, and an inner skirt secured to the expandable metal frame; the expandable metal frame is configured to expand from a crimped orientation to an expanded orientation when the prosthetic heart valve is positioned in a treatment site in the heart; the expandable metal frame includes a plurality of angular articulating members and a plurality of axial longitudinal members; the angular articulating members and the axial longitudinal members are connected together to form a plurality of cells in the expandable metal frame organized into rows whereby the rows of cells are connected by axial longitudinal members; one or more of the axial longitudinal members have a longitudinal length that is at least 10% a longitudinal length of the expandable metal frame when the expandable metal frame is in the expanded orientation.

Another and/or alternative non-limiting object of the present disclosure is the provision of a prosthetic heart valve wherein a portion or all of the frame of the prosthetic heart valve includes a refractory metal alloy or a metal alloy that includes at least 5 awt. % (e.g., 5-99 awt. % and all values and ranges therebetween) rhenium.

Another and/or alternative non-limiting object of the present disclosure is the provision of a prosthetic heart valve that has improved procedural success rates.

Another and/or alternative non-limiting object of the present disclosure is the provision of a prosthetic heart valve that reduces the rate at which heart cells grown onto one or more components of the prosthetic heart valve after implantation of the prosthetic heart valve.

Another and/or alternative non-limiting object of the present disclosure is the provision of a prosthetic heart valve that reduces the rate at which heart cells grow onto one or more components of the prosthetic heart valve after implantation of the prosthetic heart valve without the use of a coating of one or more agents on the outer surface of the components of the prosthetic heart valve. Traditionally, cell growth rate onto the prosthetic heart valve, when control was attempted, was accomplished by the use of drug coatings on the prosthetic heart valve. The time period of effectiveness when using such drug coatings was limited due to the drug coating eventually fully releasing from the prosthetic heart valve over time. Also, the use of drug coatings to inhibit cells growth about the implanted prosthetic heart valve can result in premature failure of the prosthetic heart valve due to undesired damage to the tissue about the implanted prosthetic heart valve, inhibition of cells about the frame to grow and secure the frame in position in the treatment area, and inadvertent promotion of restenosis in the treatment area. The use of the enhancement layer on a portion of the full the outer surface of one or more components of the prosthetic heart valve can result is less irritation and/or bioincompatibility in the treatment area after implantation of the prosthetic heart valve, thus reducing the rate at which heart cells grow onto one or more components of the prosthetic heart valve after implantation of the prosthetic heart valve.

Another and/or alternative non-limiting object of the present disclosure is the provision of a prosthetic heart valve that is coated with an enhancement layer used to a) reduced metal ion release of the metal material from the frame of the prosthetic heart valve, b) reduce the rate of corrosion on the metal that forms the frame of the prosthetic heart valve and/or c) reduces the rate of structural valve disease (SVD) by i) reducing neointimal hyperplasia/cell overgrowth onto one or more portions of the prosthetic heart valve after implantation in the treatment area, ii) reducing infection about the prosthetic heart valve after implantation in the treatment area, iii) reducing platelet activation about the prosthetic heart valve after implantation in the treatment area, iv) reducing thrombosis about the prosthetic heart valve after implantation in the treatment area, v) reducing restenosis about the prosthetic heart valve after implantation in the treatment area, vi) reducing the incidence of nickel from the frame of the prosthetic heart valve reacting with cells about the prosthetic heart valve after implantation in the treatment area, vii) reducing inflammatory cell response about the prosthetic heart valve after implantation in the treatment area, viii) promoting endothelial cell angiogenesis about the prosthetic heart valve after implantation in the treatment area.

Another and/or alternative non-limiting object of the present disclosure is the provision of a prosthetic heart valve that is coated with an enhancement layer (e.g., metal oxynitride layer) that facilitates in the formation of a) nitric oxide (NO) production, b) stimulation of endothelial cells, and/or c) a modulation of endothelial cells.

Another and/or alternative non-limiting object of the present disclosure is the provision of a prosthetic heart valve that includes a plurality of components; two of the components include a metallic frame and at least one leaflet; the metallic frame is directly or indirectly attached to the at least one leaflet; the at least one leaflet is configured to at least partially control blood flow through the metallic frame; an outer surface of at least one component of the prosthetic heart valve includes an enhancement material that i) provides nitric oxide or its precursors nitrogen and oxygen, ii) promotes generation of nitric oxide in adjacent tissue, and/or iii) promotes transport of nitric oxide to adjacent tissue.

In one non-limiting embodiment, a portion or all of the medical device is formed of a metal alloy that includes a) stainless steel, b) CoCr alloy, c) TiAlV alloy, d) aluminum alloy, e) nickel alloy, f) titanium alloy, g) tungsten alloy, h) molybdenum alloy, i) copper alloy, j) beryllium-copper alloy, k) titanium-nickel alloy, l) refractory metal alloy, or m) metal alloy (e.g., stainless steel, CoCr alloy, TiAlV alloy, aluminum alloy, nickel alloy, titanium alloy, tungsten alloy, molybdenum alloy, copper alloy, beryllium-copper alloy, titanium-nickel alloy, refractory metal alloy, etc.) that includes at least 5 awt. %, and wherein a portion or all of the outer surface of the metal alloy is coated with an enhancement layer (e.g., chromium nitride (CrN), diamond-like carbon (DLC), titanium nitride (TiN), titanium nitride oxide (TiNOx), zirconium nitride (ZrN), zirconium oxide ($ZrO_2$), zirconium-nitrogen-carbon (ZrNC), zirconium OxyCarbide (ZrOC), zirconium oxynitride (ZrNxOy) [e.g., cubic ZrN:O, cubic $ZrO_2$:N, tetragonal $ZrO_2$:N, and monoclinic $ZrO_2$:N phase coatings]), and wherein the outer surface of the metal alloy optionally includes an adhesion layer, which adhesion layer is optionally a metallic layer that includes titanium or zirconium.

In non-limiting configuration, a portion or all of the medical device is formed of a metal alloy that includes a) stainless steel, b) CoCr alloy, c) TiAlV alloy, d) aluminum alloy, e) nickel alloy, f) titanium alloy, g) tungsten alloy, h) molybdenum alloy, i) copper alloy, j) beryllium-copper alloy, k) titanium-nickel alloy, l) refractory metal alloy, or m) metal alloy (e.g., stainless steel, CoCr alloy, TiAlV alloy, aluminum alloy, nickel alloy, titanium alloy, tungsten alloy, molybdenum alloy, copper alloy, beryllium-copper alloy, titanium-nickel alloy, refractory metal alloy, etc.) that includes at least 5 awt. %, and wherein the metal alloy is coated with a metal oxynitride layer (e.g., titanium nitride oxide and/or (TiNOx), zirconium oxynitride (ZrNxOy), etc.), which metal oxynitride layer can optionally be used to promotes and/or facilitates in a) formation or generation of nitric oxide (NO), b) stimulation of endothelial cells, c) a modulation of endothelial cells, d) reduce neointimal hyperplasia, e) reduce tissue proliferation, f) reduce platelet activation, g) reduce thrombosis, h) reduce restenosis, i) promote endothelial cell angiogenesis, and/or j) improved healing on and/or about the medical device, and wherein the outer surface of the metal alloy optionally includes an adhesion layer, which adhesion layer is optionally a metallic layer that includes titanium or zirconium.

In another non-limiting configuration, the medical device is a stent or a prosthetic heart valve, and wherein all or a portion of the stent or frame of the prosthetic heart valve is formed of a titanium-nickel alloy or a titanium-nickel alloy that includes at least 5 awt. % rhenium, and wherein a portion or all of the outer surface of the metal alloy is coated with a metal oxynitride layer (e.g., titanium nitride oxide and/or (TiNOx), zirconium oxynitride (ZrNxOy), etc.), and wherein all or a portion of components other than the frame of the prosthetic heart valve (e.g., leaflet, skirts, etc.) are optionally coated with a metal oxynitride layer, and wherein the outer surface of the metal alloy optionally includes an adhesion layer, which adhesion layer is optionally a metallic layer that includes titanium or zirconium.

In another non-limiting configuration, the medical device is a stent or a prosthetic heart valve, and wherein all or a portion of the stent or frame of the prosthetic heart valve is formed of a stainless-steel alloy or a stainless-steel alloy that includes at least 5 awt. % rhenium, and wherein a portion or all of the outer surface of the metal alloy is coated with a metal oxynitride layer (e.g., titanium nitride oxide and/or (TiNOx), zirconium oxynitride (ZrNxOy), etc.), and wherein all or a portion of components other than the frame of the prosthetic heart valve (e.g., leaflet, skirts, etc.) are optionally coated with a metal oxynitride layer, and wherein the outer surface of the metal alloy optionally includes an adhesion layer, which adhesion layer is optionally a metallic layer that includes titanium or zirconium.

In another non-limiting configuration, the medical device is a stent or a prosthetic heart valve, and wherein all or a portion of the stent or frame of the prosthetic heart valve is formed of a cobalt-chromium alloy or a cobalt-chromium alloy that includes at least 5 awt. % rhenium, and wherein a portion or all of the outer surface of the metal alloy is coated with a metal oxynitride layer (e.g., titanium nitride oxide and/or (TiNOx), zirconium oxynitride (ZrNxOy), etc.), and wherein all or a portion of components other than the frame of the prosthetic heart valve (e.g., leaflet, skirts, etc.) are optionally coated with a metal oxynitride layer, and wherein the outer surface of the metal alloy optionally includes an adhesion layer, which adhesion layer is optionally a metallic layer that includes titanium or zirconium.

In another non-limiting configuration, the medical device is a stent or a prosthetic heart valve, and wherein all or a portion of the stent or frame of the prosthetic heart valve is formed of a TiAlV alloy or a TiAlV alloy that includes at least 5 awt. % rhenium, and wherein a portion or all of the outer surface of the metal alloy is coated with a metal oxynitride layer (e.g., titanium nitride oxide and/or (TiNOx), zirconium oxynitride (ZrNxOy), etc.), and wherein all or a portion of components other than the frame of the prosthetic heart valve (e.g., leaflet, skirts, etc.) are optionally coated with a metal oxynitride layer, and wherein the outer surface of the metal alloy optionally includes an adhesion layer, which adhesion layer is optionally a metallic layer that includes titanium or zirconium.

In another non-limiting configuration, the medical device is a stent or a prosthetic heart valve, and wherein all or a portion of the stent or frame of the prosthetic heart valve is formed of a refractory metal alloy or a refractory metal alloy that includes at least 5 awt. % rhenium, and wherein a portion or all of the outer surface of the metal alloy is coated with a metal oxynitride layer (e.g., titanium nitride oxide and/or (TiNOx), zirconium oxynitride (ZrNxOy), etc.), and wherein all or a portion of components other than the frame of the prosthetic heart valve (e.g., leaflet, skirts, etc.) are optionally coated with a metal oxynitride layer, and wherein the outer surface of the metal alloy optionally includes an adhesion layer, which adhesion layer is optionally a metallic layer that includes titanium or zirconium.

In another non-limiting configuration, the medical device is a stent or a prosthetic heart valve, and wherein all or a portion of the stent or frame of the prosthetic heart valve is formed of a metal alloy that includes at least 5 awt. % rhenium, and wherein a portion or all of the outer surface of the metal alloy is coated with a metal oxynitride layer (e.g., titanium nitride oxide and/or (TiNOx), zirconium oxynitride (ZrNxOy), etc.), and wherein all or a portion of components other than the frame of the prosthetic heart valve (e.g., leaflet, skirts, etc.) are optionally coated with a metal oxynitride layer, and wherein the outer surface of the metal alloy optionally includes an adhesion layer, which adhesion layer is optionally a metallic layer that includes titanium or zirconium.

Another and/or alternative non-limiting object of the present disclosure is the provision of a prosthetic heart valve comprising an expandable metal frame and at least one leaflet that is connected to the expandable metal frame; the expandable metal frame is configured to be crimped and further expand from a crimped orientation to an expanded orientation opening in a body passageway; the expandable metal frame has distal and proximal ends; the expandable metal frame includes a) an open cell configuration that includes a plurality of frame cells and at least two rows of frame cells, and/or b) is formed of a material that has a recoil of less than 6% thus resulting in reduced recoil of the expandable metal frame when expanded from the crimped orientation to the expanded orientation; the expandable metal frame has two or more of the following properties: i) at least 70-100% of the expandable metal frame is formed of a metal alloy that has a yield strength of at least 110 ksi, ii) at least 70-100% of the expandable metal frame is formed of a metal alloy that has a modulus of elasticity of at least 35000 ksi, iii) a frame geometry that has a maximum of nine frame cells per horizontal row, iv) at least 70-100% of the expandable metal frame is formed of a metal alloy that is formed of a rhenium containing metal alloy that includes at least 0.1 wt. % rhenium and one or more metals selected from the group consisting of Mo, Cr, Co, Ni, Ti, Ta, Nb, Zr, and W, v) the expandable metal frame is formed of material that has a recoil of no more than 5% recoil when the expandable metal frame is plastically deformed, vi) the expandable metal frame has a longitudinal foreshortening of no more than 20% when the expandable metal frame is plastically deformed, vii) the expandable metal frame is formed of a metal alloy that has an elongation of at least 20%, and/or viii) each of the cells includes at least one axial longitudinal member and at least two angular articulating members, and wherein each of the angular articulating members includes a plurality of arcuate portions along a longitudinal length of the angular articulating member, and wherein one or more of the axial longitudinal members has a continuous linear shape of at least 80% of a longitudinal length of the axial longitudinal member.

Another and/or alternative non-limiting object of the present disclosure is the provision of a prosthetic heart valve wherein the enhancement material includes an outer metal oxynitride layer.

Another and/or alternative non-limiting object of the present disclosure is the provision of a prosthetic heart valve wherein the outer metal oxynitride layer includes titanium oxynitride and/or zirconium oxynitride.

Another and/or alternative non-limiting object of the present disclosure is the provision of a prosthetic heart valve wherein the outer metal oxynitride layer has a thickness of at least 10 nanometers.

Another and/or alternative non-limiting object of the present disclosure is the provision of a prosthetic heart valve wherein the outer metal oxynitride layer has an oxygen to nitrogen atomic ratio of 1:10 to 10:1.

Another and/or alternative non-limiting object of the present disclosure is the provision of a prosthetic heart valve wherein the enhancement layer includes the outer metal oxynitride layer and a metallic adhesion layer; the outer metal oxynitride layer is coated on an outer surface of the metallic adhesion layer; the metallic adhesion layer is coated on an outer surface of the metallic frame.

Another and/or alternative non-limiting object of the present disclosure is the provision of a prosthetic heart valve wherein the metallic adhesion layer includes titanium metal or zirconium metal.

Another and/or alternative non-limiting object of the present disclosure is the provision of a prosthetic heart valve wherein the metallic adhesion layer has a thickness of at least 1 nanometer.

Another and/or alternative non-limiting object of the present disclosure is the provision of a prosthetic heart valve wherein the enhancement layer includes no more than 0.1 wt. % nickel, no more than 0.1 wt. % chromium, and/or no more than 0.1 wt. % cobalt.

Another and/or alternative non-limiting object of the present disclosure is the provision of a prosthetic heart valve wherein the metallic frame includes no more than 0.1 wt. % nickel, no more than 0.1 wt. % chromium, and/or no more than 0.1 wt. % cobalt.

Another and/or alternative non-limiting object of the present disclosure is the provision of a prosthetic heart valve wherein the enhancement layer is only coated on an outer surface of at least a portion of the metallic frame.

Another and/or alternative non-limiting object of the present disclosure is the provision of a prosthetic heart valve wherein the enhancement layer is coated on at least a portion of an outer surface of the metallic frame and the at least one leaflet.

Another and/or alternative non-limiting object of the present disclosure is the provision of a prosthetic heart valve wherein the enhancement layer is coated on at least a portion of an outer surface of the metallic frame, the at least one leaflet, the inner skirt and the outer skirt.

Another and/or alternative non-limiting object of the present disclosure is the provision of a prosthetic heart valve wherein the metallic frame is configured to foreshorten 0-5% of a longitudinal length of the metallic frame when the metallic frame is expanded from a crimped state to an expanded state.

Another and/or alternative non-limiting object of the present disclosure is the provision of a method for repairing a heart valve; the method comprising a) providing a prosthetic heart valve that is crimped about a delivery system; the prosthetic heart valve includes a plurality of components; two of the components include a metallic frame and at least one leaflet; the metallic frame is directly or indirectly attached to the at least one leaflet; the at least one leaflet is configured to at least partially control blood flow through the metallic frame; an outer surface of at least one component of the prosthetic heart valve includes an enhancement material that i) provides nitric oxide or its precursors nitrogen and oxygen, ii) promotes generation of nitric oxide in adjacent tissue, iii) promotes transport of nitric oxide to adjacent tissue, and/or iv) generates nitric oxide (NO) via nitric oxide donation in a local environment of the prosthetic heart valve; b) positioning the prosthetic heart valve in a treatment area of a heart; and, c) expanding the metallic frame from a crimped state to an expanded state while the prosthetic heart valve is in the treatment area of the heart.

Another and/or alternative non-limiting object of the present disclosure is the provision of a method for repairing a heart valve wherein the metallic frame has no more than 5% recoil after the metallic frame has been expanded from the crimped state to the expanded state.

Another and/or alternative non-limiting object of the present disclosure is the provision of a method for repairing a heart valve, wherein at least a portion of the heart valve includes an enhancement layer that promotes nitric oxide generation, and wherein the nitric oxide donation includes use of a nitric oxide donating compound; the nitric oxide donating compound is a) a direct nitric oxide donator, wherein the direct nitric oxide donator includes S—NO—N-acetyl-L-cysteine, Molsidomine, Diethylamino-NONOate, Spermine NONOate, S—NO-Glutathione, and/or S—NO-diclofenac, b) a metabolic nitric oxide donator, wherein the metabolic nitric oxide donator includes nitroglycerin, amyl nitrite, isosorbide dinitrate, isosorbide mononitrate, and/or nicorandil, and/or c) a bifunctional nitric oxide donator, wherein the bifunctional nitric oxide donator includes nitroaspirins and/or S-Nitroso-NTHEs.

Another and/or alternative non-limiting object of the present disclosure is the provision of a method for repairing a heart valve wherein at least one of the leaflets is formed of a biological tissue material, and wherein the nitric oxide donating compound is a) adhered to and/or permeated within interstices of the biological tissue material, b) chemically bound to an extracellular matrix of the biological tissue material, and/or c) chemically bound to free amine residues on collagen of the biological tissue material via crosslinking.

Another and/or alternative non-limiting object of the present disclosure is the provision of a method for repairing a heart valve wherein the crosslinking is at least partially achieved by use of one or more of glutaraldehyde, formaldehyde, genipin, carbodiimides, dialdehyde starch, temperature, and/or UV light crosslinking.

Another and/or alternative non-limiting object of the present disclosure is the provision of a method for repairing a heart valve wherein the crosslinking is reduced via a reducing agent to inhibit or prevent reversibility of the cross-linking.

Another and/or alternative non-limiting object of the present disclosure is the provision of a method for repairing a heart valve wherein the prosthetic heart valve includes biological tissue material with a nitric oxide donating compound that is chemically bound to a secondary structure acting as an intermediary between the nitric oxide donating compound and collagen and/or the nitric oxide donating compound and a crosslinking agent.

Another and/or alternative non-limiting object of the present disclosure is the provision of a method for repairing a heart valve wherein the secondary structure possesses residues congruent with crosslinking of tissue-based collagen structures; the residues include aldehyde residues, carboxyl residues, and/or amine residues.

Another and/or alternative non-limiting object of the present disclosure is the provision of a method for repairing a heart valve wherein the nitric oxide donating compound is embedded within the interstices of the biological tissue material.

Another and/or alternative non-limiting object of the present disclosure is the provision of a method for repairing a heart valve wherein the embedded nitric oxide donating compound that is retained within the biological tissue material is configured to release nitric oxide into the local environment.

Another and/or alternative non-limiting object of the present disclosure is the provision of a method for repairing a heart valve wherein the embedded nitric oxide donating compound itself is released into the local environment.

Another and/or alternative non-limiting object of the present disclosure is the provision of a method for repairing a heart valve wherein the nitric oxide donating compound is introduced into interstices of the biological tissue material via serial immersion into a treatment solution then drying the treated biological tissue material.

Another and/or alternative non-limiting object of the present disclosure is the provision of a method for repairing a heart valve wherein the treatment solution includes the nitric oxide donor compound that is within a dimensional stabilizer compound that enables the treated biological tissue material be stable in standard air composition.

Another and/or alternative non-limiting object of the present disclosure is the provision of a method for repairing a heart valve wherein the dimensional stabilizer compound includes a polyol compound.

Another and/or alternative non-limiting object of the present disclosure is the provision of a method for repairing a heart valve wherein the polyol compound includes ethylene glycol, propylene glycol, and/or glycerol.

Another and/or alternative non-limiting object of the present disclosure is the provision of a method for repairing a heart valve wherein the biological tissue material is treated with a dimensional stabilizer compound at a time that is concurrent with or subsequent to treatment adherence of the nitric oxide donor compound.

Another and/or alternative non-limiting object of the present disclosure is the provision of a method for repairing a heart valve wherein the secondary structures include a polymeric material with nitric oxide generating compound that is adhered to or is permeated within pores of the polymeric material.

Another and/or alternative non-limiting object of the present disclosure is the provision of a method for repairing a heart valve wherein the polymetric material includes polyethers, polyesters, polyurethanes, and/or polycarbons.

Another and/or alternative non-limiting object of the present disclosure is the provision of a method for repairing a heart valve wherein the polymetric material includes one or more compositional elements; the compositional elements include macrodiol segments, polyol segments, and/or cyanates.

Another and/or alternative non-limiting object of the present disclosure is the provision of a prosthetic heart valve that includes a plurality of components; two of the components include a metallic frame and at least one leaflet; the metallic frame is directly or indirectly attached to the at least one leaflet; the at least one leaflet is configured to at least partially control blood flow through the metallic frame; an outer surface of at least one component of the prosthetic heart valve includes an enhancement material; the enhancement material is formulated to i) provide nitric oxide, and/or ii) promote generation of nitric oxide; the enhancement material is at least partially formulated of oxynitride, and wherein the enhancement material optionally includes metal oxynitride, and wherein the metal oxynitride optionally includes titanium oxynitride and/or zirconium oxynitride, and wherein the metal oxynitride optionally has a thickness of at least 10 nanometers, and wherein the metal oxynitride optionally has an oxygen to nitrogen atomic ratio of 1:10 to 10:1, and wherein the enhancement layer optionally is at least partially coated on a metallic adhesion layer; the metal oxynitride layer is optionally coated on an outer surface of the metallic adhesion layer or the metallic adhesion layer is optionally coated on an outer surface of the metallic frame, and wherein the metallic adhesion layer optionally is includes titanium metal or zirconium metal, and wherein the metallic adhesion layer optionally has a thickness of at least 1 nanometers, and wherein the plurality of components optionally further include one or more of an inner skirt, an outer skirt, and/or sutures, and wherein the enhancement layer optionally includes no more than 0.1 wt. % nickel, no more than 0.1 wt. % chromium, and/or no more than 0.1 wt. % cobalt, and wherein the adhesion layer optionally includes no more than 0.1 wt. % nickel, no more than 0.1 wt. % chromium, and/or no more than 0.1 wt. % cobalt, and wherein the metallic frame optionally includes no more than 0.1 wt. % nickel, no more than 0.1 wt. % chromium, and/or no more than 0.1 wt. % cobalt, and wherein the enhancement layer is optionally only coated on or over an outer surface of at least a portion of the metallic frame, and wherein the enhancement layer is optionally coated on or over at least a portion of an outer surface of the metallic frame, and at least one leaflet, the inner skirt and/or the outer skirt, and wherein the metallic frame is optionally configured to foreshorten 0-5% of a longitudinal length of the metallic frame when the metallic frame is expanded from a crimped state to an expanded state, and wherein the metallic frame is optionally formed of a) stainless steel, b) cobalt-chromium alloy, c) titanium-aluminum-vanadium alloy, d) aluminum alloy, e) nickel alloy, f) titanium alloy, g) tungsten alloy, h) molybdenum alloy, i) copper alloy, j) beryllium-copper alloy, k) titanium-nickel alloy, l) refractory metal alloy, or m) metal alloy that includes at least 5 atomic weight percent (awt. %) rhenium.

These and other advantages will become apparent to those skilled in the art upon the reading and following of this description.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. Reference may now be made to the drawings, which illustrate various embodiments that the disclosure may take in physical form and in certain parts and arrangement of parts wherein.

Figure 1B:
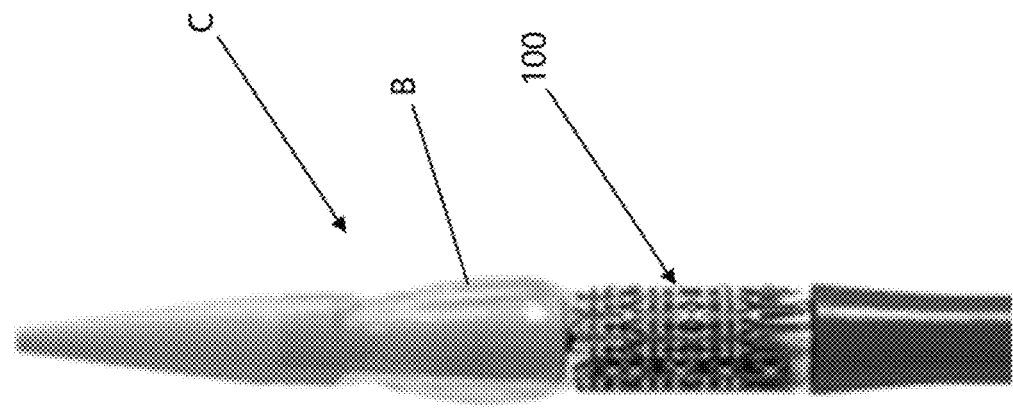
FIG. 1B is a portion of a prior art catheter.

DESCRIPTION OF NON-LIMITING
EMBODIMENTS OF THE DISCLOSURE

A more complete understanding of the articles/devices, processes and components disclosed herein can be obtained by reference to the accompanying drawings. These figures are merely schematic representations based on convenience and the case of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

For the sake of simplicity, the attached figures may not show the various ways (readily discernable, based on this disclosure, by one of ordinary skill in the art) in which the disclosed system, method and apparatus can be used in combination with other systems, methods and apparatuses. Additionally, the description sometimes uses terms such as "produce" and "provide" to describe the disclosed method. These terms are abstractions of the actual operations that can be performed. The actual operations that correspond to these terms can vary depending on the particular implementation and are, based on this disclosure, readily discernible by one of ordinary skill in the art.

Figure 1A:
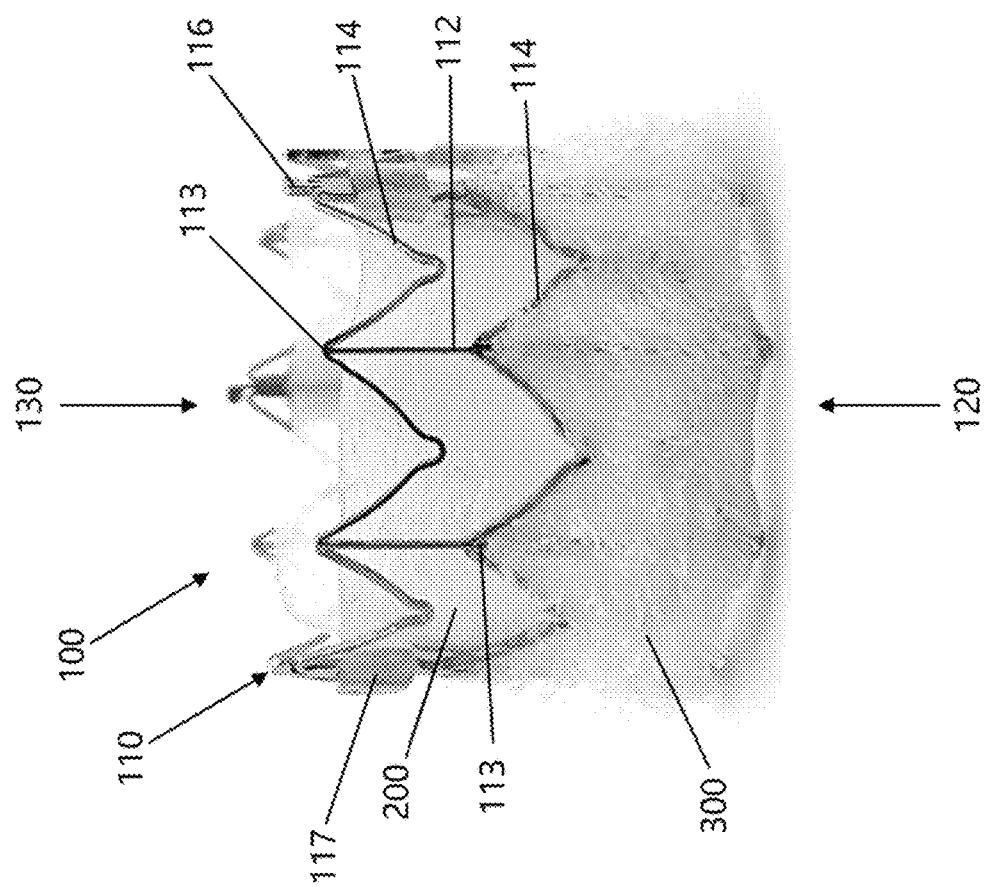
FIG. 1A is an illustration of a TAV in accordance with the present disclosure.

Referring now to FIGS. 1A-IE, these figures are illustrations of an implantable prosthetic heart valve 100 (e.g., TAV) and a method for inserting the prosthetic heart valve 100 in a valve region A (e.g., aortic valve, etc.) of a heart H. Prosthetic heart valve 100 can be implanted in the annulus of native aortic valve A; however, prosthetic heart valve 100 also can be configured to be implanted in other valves of the heart. Although the medical device illustrated is a TAV, the present disclosure is not limited to TAVs or any other heart valve replacement.

Referring now to FIG. 1A, prosthetic heart valve 100 generally comprises a frame 110 formed of a plurality of axial longitudinal members and angular articulating members 112, 114, strut joints 113, leaflet structure 200 supported by frame 110, and an inner skirt 300 secured to the outer surface of frame 110 and/or leaflet structure 200. The frame can include one or more an orientation structures or commissural markers 116. The frame 110 is partially or fully formed of a rhenium containing metal alloy. Prosthetic heart valve 100 has a "lower" end 120 and an "upper" end 130, wherein lower end 120 of prosthetic heart valve 100 is the inflow end and the upper end 130 of prosthetic heart valve 100 is the outflow end.

The configuration of the frame 110 of the prosthetic heart valve 100 is non-limiting. Many different frame configurations can be used for the frame 110 of the prosthetic heart valve 100.

As illustrated in FIG. 1A, the frame 110 has a plurality of vertically extending axial longitudinal members 112 that are position about the upper portion of the frame 110. The vertically extending axial longitudinal members 112 are interconnected via a lower row of circumferentially non-vertically angular articulating members 114 at strut joints 113 and an upper row of circumferentially non-vertically extending angular articulating members 114. The non-vertically extending angular articulating members 114 can be arrangement in a variety of patterns (e.g., zig-zag pattern, saw-tooth pattern, triangular pattern, polygonal pattern, oval pattern, S-shaped, Y-shaped, H-shaped, E-shaped, V-shaped, Z-shaped, L-shaped, J-sped, W-shaped, U-shaped, N-shaped, M-shaped, C-shaped, X-shaped, F-shaped, etc.). One or more of the axial longitudinal members and/or angular articulating members 112, 114 can have the same or different a) thicknesses, b) cross-sectional shape, and/or c) cross-sectional area along a portion or all of the longitudinal length.

The frame 110 is partially or fully formed of a metal material. Non-limiting metal materials include a) stainless steel, b) CoCr alloy or MP35N alloy or a Phynox alloy or Elgiloy alloy or L605 alloy, c) TiAlV alloy, d) aluminum alloy, e) nickel alloy, f) titanium alloy, g) tungsten alloy, h) molybdenum alloy, i) copper alloy, j) beryllium-copper alloy, k) Nitinol alloy, l) refractory metal alloy, or m) metal alloy that includes at least 5 atomic weight percent (awt. %) or atomic percent (awt %) rhenium (e.g., 5-99 awt. % rhenium and all values and ranges therebetween). In one non-limiting configuration, 10-100 wt. % of the frame includes refractory metal alloy, or a metal alloy that includes at least 15 atomic weight percent (awt. %) rhenium.

The inner skirt 300 can be formed of a variety of flexible materials (e.g., polymer (e.g., polyethylene terephthalate (PET), polyester, nylon, Kevlar, silicon, etc.), composite material, metal, fabric material, etc. In one non-limiting embodiment, the material used to partially or fully form inner skirt 300 can be substantially non-elastic (i.e., substantially non-stretchable and non-compressible). In another non-limiting embodiment, the material used to partially or fully form inner skirt 300 can be a stretchable and/or compressible material (e.g., silicone, PTFE, cPTFE, polyurethane, polyolefins, hydrogels, biological materials [e.g., pericardium or biological polymers such as collagen, gelatin, or hyaluronic acid derivatives], etc.). Inner skirt 300 can optionally be formed from a combination of a cloth or fabric material that is coated with a flexible material or with a stretchable and/or compressible material so as to provide additional structural integrity to inner skirt 300. The size, configuration, and thickness of inner skirt 300 is non-limiting (e.g., thickness of 0.1-20 mils and all values and ranges therebetween). The inner skirt 300 can be secured to the inside and/or outside of the frame 110 using various means (e.g., sutures, clips, clamp arrangement, etc.).

Inner skirt 300 can be used to 1) at least partially seal and/or prevent perivalvular leakage, 2) at least partially secure leaflet structure 200 to frame 110, 3) at least partially protect one or more of the leaflets of leaflet structure 200 from damage during the crimping process of prosthetic heart valve 100, 4) at least partially protect one or more of the leaflets of leaflet structure 200 form damage during the operation of prosthetic heart valve 100 in heart H.

Prosthetic heart valve 100 can optionally include an outer skirt or sleeve (not shown) that is positioned at least partially about the exterior region of frame 110. The outer skirt or sleeve (when used) generally is positioned completely around a portion of the outside of frame 110. Generally, the outer skirt is positioned about the lower portion of frame 110 and does not fully cover the upper portion of frame 110; however, this is not required. The outer skirt can be connected to frame 110 by a variety of arrangements (e.g., sutures, adhesive, melted connection, clamping arrangement, etc.). At least a portion of the outer skirt can optionally be located on the interior surface of frame 110; however, this is not required. Generally, the outer skirt is formed of a more flexible and/or compressible material than inner skirt 300; however, this is not required. The outer skirt can be formed of a variety of a stretchable and/or compressible material (e.g., silicone, PTFE, cPTFE, polyurethane, polyolefins, hydrogels, biological materials [e.g., pericardium or biological polymers such as collagen, gelatin, or hyaluronic acid derivatives], etc.). The outer skirt can optionally be formed from a combination of a cloth or fabric material that is coated with the stretchable and/or compressible material so as to provide additional structural integrity to the outer skirt. The size, configuration, and thickness of the outer skirt is non-limiting. The thickness of the outer skirt is generally 0.1-20 mils (and all values and ranges therebetween).

Leaflet structure 200 can be can be attached to frame 110 and/or inner skirt 300. The connection arrangement used to secure leaflet structure 200 to frame 110 and/or inner skirt 300 is non-limiting (e.g., sutures, melted bold, adhesive, clamp arrangement, etc.). The material used to form the one or more leaflets of leaflet structure 200 include, but are not limited to, bovine pericardial tissue, biocompatible synthetic materials, or various other suitable natural or synthetic materials.

Leaflet structure 200 can be comprised of two or more leaflets (e.g., 2, 3, 4, 5, 6, etc.). In one non-limiting arrangement, leaflet structure 200 includes three leaflets that are arranged to collapse in a tricuspid arrangement. The size, shape and configuration of the one or more leaflets of leaflet structure 200 are non-limiting. In one non-limiting arrangement, the leaflets have generally the same shape, size, configuration and thickness.

Two of more of the leaflets of leaflet structure 200 can optionally be secured to one another at their adjacent sides to form commissures of leaflet structure 200 (the edges where the leaflets come together). Leaflet structure 200 can be secured to frame 110 and/or inner skirt 300 by a variety of connection arrangement (e.g., sutures, adhesive, melted bond, clamping arrangement, etc.).

One or more leaflets of the leaflet structure 200 can optionally include reinforcing structures or strips to 1) facilitate in securing the leaflets together, 2) facilitate in securing the leaflets to the inner skirt 300 and/or frame 110, and/or 3) inhibit or prevent tearing or other types of damage to the leaflets.

Prosthetic heart valve 100 is configured to be radially collapsible to a collapsed or crimped state for introduction into the body on a delivery catheter (FIG. 1B) and radially expandable to an expanded state for implanting prosthetic heart valve 100 at a desired location in heart H (e.g., aortic valve A, etc.) (FIG. 1E). The frame of prosthetic heart valve 100 is made of a plastically-expandable material (e.g., refractory metal alloy) that permits crimping of the frame to a smaller profile for delivery and expansion of prosthetic heart valve 100 using an expansion device. FIG. 1B illustrates a generic frame F of a prosthetic heart valve that is crimped on a generic balloon catheter C. The balloon B on the balloon catheter C can be used to expand the frame F from a crimped state to an expanded state. Various type of crimping apparatus and techniques can be used to crimp the prosthetic heart valve on the balloon delivery catheter. The process of crimping a prosthetic heart valve using a crimping device is known in the art and will not be described herein. During a crimping procedure, damage to leaflets of leaflet structure should be avoided.

Figure 1D:
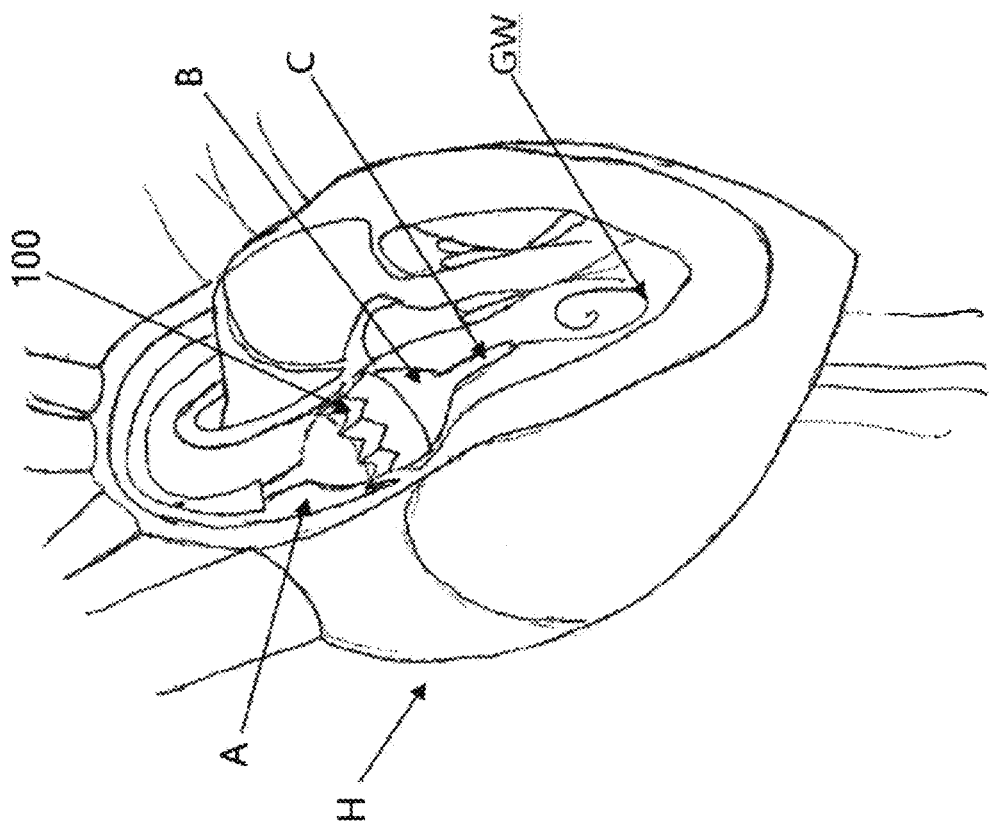
FIGS. 1C-1E illustrate a typical TAVR procedure for inserting the TAV into a valve of a heart.
Figure 1C:
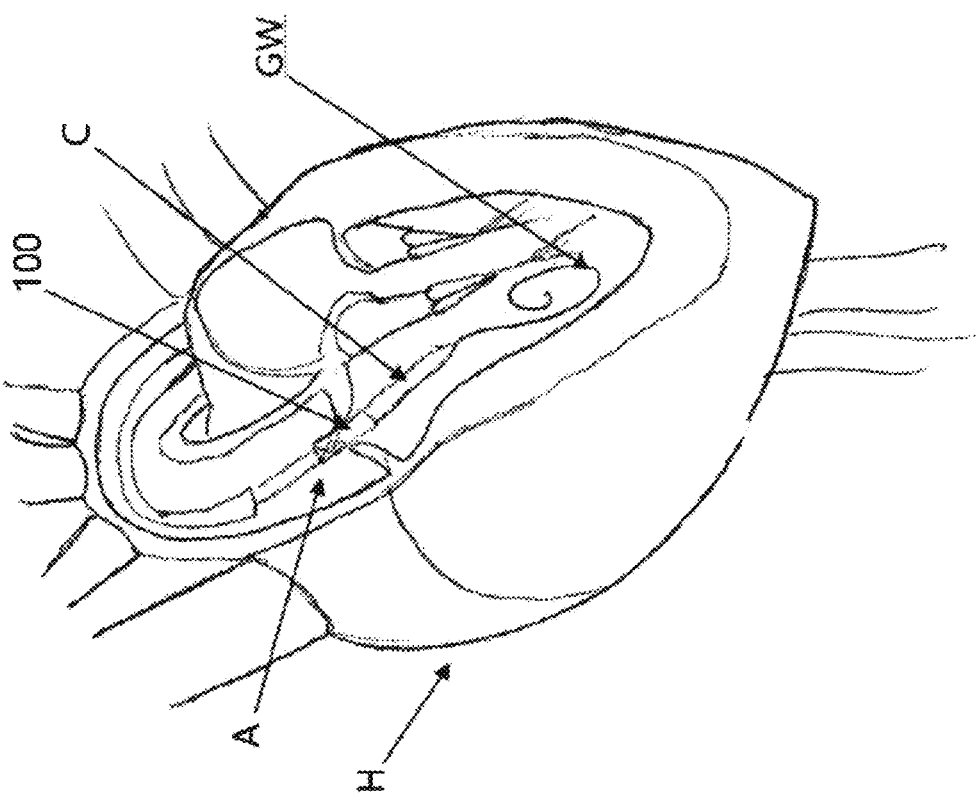
Figure 1E:
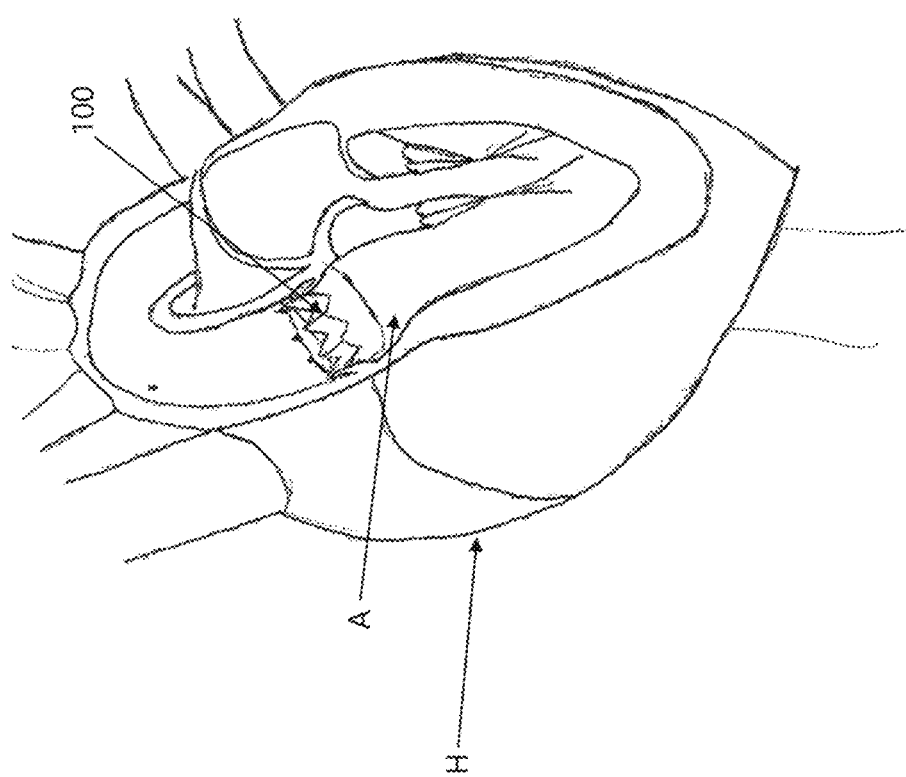

As illustrated in FIGS. 1C-1E, once prosthetic heart valve 100 is crimped on balloon B of a balloon catheter C, balloon catheter C is inserted through a blood vessel and to the location in heart H wherein prosthetic heart valve 100 is to be deployed (See FIG. 1C). At the treatment location, the balloon B on balloon catheter C is expanded to thereby cause prosthetic heart valve 100 to be expanded and secured in a valve region A of heart H (See FIG. 1D). Thereafter, balloon B is deflated and balloon catheter C is removed from the patient (See FIG. 1E).

Figure 3:
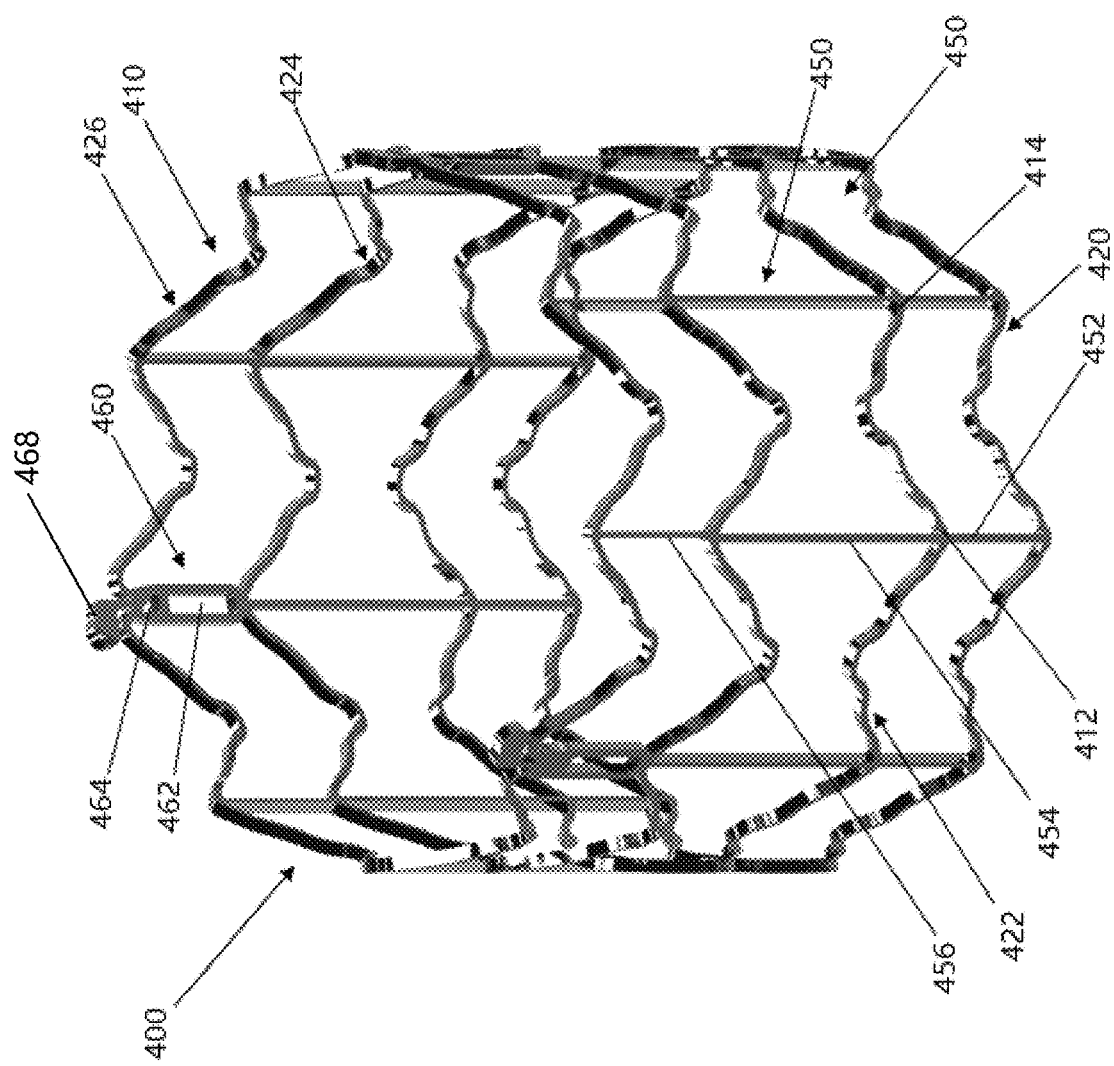
FIG. 3 is a front elevation view of a frame of a TAV in the expanded state in accordance with the present disclosure.
Figure 4:
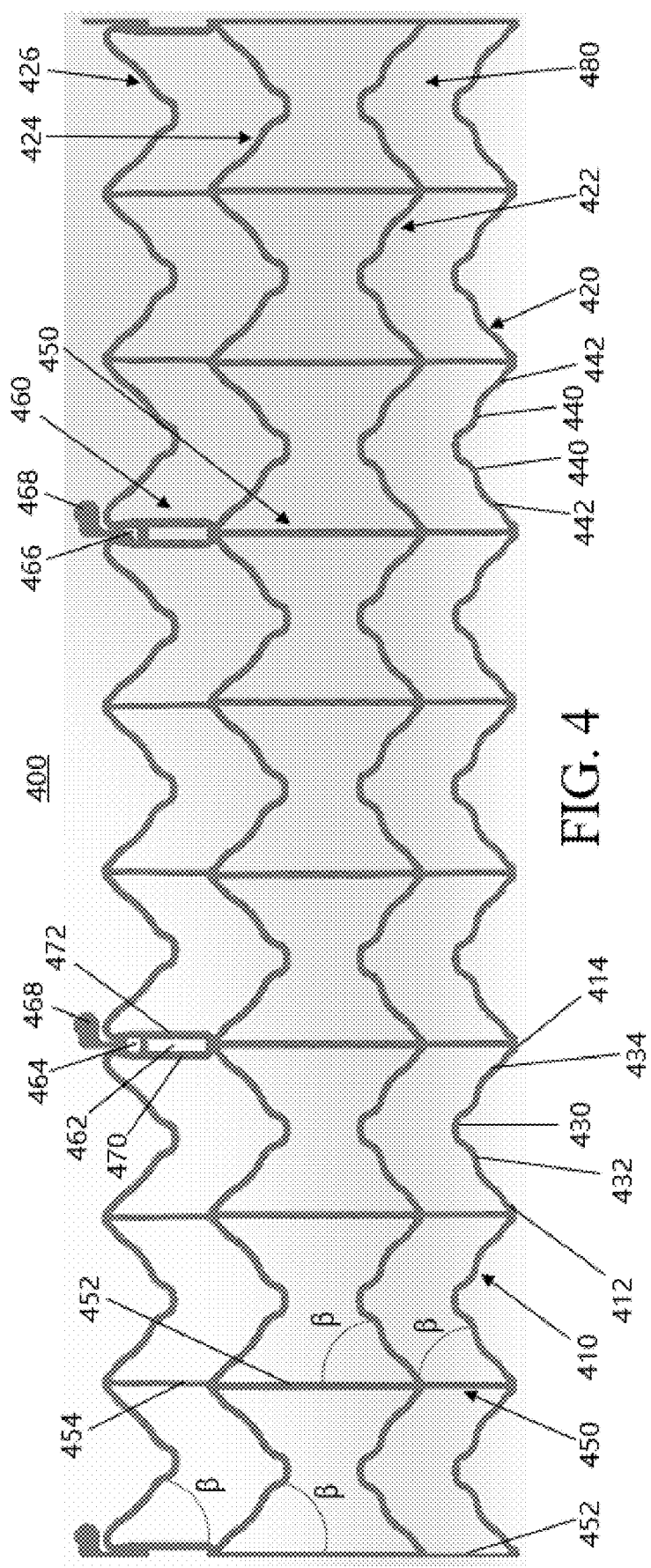
FIG. 4 is a front view of a flat frame of a TAV in the expanded state in accordance with the present disclosure.
Figure 5:
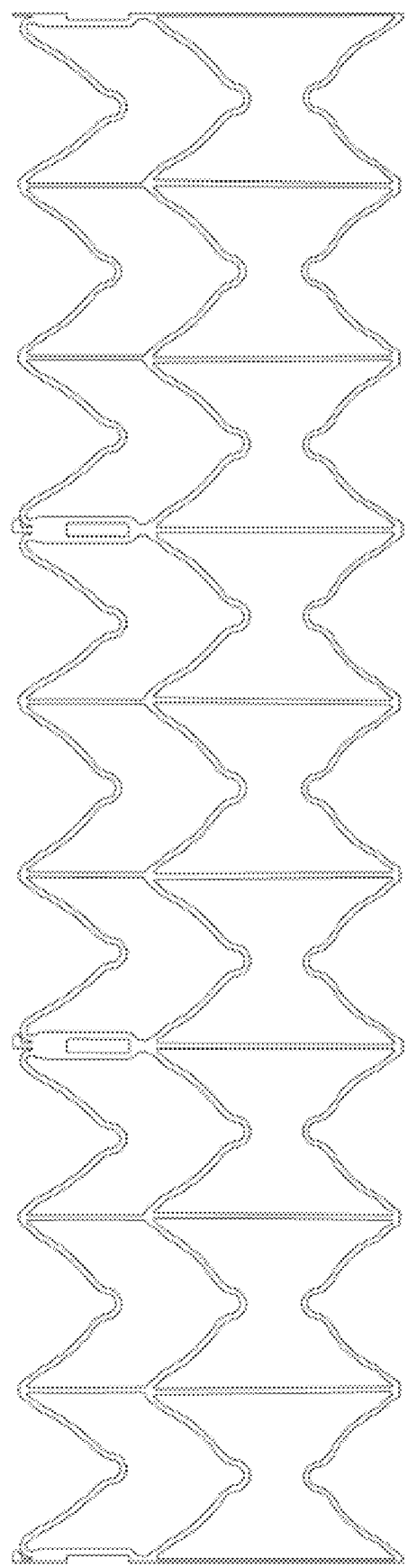
FIG. 5 is a front view of another non-limiting flat frame of a TAV in the crimped or unexpanded state in accordance with the present disclosure.

Referring now to FIGS. 3-5, other non-limiting configurations of frame 400 for prosthetic heart valve 100 are illustrated. Frame 400 configured to be crimped onto a delivery catheter C so that crimped prosthetic heart valve 100 can be inserted in a heart valve. Frame 400 can optionally be configured to enable prosthetic heart valve 100 to be crimped to a diameter that is less than 22 Fr; however, this is not required. As such, prosthetic heart valve 100 that includes frame 400 in accordance with the present disclosure can optionally be configured to enable a prosthetic heart valve 100 to be inserted into smaller sized heart valves that could not previously be treated with prior art prosthetic heart valves. As can be appreciated, prosthetic heart valve 100 in accordance with the present disclosure can be sized and configured to be inserted in heart valves that are larger than 22 Fr.

Referring now to FIGS. 3-4, one non-limiting embodiment of a frame 400 in accordance with the present disclosure is illustrated. Frame 400 illustrated in FIGS. 3-4 includes four rows of angular articulating members 410 and sets of cells that include nine cells 480, and frame 400 illustrated in FIG. 5 includes three rows of angular articulating members 410 and sets of cells that include six cells 480.

Referring again to FIGS. 3-5, the radially collapsible and expandable frame 400 includes plurality of angular articulating members 410, a plurality of axial longitudinal members 450, and a plurality of frame opening arrangements 460, and wherein angular articulating members 410, the plurality of axial longitudinal members 450, and frame opening arrangements 460 are connected together to form a plurality of cells 480 in frame 400. The region that includes the frame opening arrangements 460 is referred to as the commissural attachment area. Connected to the top region of the commissural attachment area can optionally include a top marker or orientation structure or commissural alignment marker 468.

The angular articulating members 410 have first and second ends 412, 414 that are connected to axial longitudinal members 450 or frame opening arrangements 460.

Frame opening arrangements 460 are located on the top portion of frame 400. Each of frame opening arrangements 460 can include a lower frame opening 462 and an optional an upper frame opening 464, 466. As illustrated in FIGS. 3 and 4, frame 400 is formed of three sets of cells, wherein each set of cells includes nine cells 480. As illustrated in FIG. 5, frame 400 includes three sets of cells, and wherein each set of cells includes six cells 480. As illustrated in FIGS. 3-5, the number, shape, and size of cells 480 in each of the three sets of cells are mirror images of one another, and have the same shape and size.

Referring again to FIGS. 3 and 4, a plurality of axial longitudinal members 450 are formed of a three axial longitudinal member segments, 452, 454, 456, and some of axial longitudinal members 450 are formed of two axial longitudinal member segments. Frame 400 illustrated in FIG. 5 includes a plurality of axial longitudinal members or axial longitudinal members wherein some of the axial longitudinal members are formed of two axial longitudinal member segments and some of the axial longitudinal members are formed of a single axial longitudinal member segment. Axial longitudinal members 450 can be formed of a single piece of material or be formed of a plurality of pieces of material that have been connected together (e.g., solder connection, weld connection, adhesive connection, mechanical connection, etc.). The axial longitudinal member segments that form each of axial longitudinal members 450 are generally aligned along the longitudinal axis of axial longitudinal member 450. The thickness or cross-sectional area of each of axial longitudinal members 450 along the longitudinal axis of the axial longitudinal member can be constant or vary. The lower axial longitudinal member segments 452 can a greater thickness or cross-sectional area than the upper axial longitudinal member segments 456. The middle axial longitudinal member segments 454 can have a greater thickness or cross-sectional area than upper axial longitudinal member segments 456. The lower axial longitudinal member segments 452 can have generally the same thickness or cross-sectional area as middle axial longitudinal member segments 454. As can be appreciated, lower axial longitudinal member segments 452 can have a different thickness or cross-sectional area as middle axial longitudinal member segments 454. The cross-sectional shape of each of the axial longitudinal members 450 along the longitudinal length of axial longitudinal member 450 can be constant or vary. The longitudinal length of the axial longitudinal member segments can be the same or different. The lower axial longitudinal member segments 452 can have a longitudinal length that is less than a longitudinal length of either or both of middle axial longitudinal member segments 454 and upper axial longitudinal member segments 456, and the middle axial longitudinal member segments 454 can have a longitudinal length that is greater than either or both lower axial longitudinal member segments 452 and upper axial longitudinal member segments 456. As illustrated in FIG. 4, lower axial longitudinal member segments 452 has the shortest longitudinal length, and the middle axial longitudinal member segments 454 has the longest longitudinal length.

As illustrated in FIGS. 3 and 4, frame 400 includes a first row 420 of angular articulating members 410, a second row 422 of angular articulating members 410, a third row 424 of angular articulating members 410, and a fourth row 426 of angular articulating members 410. First row 420 of angular articulating members 410 is the bottom row and fourth row 426 of angular articulating members 410 is the top row. The shape, size, and/or configuration of angular articulating members 410 of first row 420 are the same. The shape, size, and/or configuration of angular articulating members 410 on second row 422 are the same. The shape, size, and configuration of angular articulating members 410 of third row 424 are the same. The shape, size, and/or configuration of a plurality of angular articulating members 410 on fourth row 426 are the same and a plurality of angular articulating members 410 on fourth row 436 are different. Referring again to FIG. 4, angular articulating members 410 on fourth row 426, wherein either first end 412 or second end 414 the angular articulating members 410 is connected to frame opening arrangements 460, have a different shape, size, and/or configuration from angular articulating members 410 on fourth row 426 wherein both first end 412 and second end 414 of angular articulating members 410 are connected to axial longitudinal members 450.

Referring again to FIGS. 3-5, each of the angular articulating members 410 are formed of a centrally located arcuate portion or semi-circular portion 430, and first and second arms 432, 434 that extend from each side of semi-circular portion 430. First arm 432 terminates at first end 412 and second arm 434 terminates at second end 414. Each of first and second arms 432, 434 include one or more undulations 440, 442. As illustrated in FIG. 4, first arm 432 includes first and second undulations 440, 442, wherein the first undulation 440 is located closer to semicircular portion 430 than the second undulation 442. Also, second arm 434 includes first and second undulations 440, 442, wherein first undulation 440 is located closer to semicircular portion 430 than second undulation 442. As such, each angular articulating members 410 includes at least three undulations along a longitudinal length of the angular articulating members 410. As illustrated in FIG. 4, each angular articulating members 410 includes five undulations along the longitudinal length of the angular articulating members 410.

As best illustrated in FIG. 4, each of first and second arms 432, 434 of all of angular articulating members 410 include two undulations; however, the shape and size of the undulations for two or more of the rows of angular articulating members 410 is different; however, this is not required. As also illustrated in FIG. 4, the shape and size of the undulations and the location of the undulations on angular articulating members 410 on each row of angular articulating members 410 are generally the same. As illustrated in FIG. 4, the shape and size of the undulations and the location of the undulations the angular articulating members 410 on first and second rows 420, 422 are the same or very similar (e.g., dimensions are less than 5% different). As also illustrated in FIG. 4, the shape and size of the undulations on angular articulating members 410 on the third row are different from first, second and fourth rows 420, 422, 426. Further, the shape and size of the undulations on angular articulating members 410 on the fourth row are different from first, second and third rows 420, 422, 424. In another non-limiting embodiment, for a plurality of angular articulating members 410, the length, shape and/or size of first and second arms 432, 434 are the same or very similar (e.g., dimensions are less than 5% different). In one non-limiting configuration, angular articulating members 410 that form first row 420 of angular articulating members 410 have first and second arms 432, 434 wherein the length, shape, and size of first and second arms 432, 434 are the same. In another non-limiting configuration, angular articulating members 410 that form second row 422 of angular articulating members 410 have first and second arms 432, 434 wherein the length, shape, and size the first and second arms 432, 434 are the same. In another non-limiting configuration, the angular articulating members 410 that form third row 424 of angular articulating members 410 have first and second arms 432, 434 wherein the length, shape, and size of first and second arms 432, 434 are the same. In another non-limiting configuration, angular articulating members 410 that form fourth row 424 of angular articulating members 410 have first and second arms 432, 434 wherein the length and shape of first and second arms 432, 434 are not all the same. In another non-limiting configuration, angular articulating members 410 for first and second rows 420, 422 have first and second arms 432, 434 wherein the length, shape, and size of first and second arms 432, 434 are 410 of first and second arms 432, 434 are the same or very similar (e.g., dimensions are less than 5% different) for angular articulating members 410 for first and second rows 420, 422. In another non-limiting configuration, angular articulating members 410 on each of first, second, third and fourth rows 420, 422, 424 and 426 a) have the same width, and/or b) the center point of semi-circular portion 430 is located with ±5% (and all values and ranges therebetween) the midpoint between adjacently positioned axial longitudinal members 450.

Referring again to FIGS. 3-5, the spacing of angular articulating members 410 between adjacently positioned rows 420, 422, 424, 426 of angular articulating members 410 can be the same or different. In one non-limiting embodiment, the spacing of angular articulating members 410 between adjacent positioned rows (e.g., the first and second rows, the second and third rows, the third and fourth rows, etc.) is different. As illustrated in FIG. 4, the spacing between semi-circular portion 430 of first and second rows 420, 422 of angular articulating members 410 is greater than the spacing between semi-circular portion 430 of second and third rows 422, 424 of angular articulating members 410, and the spacing between first ends 412 of first and second rows 420, 422 of angular articulating members 410 is less than the spacing between first ends 412 of second and third rows 422, 424 of angular articulating members 410, and the spacing between second ends 414 of first and second rows 420, 422 of angular articulating members 410 is less than the spacing between second ends 414 of second and third rows 422, 424 of angular articulating members 410. As also illustrated in FIG. 4, semi-circular portion 430 of first and second rows 420, 422 of angular articulating members 410 are oriented toward the top of the frame, and semi-circular portion 430 of third and fourth rows 424, 425 of angular articulating members 410 are oriented toward the bottom of the frame. As such, the semi-circular portion 430 of second and third rows 422, 424 of angular articulating members 410 face one another. As also illustrated in FIG. 4, the spacing between semi-circular portion 430 of third and fourth rows 424, 426 of angular articulating members 410 is greater than the spacing between semi-circular portion 430 of first and second rows 420, 422 of angular articulating members 410, and the spacing between first ends 412 of third and fourth rows 424, 426 of angular articulating members 410 is greater than the spacing between first ends 412 of first and second rows 420, 422 of angular articulating members 410, and the spacing between second ends 414 of third and fourth rows 424, 426 of angular articulating members 410 is greater than the spacing between second ends 414 of first and second 420, 422 of angular articulating members 410. As also illustrated in FIG. 4, the spacing between semi-circular portion 430 of third and fourth rows 424, 426 of angular articulating members 410 is greater than the spacing between semi-circular portion 430 of second and third rows 422, 424 of angular articulating members 410, and the spacing between first ends 412 of third and fourth rows 424, 426 of angular articulating members 410 is less than the spacing between first ends 412 of second and third rows 422, 424 of angular articulating members 410, and the spacing between second ends 414 of third and fourth rows 424, 426 of angular articulating members 410 is less than the spacing between second ends 414 of second and third rows 422, 424 of angular articulating members 410.

Referring now to FIGS. 3-5, frame opening arrangements 460 are located between third and fourth rows 424, 426 of angular articulating members 410. As can be appreciated, one or more frame opening arrangements 460 can be located on other regions of frame 400. Frame opening arrangements 460 can optionally be used as securing locations for one of more leaflet structures 200; however, it can be appreciated that one or more of frame opening arrangements 460 can optionally be used as securing locations for other structures (e.g., leaflet, inner skirt, outer skirt, etc.), and/or be used as an indicator of the orientation and/or location of frame 400 in a body passageway or heart valve. Alternatively, an orientation structure 490 can be included in the frame 400. As illustrated in FIGS. 3-5, each of frame opening arrangements 460 includes first and second frame opening struts 470, 472 that form a lower frame opening 462 and an optional an upper frame opening 464, 466 therebetween. The size and shape of lower frame opening 462 and optional an upper frame opening 464, 466 are non-limiting. As illustrated in FIGS. 3 and 4, lower frame opening 462 has a generally rectangular shape and extends only partially along the longitudinal length of frame opening arrangement 460. As can be appreciated, lower frame opening 462 can have other shapes and sizes. In one non-limiting configuration, each of frame opening arrangements 460 includes a lower frame opening 462 and lower frame openings 462 all have the same or very similar (e.g., dimensions are less than 5% different) shape and size. In one non-limiting embodiment, one or both of first and second frame opening struts 470, 472 a) has a longitudinal axis that is parallel to the longitudinal axis of axial longitudinal member 450 to which the bottom of frame opening arrangements 460, and/or b) has a longitudinal axis that is offset from the longitudinal axis of axial longitudinal member 450 to which the bottom of frame opening arrangements 460. As illustrated in FIGS. 3 and 4, both of first and second frame opening struts 470, 472 a) has a longitudinal axis that is parallel to the longitudinal axis of axial longitudinal member 450 to which the bottom of frame opening arrangements 460, and b) has a longitudinal axis that is offset from the longitudinal axis of axial longitudinal member 450 to which the bottom of frame opening arrangements 460 is connected thereto. The longitudinal length of one or both of first and second frame opening struts 470, 472 can be the same or less than the longitudinal length of length for an axial longitudinal member segment that is located adjacent to first and second frame opening struts 470, 472. As illustrated in FIG. 4, the longitudinal length of first and second frame opening struts 470, 472 is about the same as the longitudinal length of length of axial longitudinal member segment 456.

As illustrated in FIG. 4, the end of first or second arms 432, 434 of angular articulating members 410 of fourth row 426 that is connected to frame opening arrangements 460 can optionally be configured to angle downwardly, and the other end of first or second arms 432, 434 of angular articulating members 410 that is connected to an axial longitudinal member segment is configured to angle upwardly. As illustrated in FIG. 4, the ends of first and second arms 432, 434 of angular articulating members 410 of first, second and third rows 440, 422 and 424 that is connected to an axial longitudinal member segment are both angled in the same direction. As illustrated in FIG. 4, the angle β of angular articulating members 410 relative to axial longitudinal members 450 when the frame is in the expanded orientation is generally 25-60° (and all values and ranges therebetween).

Referring R now to FIGS. 3-5, frame opening arrangements 460 can optionally include one or more optional upper frame openings 464, 466. One or more optional upper frame openings 464, 466 are generally positioned above lower frame opening 462. Generally, one or more optional upper frame openings 464, 466 have a cross-sectional area or size that is less than lower frame opening 462; however, this is not required. As illustrated in FIGS. 3 and 4, the shape of two or more of optional upper frame openings 464, 466 are different. The different shapes of one or more optional upper frame openings 464, 466 can be used as a marker to facilitate in the proper positioning of frame 400 and prosthetic heart valve 100 in the heart. In one specific non-limiting configuration, each of one more optional upper frame openings 464, 466 has a different shape. As illustrated in FIG. 3, two of frame opening arrangements 460 include two different shaped upper frame openings 464, 466 and other frame opening arrangements 460 is absent an upper frame opening.

The top portion of each of frame opening arrangements 460 can optionally include a top marker 468. The shape and size of top marker 468 (when used) is non-limiting. As illustrated in FIGS. 3 and 4 and 5 the shape and size of markers 468 are the same or very similar (e.g., dimensions are less than 5% different). Top markers 468 can be used as a marker to facilitate in the proper positioning of frame 400 and prosthetic heart valve 100 in the heart. The one or more top markers 468 (when used) can also or alternatively be used to enable one or more components of prosthetic heart valve 100 (e.g., leaflet, inner skirt, outer skirt, etc.) to be connected to frame 400. The top markers 468 can be formed of the same or different material from other portions of frame 400.

Figure 2:
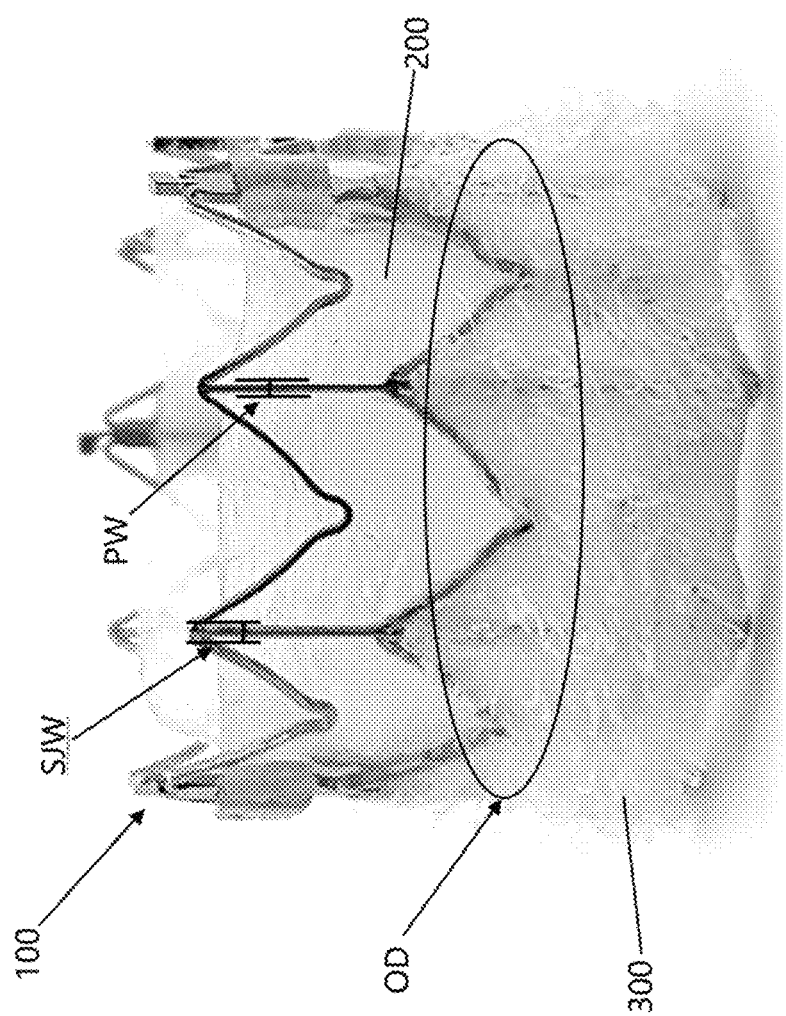
FIG. 2 is an illustration of the TAV of FIG. 1A illustrating features of the axial longitudinal members and the angular articulating members of the frame.

Referring now to FIG. 2, when the frame 110 is formed of a refractory metal alloy or metal alloy that includes at least 5 awt. % (e.g., 5-99 awt. % and all values and ranges therebetween) rhenium, the post width PW and/or the strut joint width SJW of a frame 110 that is formed of such metal alloy can be smaller than the post width PW and/or the strut joint width SJW of a similar shaped and configured frame formed of stainless steel, nitinol, Co—Cr alloy or TiAlV alloy, and still have the same or greater radial strength when the frame is expanded as compared to a frame formed of stainless steel, nitinol, Co—Cr alloy or TiAlV alloy.

Figure 6:
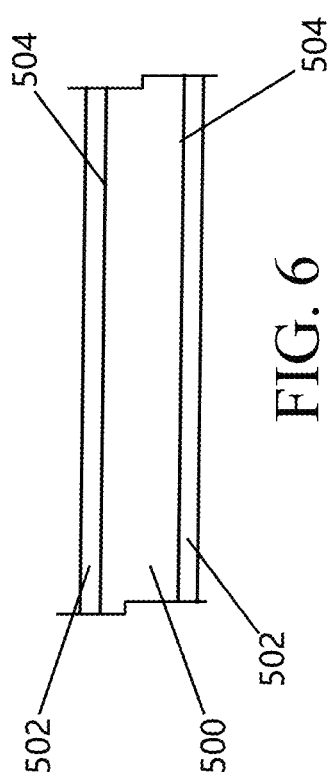
FIG. 6 is a cross-sectional view of a section of a frame that illustrates an enhancement layer on the outer surface of the section of the frame.

Referring now to FIG. 6, there is illustrated a cross-sectional view of a cross-section section of a frame 110, 400 that illustrates an enhancement layer 502 on the outer surface 504 of the section of the base material 500 of the frame. Although FIG. 6 only illustrated a coating on the outer surface of frame 110, 400, the enhancement layer 502 can also or alternatively be coated on one or more other components of the prosthetic heart valve 100 such as, but not limited to, the inner skirt, the outer skirt, one or more of all of the leaflets, and/or the material used to secure leaflets to frame. In one non-limiting configuration, 10-100% (and all values and ranges therebetween) of the outer surface 504 of frame 110, 400 is coated with enhancement layer 502. In another non-limiting configuration, the frame and one or more of the inner skirt, the outer skirt, and/or one or more of all of the leaflets are coated with enhancement layer 502, and 10-100% (and all values and ranges therebetween) of the outer surface 504 of frame 110, 400 is coated with enhancement layer 502, and 10-100% (and all values and ranges therebetween) of the outer surface of one or more of the inner skirt 300, the outer skirt, and/or one or more of all of the leaflets 200 are coated with enhancement layer 502.

Figure 7:
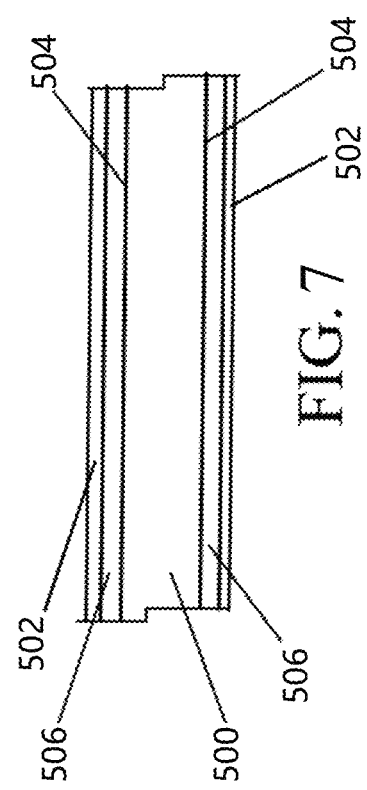
FIG. 7 is a cross-sectional view of a section of a portion of a frame that illustrates an enhancement layer on the outer surface of a pre-applied metal layer that is coated on the outer surface of a section of the frame.

Referring now to FIG. 7, the enhancement layer 502 can alternatively be coated on a metal coating layer 506 (e.g., titanium layer, zirconium layer, etc.), which is in turn coated on to the outer surface 504 of the base material 500. The type of metal material used on the optional metal coating layer 506 is non-limiting. The thickness of the metal coating layer 506 is generally at least 0.05 microns, and typically 0.05-15 microns. The coating process to apply the metal coating layer 506 on the outer surface is non-limiting (e.g., PVD, CVD, ALD, PE-CVD in an inert environment, etc.).

The enhancement layer 502 can be used to improve one or more properties of the prosthetic heat valve (e.g., change exterior color of material having coated surface, increase surface hardness by use of the coated surface, increase surface toughness material having coated surface, reduced friction via use of the coated surface, improve scratch resistance of material that has the coated surface, improve impact wear of coated surface, improve resistance to corrosion and oxidation of coated material, form a non-stick coated surface, improve biocompatibility of material having the coated surface, reduce toxicity of material having the coated surface, reduce ion release from material having the coated surface, the enhancement layer forms a surface that is less of an irritant to cell about the coated surface after the prosthetic heart valve is implanted, reduces the rate to which cells grown on coated surface after the prosthetic heart valve is implanted, reduce rate to which leaflets fail to properly operate after the prosthetic heart valve is implanted, facilitate in nitric oxide generation on the surface of the coating, etc.).

Non-limiting enhancement layers 502 that can be applied to a portion or all of the outer surface of one or more components of the prosthetic heart valve includes chromium nitride (CrN), diamond-like carbon (DLC), titanium nitride (TiN), titanium oxynitride or titanium nitride oxide (Ti-NOx), zirconium nitride (ZrN), zirconium oxide ($ZrO_2$), zirconium-nitrogen-carbon (ZrNC), zirconium OxyCarbide (ZrOC), zirconium oxynitride (ZrNxOy), and combinations of such coatings. In one one-limiting configuration, a portion or all of the outer surface of one or more components of the prosthetic heart valve includes titanium oxynitride or titanium nitride oxide (TiNOx) and/or zirconium oxynitride (ZrNxOy). The enhancement layer 502 can optionally be applied to a portion or all of the outer surface of one or more components of the prosthetic heart valve by a physical vapor deposition (PVD) process (e.g., sputter deposition, cathodic arc deposition or electron beam heating, etc.), chemical vapor deposition (CVD) process, atomic layer deposition (ALD) process, or a plasma-enhanced chemical vapor deposition (PE-CVD) process.

In one non-limiting embodiment, when forming a titanium oxynitride or titanium nitride oxide (TiNOx) coating on the prosthetic heart valve, the portion of the prosthetic heart valve that is to be coated can be optionally initially coated with Ti metal. The Ti metal coating, when applied, can be applied by PVD, CVD, ALD and PE-CVD in an inert environment. The coating thickness of Ti metal is 0.05-1 microns. Thereafter, the Ti metal coating is exposed to a nitrogen and oxygen mixture that can include nitrogen gas, oxygen gas, a nitrogen containing gas compound and/or an oxygen containing gas compound to cause the nitrogen and oxygen to react with the Ti metal coating. During the formation of the titanium oxynitride or titanium nitride oxide (TiNOx) coating, titanium particles can also be applied to the outer surface of the Ti metal coating prior to and/or during the exposure of the Ti metal coating to the nitrogen and oxygen mixture. The ratio of the N to the O can be varied to control the amount of O in the TiNOx coating. The ratio of N to O when forming the TiNOx coating is generally 1:10 to 10:1 (and all values and ranges therebetween). The coating thickness of the TiNOx coating is generally 0.1-2 microns (and all values and ranges therebetween).

In another non-limiting embodiment, when forming a titanium oxynitride or titanium nitride oxide (TiNOx) coating on the prosthetic heart valve, the portion of the prosthetic heart valve that is to be coated is exposed to titanium particles and a nitrogen and oxygen mixture that can include nitrogen gas, oxygen gas, a nitrogen containing gas compound and/or an oxygen containing gas compound to cause the nitrogen and oxygen to react with the Ti particles. In this coating method, a Ti coating is not preapplied to the outer surface of any portion of the prosthetic heart valve that is to be coated with titanium oxynitride or titanium nitride oxide (TiNOx). The ratio of the N to the O can be varied to control the amount of O in the TiNOx coating. The ratio of N to O when forming the TiNOx coating is generally 1:10 to 10:1 (and all values and ranges therebetween). The coating thickness of the TiNOx coating is generally 0.1-2 microns (and all values and ranges therebetween).

In one non-limiting embodiment, when forming a zirconium oxynitride (ZrNxOy) coating on the prosthetic heart valve, the portion of the prosthetic heart valve that is to be coated can be optionally initially coated with Zr metal. The Zr metal coating, when applied, can be applied by PVD, CVD, ALD and PE-CVD in an inert environment. The coating thickness of Zr metal is 0.05-1 microns. Thereafter, the Zr metal coating is exposed to a nitrogen and oxygen mixture that can include nitrogen gas, oxygen gas, a nitrogen containing gas compound and/or an oxygen containing gas compound to cause the nitrogen and oxygen to react with the Zr metal coating. During the formation of the zirconium oxynitride (ZrNxOy) coating, zirconium particles can also be applied to the outer surface of the Zr metal coating prior to and/or during the exposure of the Zr metal coating to the nitrogen and oxygen mixture. The ratio of the N to the O can be varied to control the amount of O in the ZrNxOy coating. The ratio of N to O when forming the ZrNxOy coating is generally 1:10 to 10:1 (and all values and ranges therebetween). The coating thickness of the ZrNxOy coating is generally 0.1-2 microns (and all values and ranges therebetween).

In another non-limiting embodiment, when forming a zirconium oxynitride (ZrNxOy) coating on the prosthetic heart valve, the portion of the prosthetic heart valve that is to be coated is exposed to zirconium particles and a nitrogen and oxygen mixture that can include nitrogen gas, oxygen gas, a nitrogen containing gas compound and/or an oxygen containing gas compound to cause the nitrogen and oxygen to react with the Zr particles. In this coating method, a Zr coating is not preapplied to the outer surface of any portion of the prosthetic heart valve that is to be coated with zirconium oxynitride (ZrNxOy) coating. The ratio of the N to the O can be varied to control the amount of O in the ZrNxOy coating. The ratio of N to O when forming the ZrNxOy coating is generally 1:10 to 10:1 (and all values and ranges therebetween). The coating thickness of the ZrNxOy coating is generally 0.1-2 microns (and all values and ranges therebetween).

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall therebetween.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed:

1. A prosthetic heart valve that includes a plurality of components; two of said components include a plastically deformable and/or elastically deformable expandable metallic frame and at least one leaflet; said metallic frame is directly or indirectly attached to said at least one leaflet; said at least one leaflet is configured to at least partially control blood flow through said metallic frame when said prosthetic heart valve is positioned in a heart; an outer surface of at least one component of said prosthetic heart valve includes an enhancement coating; said enhancement coating is formulated to promote generation of nitric oxide when said prosthetic heart valve is implanted in the heart; said enhancement coating is formed of a) a coating material of titanium oxynitride and/or zirconium oxynitride that is directly coated on an outer surface of at least a portion of said metallic frame and/or at least a portion of an outer surface of said at least one leaflet, or b) a metallic adhesion layer and said coating material, and wherein said metallic adhesion layer is directly coated on at least a portion of said outer surface of said metallic frame and/or at least a portion an outer surface of said at least one leaflet, and wherein said metallic adhesion layer is a layer of metal of titanium, titanium alloy, zirconium or zirconium alloy, and wherein said coating material is coated on at least a portion of an outer surface of said metallic adhesion layer, and wherein said enhancement coating is coated on or over at least a portion of an outer surface of said metallic frame and said at least one leaflet, and wherein said coating material is titanium oxynitride and/or zirconium oxynitride.

2. The prosthetic heart valve as defined in claim 1, wherein said coating material is titanium oxynitride.

3. The prosthetic heart valve as defined in claim 1, wherein said coating material is zirconium oxynitride.

4. The prosthetic heart valve as defined in claim 1, wherein said coating material has a thickness of at least 10 nanometers.

5. The prosthetic heart valve as defined in claim 1, wherein said coating material has an oxygen to nitrogen atomic ratio of 1:10 to 10:1.

6. The prosthetic heart valve as defined in claim 1, wherein said enhancement coating is a) a coating of titanium oxynitride that is directly coated on at least a portion of said outer surface of said metallic frame and/or directly coated on at least a portion of said outer surface of said at least one leaflet, or b) said metallic adhesion layer that is directly coated on at least a portion of said outer surface of said metallic frame and/or directly coated on at least a portion of said outer surface of said at least one leaflet, and wherein said metallic adhesion layer is a layer of metal of titanium or titanium alloy, and wherein at least a portion of said outer surface of said metallic adhesion layer is directly coated with titanium oxynitride.

7. The prosthetic heart valve as defined in claim 1, wherein said enhancement coating is a) a coating of zirconium oxynitride that is directly coated on at least a portion of said outer surface of said metallic frame and/or directly coated on at least a portion of said outer surface of said at least one leaflet, or b) said metallic adhesion layer that is directly coated on at least a portion of said outer surface of said metallic frame and/or directly coated on at least a portion of said outer surface of said at least one leaflet, and wherein said metallic adhesion layer is a layer of metal of zirconium or zirconium alloy, and wherein at least a portion of said outer surface of said metallic adhesion layer is directly coated with zirconium oxynitride.

8. The prosthetic heart valve as defined in claim 1, wherein said metallic adhesion layer has a thickness of at least 1 nanometers.

9. The prosthetic heart valve as defined in claim 1, wherein said plurality of components further include one or more of an inner skirt, an outer skirt, and/or sutures.

10. The prosthetic heart valve as defined in claim 9, wherein said plurality of components include said frame, said at least one leaflet, said inner skirt, said outer skirt, and said sutures.

11. The prosthetic heart valve as defined in claim 1, wherein said enhancement coating includes no more than 0.1 wt. % nickel, no more than 0.1 wt. % chromium, and/or no more than 0.1 wt. % cobalt.

12. The prosthetic heart valve as defined in claim 10, wherein said metallic frame includes no more than 0.1 wt. % nickel, no more than 0.1 wt. % chromium, and/or no more than 0.1 wt. % cobalt.

13. The prosthetic heart valve as defined in claim 9, wherein said enhancement coating is coated on or over at least a portion of an outer surface of said inner skirt and/or said outer skirt.

14. The prosthetic heart valve as defined in claim 1, wherein said metallic frame is formed of a) stainless steel, b) cobalt-chromium alloy, c) titanium-aluminum-vanadium alloy, d) aluminum alloy, e) nickel alloy, f) titanium alloy, g) tungsten alloy, h) molybdenum alloy, i) copper alloy, j) beryllium-copper alloy, k) titanium-nickel alloy, l) refractory metal alloy, or m) metal alloy that includes at least 15 atomic weight percent (awt. %) rhenium.

15. The prosthetic heart valve as defined in claim 14, wherein said metallic frame is formed of said refractory metal alloy or said metal alloy that includes at least 15 atomic weight percent (awt. %) rhenium.

16. A method for repairing a heart valve; said method comprising:
   a. providing a prosthetic heart valve that is crimped about a delivery system; said prosthetic heart valve includes a plurality of components; two of said components include a plastically deformable and/or elastically deformable expandable metallic frame and at least one leaflet; said metallic frame is directly or indirectly attached to said at least one leaflet; said at least one leaflet is configured to at least partially control blood flow through said metallic frame when said prosthetic heart valve is positioned in a heart; an outer surface of at least one component of said prosthetic heart valve includes an enhancement coating that has been coated on said outer surface; said enhancement coating is formulated to promote generation of nitric oxide when said prosthetic heart valve is implanted in the heart; said enhancement coating is formed of a) a coating material of titanium oxynitride and/or zirconium oxynitride that is directly coated on an outer surface of at least a portion of said metallic frame and/or at least a portion of an outer surface of said at least one leaflet, or b) a metallic adhesion layer and said coating material, and wherein said metallic adhesion layer is directly coated on at least a portion of said outer surface of said metallic frame and/or at least a portion an outer surface of said at least one leaflet, and wherein said metallic adhesion layer is a layer of metal of titanium, titanium alloy, zirconium or zirconium alloy, and wherein said coating material is coated on at least a portion of an outer surface of said metallic adhesion layer, and wherein said enhancement coating is coated on or over at least a portion of an outer surface of said metallic frame and said at least one leaflet, and wherein said coating material is titanium oxynitride and/or zirconium oxynitride;
   b. positioning said prosthetic heart valve in a treatment area of said heart; and,
   c. expanding said metallic frame from a crimped state to an expanded state while said prosthetic heart valve is in said treatment area of said heart; and
   wherein said coating material promotes generation of nitric oxide at or near said treatment area.

17. The method as defined in claim 16, wherein said coating material is titanium oxynitride.

18. The method as defined in claim 16, wherein said coating material is zirconium oxynitride.

19. The method as defined in claim 16, wherein said coating material has a thickness of at least 10 nanometers.

20. The method as defined in claim 16, wherein said coating material has an oxygen to nitrogen atomic ratio of 1:10 to 10:1.

21. The method as defined in claim 16, wherein said enhancement coating is a) a coating of titanium oxynitride that is directly coated on at least a portion of said outer surface of said metallic frame and/or directly coated on at least a portion said outer surface of said at least one leaflet, or b) said metallic adhesion layer that is directly coated on at least a portion of said outer surface of said metallic frame and/or directly coated on at least a portion of said at least one leaflet, and wherein said metallic adhesion layer is a layer of metal of titanium or titanium alloy, and wherein at least a portion of said outer surface of said metallic adhesion layer is directly coated with titanium oxynitride.

22. The method as defined in claim 16, wherein said enhancement coating is a) a coating of zirconium oxynitride that is directly coated on at least a portion of said outer surface of said metallic frame and/or directly coated on at least a portion of said outer surface of said at least one leaflet, or b) said metallic adhesion layer that is directly coated on at least a portion of said outer surface of said metallic frame and/or directly coated on at least a portion of said outer surface of said at least one leaflet, and wherein said metallic adhesion layer is a layer of metal of zirconium or zirconium alloy, and wherein at least a portion of said outer surface of said metallic adhesion layer is directly coated with zirconium oxynitride.

23. The method as defined in claim 16, wherein said metallic adhesion layer has a thickness of at least 1 nanometers.

24. The method as defined in claim 16, wherein said plurality of components further include one or more of an inner skirt, an outer skirt, and/or sutures.

25. The method as defined in claim 16, wherein said enhancement coating includes no more than 0.1 wt. % nickel, no more than 0.1 wt. % chromium, and/or no more than 0.1 wt. % cobalt.

26. The method as defined in claim 16, wherein said metallic frame includes no more than 0.1 wt. % nickel, no more than 0.1 wt. % chromium, and/or no more than 0.1 wt. % cobalt.

27. The method as defined in claim 16, wherein said enhancement coating is only coated on or over at least a portion of said outer surface of said metallic frame.

* * * * *